United States Patent
Suzuki et al.

(10) Patent No.: US 9,142,832 B2
(45) Date of Patent: Sep. 22, 2015

(54) GRAPHITE MATERIAL FOR NEGATIVE ELECTRODES OF LITHIUM ION SECONDARY BATTERY, MANUFACTURING METHOD FOR SAID MATERIAL, AND LITHIUM ION SECONDARY BATTERY USING SAME

(71) Applicants: JX NIPPON OIL & ENERGY CORPORATION, Tokyo (JP); TODA KOGYO CORP., Hiroshima (JP)

(72) Inventors: Takashi Suzuki, Yokohama (JP); Noriyo Ishimaru, Yokohama (JP); Takashi Oyama, Yamaguchi (JP); Tamotsu Tano, Yamaguchi (JP); Toshiyuki Oda, Yamaguchi (JP); Ippei Fujinaga, Yamaguchi (JP); Tomoaki Urai, Otake (JP); Seiji Okazaki, Otake (JP); Katsuaki Kurata, Otake (JP); Toshiaki Hiramoto, Otake (JP); Akino Sato, Otake (JP); Wataru Oda, Otake (JP)

(73) Assignees: JX NIPPON OIL & ENERGY CORPORATION, Tokyo (JP); TODA KOGYO CORP., Hiroshima (JP)

( * ) Notice: Subject to any disclaimer, the term of this patent is extended or adjusted under 35 U.S.C. 154(b) by 135 days.

(21) Appl. No.: 13/866,843

(22) Filed: Apr. 19, 2013

(65) Prior Publication Data
US 2013/0251620 A1  Sep. 26, 2013
US 2014/0065056 A2  Mar. 6, 2014

Related U.S. Application Data

(63) Continuation of application No. 13/816,131, filed as application No. PCT/JP2011/068325 on Aug. 10, 2011, now abandoned.

(30) Foreign Application Priority Data

Aug. 11, 2010 (JP) .................. 2010-180485
Oct. 21, 2010 (JP) .................. 2010-236475
Dec. 9, 2010 (JP) .................. 2010-275161
Dec. 9, 2010 (JP) .................. 2010-275162

(51) Int. Cl.
*H01M 4/133* (2010.01)
*C01B 31/04* (2006.01)
*H01M 4/587* (2010.01)

(52) U.S. Cl.
CPC .............. *H01M 4/133* (2013.01); *C01B 31/04* (2013.01); *H01M 4/587* (2013.01)

(58) Field of Classification Search
CPC ...... H01M 4/133; H01M 4/587; C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
USPC ........................... 208/50–55; 423/448
See application file for complete search history.

(56) References Cited

U.S. PATENT DOCUMENTS

2009/0268375 A1 * 10/2009 Oyama et al. ............... 361/502
2010/0209331 A1    8/2010 Sakamoto et al.

FOREIGN PATENT DOCUMENTS

JP   10-326611   12/1998
JP   3141818     12/2000

(Continued)

OTHER PUBLICATIONS

English-language translation of International Preliminary Report on Patentability from the International Bureau of WIPO for International Application No. PCT/JP2011/068325, mailed Mar. 21, 2013 (6 pages).

(Continued)

*Primary Examiner* — Daniel C McCracken
(74) *Attorney, Agent, or Firm* — Finnegan, Henderson, Farabow, Garrett & Dunner, L.L.P.

(57) ABSTRACT

A graphite material for a negative electrode is provided which can suppress capacity degradation due to repeated charging and discharging cycles, storage in a charged state, and floating charging.
A method of manufacturing a graphite material for a negative electrode of a lithium ion secondary battery is provided in which an atomic ratio H/C of hydrogen atoms H and carbon atoms C in the raw coke composition is in a range of 0.30 to 0.50 and a microstrength of the raw coke composition is in a range of 7 wt % to 17 wt %.

8 Claims, 2 Drawing Sheets

(56) References Cited

FOREIGN PATENT DOCUMENTS

JP          2003-171110      6/2003
JP              4171259      8/2008
JP           2009-87871      4/2009

OTHER PUBLICATIONS

Ariyoshi, et al., "Twelve-Volt "Lead-Free" Accumulators consisting of LTO and LAMO: High and Low Temperature Examinations", Proceedings of the 48th Battery Symposium in Japan, 1A11, 1 page, (2007).

Ariyoshi, et al., "Cycleability on the LTO/LAMO Cells for 12V "Lead-Free" Accumulators", Proceedings of the 76th Meeting of The Electrochemical Society of Japan, 1P29, 2 pages, (2009).

Kobayashi, et al., "Change of Charge-Discharge Region for Lithium Ion Secondary Batteries by High-Temperature Storage" Proceedings of the 71st Meeting of The Electrochemical Society of Japan, 2I07, 2 pages, (2004).

Ohzeki, et al., "Shape and Surface Modification of Natural Graphite Particles by Mechano-Chemical Method", Carbon, No. 217, pp. 99-103, (2005).

The 117 Committee of the Japan Society for the Promotion of Sciences "Procedure for the Measurements of Lattice Parameters and Crystallite Sizes of Carbon Materials by X-Ray Diffraction.", Carbon, No. 221, pp. 52-60, (2006).

Besenhard, et al., "Filming Mechanism of Lithium-Carbon Anodes in Organic and Inorganic Electrolytes", Journal of Power Sources, 54, pp. 228-231, (1995).

Yokono, et al., "Characterization of Pitch II. Chemical Structure", Carbon, Tanso No. 105, pp. 73-81, (1981).

English-language translation of International Search Report from the Japanese Patent Office for International Application No. PCT/JP2011/068325, mailing date Nov. 29, 2011.

* cited by examiner

GRAPHITE MATERIAL FOR NEGATIVE ELECTRODES OF LITHIUM ION SECONDARY BATTERY, MANUFACTURING METHOD FOR SAID MATERIAL, AND LITHIUM ION SECONDARY BATTERY USING SAME

TECHNICAL FIELD

The present invention relates to a graphite material used for a negative electrode of a lithium ion secondary battery and a manufacturing method thereof. More particularly, the present invention relates to a method of manufacturing a graphite material used for a negative electrode of a lithium ion secondary battery with high durability and with suppressed capacity degradation, and a lithium ion secondary battery including a negative electrode formed of the graphite material.

BACKGROUND ART

Since a lithium ion secondary battery has a low weight and excellent input and output characteristics in comparison with a nickel-cadmium battery, a nickel-hydrogen battery, and a lead battery, which are secondary batteries in the related art, the lithium ion secondary battery is recently anticipated as a power source for electric cars or hybrid cars. In general, such a type of battery has a structure in which a positive electrode (cathode) including lithium which can be reversibly intercalated and a negative electrode (anode) formed of a carbon material face each other with a non-aqueous electrolyte interposed therebetween. Therefore, these batteries do not enter a dischargeable state when they are not assembled in a discharged state and then charged. Hereinafter, charging and discharging reactions will be described with reference to an example in which a positive electrode including lithium cobalt oxide ($LiCoO_2$), a negative electrode including a carbon material, and a non-aqueous electrolyte solution including a lithium salt as an electrolyte are used.

First, when a first charging cycle is performed, lithium included in the positive electrode is emitted to the electrolyte (Formula 1) and the positive electrode potential goes in the higher direction. In the negative electrode, lithium emitted from the positive electrode is occluded in the carbon material (Formula 2), and the negative electrode potential goes in the lower direction. In general, when the difference between the positive electrode potential and the negative electrode potential, that is, the battery voltage, reaches a predetermined value, the charging reaction is cut off. This value is called charging cutoff voltage. In the discharging reaction, lithium occluded in the negative electrode is emitted, the negative electrode potential goes in the higher direction, lithium is occluded in the positive electrode again, and the positive electrode potential goes in the lower direction. Similarly to the charging reaction, when the difference between the positive electrode potential and the negative electrode potential, that is, the battery voltage, reaches a predetermined value, the discharging reaction is cut off. This value is called discharging cutoff voltage. The total charging and discharging reaction formula is expressed by Formula 3. In the second cycle or the subsequent cycles thereto, lithium comes and goes between the positive electrode and the negative electrode to progress the charging and discharging reaction (cycle).

[Chem. 1]

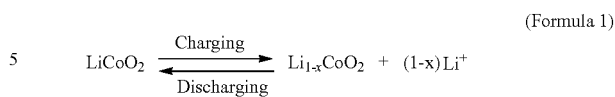

(Formula 1)

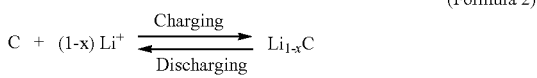

(Formula 2)

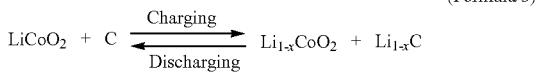

(Formula 3)

The carbon material used as the material for a negative electrode of a lithium ion secondary battery is generally approximately classified into a graphite-based carbon material and an amorphous carbon material. The graphite-based carbon material has an advantage that the energy density per unit volume is higher than that of the amorphous carbon material. Therefore, the graphite-based carbon material is generally used as the material of a negative electrode in a lithium ion secondary battery for mobile phones or notebook computers requiring a compact structure and a large charging and discharging capacity. Graphite has a structure in which reticulated plane of carbon atoms are regularly laminated, and intercalation and deintercalation reactions of lithium ions progress in an edge portion of crystallites during charging and discharging.

As described above, such a type of battery is actively studied as a power storage device for vehicles, industry, and power supply infrastructure. When the batteries are used for these applications, very high reliability is required, compared with a case in which they are used for mobile phones or notebook computers. Here, reliability is a characteristic associated with the service life and can be said to be a storage characteristic. That is, reliability means a characteristic that charging and discharging capacity or internal resistance are not changed much (not degraded much) even when the charging and discharging cycles are repeated, even when the battery is stored in a charged state with a predetermined voltage, or even when the battery continues to be charged with a constant voltage (when floating-charged).

On the other hand, it is generally known that the service life characteristics of lithium ion secondary batteries having been used for mobile phones or notebook computers in the related art greatly depend on the material of the negative electrode. This is because it is not possible in principle to set the charging and discharging efficiencies of the positive electrode reaction (Formula 1) and the negative electrode reaction (Formula 2) to be completely equal to each other and the charging and discharging efficiency of the negative electrode is lower. Here, the charging and discharging efficiency means the ratio of dischargeable electric capacity to the electric capacity consumed in charging. Hereinafter, the reaction mechanism in which the service life characteristic degrades due to the low charging and discharging efficiency of the negative electrode reaction will be described in detail.

In the process of charging, as described above, lithium in the positive electrode is emitted (Formula 1) and is occluded in the negative electrode (Formula 2), but the electric capacity consumed in the charging is the same in the positive electrode reaction and the negative electrode reaction. However, since the charging and discharging efficiency is lower in the negative electrode, the discharging may be cut off in a state in which the amount of lithium emitted from the negative electrode is smaller than the amount of lithium which can be occluded in the positive electrode, that is, the amount of lithium occluded in the positive electrode before the charging, in the subsequent discharging reaction. This is because a part of the electric capacity consumed in the charging in the negative electrode is consumed in side reactions and competitive reactions but is not consumed in the reaction in which lithium is occluded, that is, the reaction in which lithium is occluded as the dischargeable capacity.

Since such charging and discharging reactions occur, the positive electrode potential in the discharging cutoff state goes to a side higher than the original potential before the charging and discharging reactions, and the negative electrode potential also goes to a side higher than the original potential before the charging and discharging reactions. This is because all lithium emitted in the charging process of the positive electrode is not occluded (is not returned) during the discharging, the potential has gone in the higher direction in the charging process cannot be returned to the original positive electrode potential by the amount corresponding to the difference in the charging and discharging efficiency between the positive electrode and the negative electrode even when it goes in the lower direction in the discharging process, and thus the discharging is cutoff at a potential higher than the original positive electrode potential. As described above, the discharging of a lithium ion secondary battery is completed when the battery voltage (that is, the difference between the positive electrode potential and the negative electrode potential) reaches a predetermined value (the discharging cutoff voltage). Accordingly, when the potential of the positive electrode at the time point of cutting off the discharging becomes higher, the potential of the negative electrode also goes in the higher direction by the same amount.

As described above, when such a type of battery repeats the charging and discharging cycles, there is a problem in that the capacity obtained within a predetermined voltage range (within the range of the discharging cutoff voltage and the charging cutoff voltage) degrades due to the change in operational range of the capacity of the positive and negative electrodes. The reaction mechanism of such a capacity degradation has been reported in academic societies (Non-Patent documents 1 and 2). The positive electrode potential and the negative electrode potential of which the operational ranges once changed are irreversible and cannot be returned to the original state, and the fact that there is no means for recovering the capacity makes this problem severe.

The reaction mechanism of capacity degradation occurring when the charging and discharging cycles are repeated is basically the same as the reaction mechanism of capacity degradation when a battery is stored in a charged state or the reaction mechanism of capacity degradation when the floating-charging is performed. First, when a battery is stored in a charged state, it is known that the capacity consumed in side reactions and competitive reactions occurring in the charged state, that is, the self-discharged capacity, is larger in the negative electrode than in the positive electrode and thus the operational ranges of capacity of the positive and negative electrodes are changed before and after storage, thereby causing the battery capacity after storage to degrade (Non-Patent document 3). Similarly to the difference in charging and discharging efficiency between the positive electrode and the negative electrode, the difference in self-discharging rate between the positive electrode and the negative electrode in the charged state results from the fact that the rates of the side reactions and the competitive reactions occurring in the negative electrode in the charged state are similarly higher than the rates of the side reactions and the competitive reactions occurring in the positive electrode in the charged state.

When floating-charging is performed, the positive electrode potential and the negative electrode potential continue to be charged with predetermined potentials in the initial charging period. However, the current value (the leak current in the positive electrode) necessary for maintaining the positive electrode potential at the potential and the current value (the leak current in the negative electrode) necessary for maintaining the negative electrode potential at the potential are actually different from each other. Therefore, when the floating charging is performed, the leak current in the negative electrode is greater than the leak current in the positive electrode, and thus the negative electrode potential migrates in a direction in which the leak current decreases, that is, in the higher direction, and the positive electrode potential goes in a direction in which the leak current increases, that is in the higher direction. In this way, when the floating charging is performed, there is a problem in that the operational ranges of capacity of the positive electrode and the negative electrode are irreversibly changed and the battery capacity degrades.

A "raw coke composition obtained by coking a heavy oil composition through the use of a delayed coking process" is generally known as a raw material of the negative electrode material of a lithium ion secondary battery. The delayed coking process is very suitable for mass-producing high-quality carbon materials, and various types of coke mass-products are produced through the use of this process. Graphite materials obtained through graphitization such that the crystallite size Lc(112) of the (112) diffraction line measured through the use of a wide-angle X-ray diffraction method is 4 nm or more are generally used as the graphite material of the negative electrode of the lithium ion secondary batteries (for example, see Patent document 1).

A graphite material obtained by pulverizing and classifying a raw coke composition so as to have a predetermined particle size distribution and performing a mechanochemical process on the product to cause crystals to highly develop at a temperature of 2800° C. or higher under an atmosphere of inert gas and a manufacturing method thereof are generally known (for example, see Patent document 2).

In Patent document 2, it is mentioned that the crystalline structure of the particle surface layer can be disturbed by pulverizing and classifying a raw coke composition and then performing the mechanochemical process (see Paragraph [0024] of Patent document 2). Since this disturbance of the crystalline structure remains as unorganized carbon even after the graphitization as the final process, the initial charging and discharging efficiency of the negative electrode can be improved (see Paragraph [0024] of Patent document 2), but there is a problem in that the reliability of the battery cannot be improved.

It has been reported that the crystalline structure of the surface of the graphite particles can be disturbed by applying a compressive shearing stress thereon using scale-like natural graphite as the negative electrode material of the battery (for example, see Non-Patent document 4). It has been reported that the disturbance of the crystalline structure of the graphite particle surface can improve the initial charging and discharging efficiency of the negative electrode (Paragraph of Patent document 2).

However, when mechanical energy based on a compressive shearing stress is applied to the graphite particles, the compressive shearing stress is applied to the particle surface to cut carbon-carbon bonds around the particle surface and to expose edge portions from the cut portions. Accordingly, it is thought that the graphite material in which many edge portions are exposed from the particle surfaces is obtained. In a lithium ion secondary battery using the graphite material as the negative electrode material, since the electrolyte in the edge portions exposed from the particle surfaces of the negative electrode is decomposed to increase the leak current in the negative electrode and to increase the difference from the leak current in the positive electrode, there is a problem in that the capacity retention rate (storage characteristics) is greatly lowered when the battery is held at high temperatures or normal temperatures for a long time.

In lithium ion secondary batteries manufactured using a graphite negative electrode with a highly crystalline structure, high electric capacity is obtained. However, when such a graphite material is used, it is said that a phenomenon in which an electrolyte is co-intercalated between graphite layers formed of reticulated plane with a high degree of parallelism from the edge portions of the crystallites and is then decomposed easily occurs at the same time as inserting lithium into the graphite crystals (Solvent Co-Intercalation Model of Besenhard, see Non-Patent document 5). The charging and discharging efficiency of the negative electrode is lowered by the side reactions and the competitive reactions due to the decomposition of the electrolyte between the graphite layers, thereby causing capacity degradation. It is also said that as the graphite crystals develop further, the solvent co-intercalation occurs more easily. Therefore, a technique of introducing disturbance of a crystalline structure into the particle surfaces through the use of the solvent co-intercalation so as to suppress the decomposition of the electrolyte has been reported. In Patent document 1, it is mentioned that the highly crystalline structure on the particle surfaces can be disturbed by pulverizing and classifying a raw coke composition and then performing the mechanochemical process. Since the introduced disturbance of the crystalline structure remains as an area having a low crystallinity even after the graphitization as the final process, it is mentioned that it is possible to improve the initial charging and discharging efficiency of the negative electrode (Paragraph [0024] of Patent document 2). However, it is thought that the disturbance of the crystalline structure introduced through the mechanochemical process is a so-called isotropic state in which crystallites of unorganized carbon are randomly oriented and many edge portions are exposed from the particle surfaces.

In general, in the edge portions of crystallites, plural dangling bonds, that is, many localized electrons of which valence electron bonds are not saturated and which are present without bonding opponents, are present. On the surface of the carbon material of the negative electrode, that is, in the interface between the electrolyte and the carbon material, in the charging process, it is thought that side reactions and competitive reactions due to the reductive decomposition of the electrolyte based on the catalytic action of the localized electrons occur in addition to the original charging reaction in which lithium is inserted into the graphite crystals, thereby lowering the charging and discharging efficiency of the negative electrode. That is, even when an area having a low crystallinity is introduced into the particle surfaces to suppress the decomposition of the electrolyte due to the solvent co-intercalation, the crystallites in the introduced areas having a low crystallinity are in the isotropic state and thus the edge portions are exposed from the surface to increase the reductive decomposition of the electrolyte, thereby causing the capacity degradation.

The inventors had an idea that the charging and discharging efficiency of the negative electrode can be improved and the storage characteristics of a lithium ion secondary battery can be improved, by employing a graphite material having a structure in which areas having a low crystallinity are introduced into the highly crystalline structure and having small exposure of crystallite edges from particle surfaces, and actively studied to reach the present invention.

PRIOR ART DOCUMENTS

Patent Documents

Patent document 1: Japanese Patent No. 3141818
Patent document 2: Japanese Patent No. 4171259

Non-Patent Documents

Non-Patent document 1: Summary of the 48th Battery Symposium 1A11 (Nov. 13, 2007)
Non-Patent document 2: Symposium Summary of the 76th Japanese Electrochemical Society 1P29 (Mar. 26, 2009)
Non-Patent document 3: Symposium Summary of the 71st Japanese Electrochemical Society 2I07 (Mar. 24, 2004)
Non-Patent document 4: Carbon 2005 No. 217, pp. 99-103
Non-Patent document 5: J. O. Besenhard, M. Winter, J. Yang, W. Biberacher., J. Power Sources, 1995, Vol. 54, p. 228

SUMMARY OF THE INVENTION

Problems to be solved by the Invention

The present invention is directed to suppression of the above-mentioned decrease in capacity retention rate of a lithium ion secondary battery and an object thereof is to provide a negative electrode material of a lithium ion secondary battery for vehicles, industries, and power storage infrastructure requiring high reliability by developing a graphite material for a negative electrode which can suppress capacity degradation due to repetition of charging and discharging cycles, storage in a charged state, floating charging, and the like.

Means for Solving the Problems

In general, in edge portions of crystallites, many localized electrons of which plural dangling bonds, that is, valence electron bonds, are not saturated and which are present without bonding opponents, are present. On the surface of the carbon material of the negative electrode, that is, the interface between the electrolyte and the carbon material, in the charging process, it is presumed that side reactions and competitive reactions due to the reductive decomposition of the electrolyte based on the catalytic action of the localized electrons occur in addition to the original charging reaction in which lithium is inserted into the graphite crystals, thereby lowering the charging and discharging efficiency of the negative electrode. By greatly reducing the crystallite edges exposed from the particle surfaces of the graphite, it was thought that the charging and discharging efficiency of the negative electrode can be improved to enhance the reliability of the lithium ion secondary battery, and the present invention has been made through active study thereof.

According to a first aspect of the invention, there is provided a graphite material for a negative electrode of a lithium ion secondary battery, which is obtained by graphitizing a graphite precursor in which a compressive stress and a shearing stress are applied to a pulverized and classified raw coke composition and in which a crystallite size $Lc(112)$ of a (112) diffraction line measured through the use of a wide-angle X-ray diffraction method is 4 nm or more, wherein the raw coke composition is obtained by coking a heavy oil composition through the use of a delayed coking process, has an atomic ratio H/C of hydrogen atoms H and carbon atoms C in a range of 0.30 to 0.50 and has a microstrength of 7 wt % to 17 wt %.

According to a second aspect of the invention, there is provided a method of manufacturing a graphite material for a negative electrode of a lithium ion secondary battery, comprising at least: a step of pulverizing and classifying a raw coke composition obtained by coking a heavy oil composition through the use of a delayed coking process; a step of applying a compressive stress and a shearing stress to the pulverized and classified raw coke composition to obtain a graphite precursor; and a step of graphitizing the graphite precursor by heating to obtain a graphite material in which a crystallite size Lc(112) of a (112) diffraction line measured through the use of a wide-angle X-ray diffraction method is 4 nm or more, wherein the pulverized and classified raw coke composition has an atomic ratio H/C of hydrogen atoms H and carbon atoms C in a range of 0.30 to 0.50 and has a microstrength of 7 wt % to 17 wt %.

According to a third aspect of the invention, there is provided a lithium ion secondary battery comprising the graphite material manufactured using this manufacturing method as a material of a negative electrode.

According to a fourth aspect of the invention, there is provided a method of manufacturing a graphite material for a negative electrode of a lithium ion secondary battery, comprising at least: a step of pulverizing and classifying a raw coke composition obtained by coking a heavy oil composition through the use of a delayed coking process to obtain a powder of the raw coke composition; a step of heating the pulverized and classified powder of the raw coke composition to obtain a carbonized composition; a step of graphitizing the carbonized composition by heating to obtain graphite particles in which a crystallite size Lc(112) of a (112) diffraction line measured through the use of a wide-angle X-ray diffraction method is 4 nm or more; and a step of applying a compressive shearing stress to the graphite particles to obtain a graphite material, wherein the pulverized and classified raw coke composition has an atomic ratio H/C of hydrogen atoms H and carbon atoms C in a range of 0.30 to 0.50 and has a microstrength of 7 wt % to 17 wt %.

According to a fifth aspect of the invention, there is provided a lithium ion secondary battery comprising the graphite material manufactured using this manufacturing method as a material of a negative electrode.

According to a sixth aspect of the invention, there is provided a method of manufacturing a graphite material for a negative electrode of a lithium ion secondary battery, comprising at least: a step of applying a compressive shearing stress to a mixture of a raw coke composition, which is obtained by coking a heavy oil composition through the use of a delayed coking process and has an atomic ratio H/C of hydrogen atoms H and carbon atoms C in a range of 0.30 to 0.50 and a microstrength of 7 to 17 wt %, and a calcined coke with an average particle diameter of 0.1 μm to 3.0 μm and in a range of 0.5 wt % to 10 wt % with respect to the raw coke composition to obtain a compound powder in which the calcined coke is embedded in particle surfaces of the raw coke composition; a step of heating the compound powder to obtain a carbonized composition; and a step of graphitizing the carbonized composition by heating to obtain a graphite material in which a crystallite size Lc(112) of a (112) diffraction line measured through the use of a wide-angle X-ray diffraction method is in a range of 4 nm to 30 nm.

According to a seventh aspect of the invention, there is provided a lithium ion secondary battery comprising the graphite material manufactured using this manufacturing method according to the sixth aspect as a material of a negative electrode.

According to an eighth aspect of the invention, there is provided a method of manufacturing a graphite material for a negative electrode of a lithium ion secondary battery, comprising at least: a step of applying a compressive shearing stress to a mixture of a raw coke composition, which is obtained by coking a heavy oil composition through the use of a delayed coking process and has an atomic ratio H/C of hydrogen atoms H and carbon atoms C in a range of 0.30 to 0.50 and a microstrength of 7 to 17 wt %, and an acetylene black of 0.5 wt % to 10 wt % with respect to the raw coke composition to obtain a compound powder in which the acetylene black is embedded in particle surfaces of the raw coke composition; a step of heating the compound powder to obtain a carbonized composition; and a step of graphitizing the carbonized composition by heating to obtain a graphite material in which a crystallite size Lc(112) of a (112) diffraction line measured through the use of a wide-angle X-ray diffraction method is in a range of 4 nm to 30 nm.

According to a ninth aspect of the invention, there is provided a lithium ion secondary battery comprising the graphite material manufactured using this manufacturing method according to the eighth aspect as a material of a negative electrode.

Advantageous Effect of the Invention

The graphite material according to the invention can suppress capacity degradation of a lithium ion secondary battery and can provide a negative electrode material of a lithium ion secondary battery having high reliability.

The graphite material obtained using the manufacturing method according to the invention can suppress a decrease in the capacity retention rate of a lithium ion secondary battery and can be suitably used as a negative electrode material of a lithium ion secondary battery having excellent storage characteristics.

When lithium is intercalated between graphite layers having a highly crystalline structure and having a high degree of parallelism of reticulated plane, a solvent is simultaneously intercalated between the graphite layers and is decomposed. In order to suppress the decomposition of the electrolyte described in the solvent co-intercalation model, it is necessary to perform treatment of partially introducing areas having a low crystallinity into the highly crystalline structure of the graphite material to suppress the solvent co-intercalation. In the areas having a low crystallinity, the degree of parallelism of the reticulated plane is low and thus the electrolyte solution is not solvent-co-intercalated between the graphite layers well.

The inventors pulverized and classified a raw coke composition, which is obtained by coking a heavy oil composition through the use of a delayed coking process and which has an atomic ratio H/C of hydrogen atoms H and carbon atoms C in a range of 0.30 to 0.50 and a microstrength of 7 wt % to 17 wt %, to obtain particles of the raw coke composition, mixing the raw coke composition with a calcined coke with an average particle diameter of 0.1 μm to 3.0 μm at a ratio of the calcined coke to the raw coke composition of 0.5 wt % to 10 wt %, applying a compressive shearing stress thereto to obtain a compound powder in which the calcined coke is embedded in particle surfaces of the raw coke composition, and carbonizing and graphitizing the compound powder to obtain a graphite material for a negative electrode of a lithium ion secondary battery. In the manufacturing method according to the invention, it is possible to obtain a graphite material having a structure in which areas having a low crystallinity are partially introduced into the highly crystalline structure and in which edge portions exposed from the particle surfaces are reduced. Therefore, when the graphite material obtained using the manufacturing method according to the invention is used as a negative electrode material of a lithium ion secondary battery, it is possible to suppress the decomposition of an electrolyte and thus to obtain a lithium ion secondary battery having an excellent service life characteristic.

The inventors pulverized and classified a raw coke composition, which is obtained by coking a heavy oil composition through the use of a delayed coking process and which has an atomic ratio H/C of hydrogen atoms H and carbon atoms C in a range of 0.30 to 0.50 and a microstrength of 7 wt % to 17 wt %, to obtain particles of the raw coke composition, mixing the raw coke composition with an acetylene black at a ratio of the acetylene black to the raw coke composition of 0.5 wt % to 10 wt %, applying a compressive shearing stress thereto to obtain a compound powder in which the acetylene black is embedded in particle surfaces of the raw coke composition, and carbonizing and graphitizing the compound powder to obtain a graphite material for a negative electrode of a lithium ion secondary battery. In the manufacturing method according to the invention, it is possible to obtain a graphite material having a structure in which areas having a low crystallinity are partially introduced into the highly crystalline structure and in which edge portions exposed from the particle surfaces are reduced. Therefore, when the graphite material obtained using the manufacturing method according to the invention is used as a negative electrode material of a lithium ion secondary battery, it is possible to suppress the decomposition of an electrolyte and thus to obtain a lithium ion secondary battery having an excellent service life characteristic.

MODE FOR CARRYING OUT THE INVENTION

Figure 1:
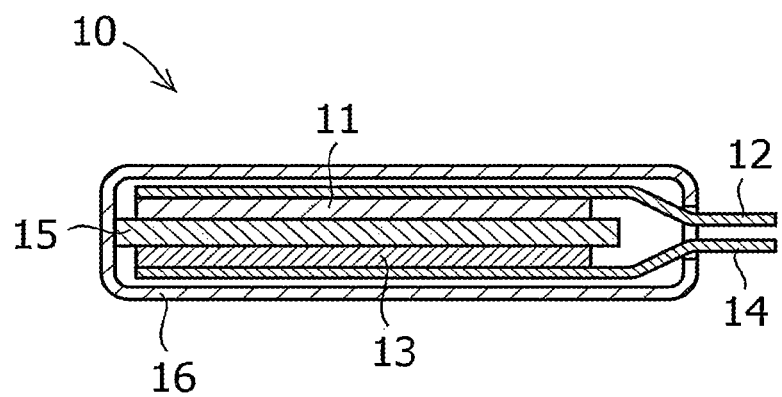
FIG. 1 is a cross-sectional view of a laminated packed battery.

Hereinafter, a first embodiment to a third embodiment of the invention will be described in detail.

In a graphite material according to the invention, the crystallite size Lc(112) of a (112) diffraction line which is measured through the use of a wide-angle X-ray diffraction method is set to 4 nm or more. The reason for setting to 4 nm or more is that a graphite material having highly developed crystals in this way can secure a reversible capacity of 340 mAh/g or more. This is the same as the reason that a material having the highly developed crystals is preferably used as a negative electrode material used in such a type of battery. It is known that the more highly the crystals develop, the greater the capacity that is obtained, which is described, for example, in paragraph [0005] of Patent document 1. When the crystal-lite size Lc(112) of a (112) diffraction line which is measured through the use of a wide-angle X-ray diffraction method is less than 4 nm, the development of crystals is not sufficient and only a small reversible capacity is obtained, which is not desirable.

A raw coke composition used to form the graphite material according to the invention has a ratio of hydrogen atoms H and carbon atoms C, that is, an atomic ratio H/C, in a range of 0.30 to 0.50 and a microstrength of 7 wt % to 17 wt %. By using the raw coke composition having such physical properties as a source material, a graphite material having very small crystallite edges on the particle surface layers after graphitization (very little disturbance of the crystals in the particle surface layers after graphitization) is obtained. As described above, the disturbance in crystalline structure of the particle surface layer described in Patent document 2 can improve the initial charging and discharging efficiency of a negative electrode, but causes a problem with capacity degradation, thereby causing a disadvantage that the later reliability of a battery cannot be improved.

The H/C of the raw coke composition is a ratio of a value obtained by dividing the total hydrogen content (TH (wt %)) by the atomic weight of hydrogen to a value obtained by dividing the total carbon content (TC (wt %)) by the atomic weight of carbon.

The total hydrogen content is measured from the moisture content, which is generated from a combustion gas obtained by completely combusting a sample in an oxygen flow at 750° C., using a coulometric titration method (Karl-Fisher method). In the Karl-Fisher method of a coulometric titration formula, by inputting an electrolyte solution including iodide ions, sulfur dioxide, a base (RN), and alcohol at major components to a titration cell in advance and inputting a sample to the titration cell, the moisture in the sample reacts as shown in Formula 4. The sample is measured, for example, after being subjected to a coking process and then being cooled in a dry atmosphere.

[Chem. 2]

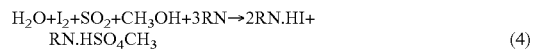

$$H_2O+I_2+SO_2+CH_3OH+3RN \rightarrow 2RN.HI+ RN.HSO_4CH_3 \quad (4)$$

Iodine necessary for this reaction is obtained by causing iodide ions to electrochemically react (two-electron reaction) as shown in Formula 5.

[Chem. 3]

$$2I^- - 2e^- \rightarrow I_2 \quad (5)$$

Since 1 mole of water and 1 mole of iodine react, the quantity of electricity necessary for titrating 1 mg of water is calculated as shown in Formula 6 on the basis of a Faraday's law.

Numerical Expression 1

$$(2 \times 96478)/(18.0153 \times 103) = 10.71 \text{ Coulomb} \quad (6)$$

Here, the constant 96478 is the Faraday constant and 18.0513 is the molecular weight of water.

The moisture content is obtained by measuring the quantity of electricity necessary for producing iodine. The total hydrogen content (TH (wt %)) is calculated by converting the obtained moisture content into a hydrogen content and dividing the hydrogen content by the weight of the sample used for the measurement.

In measurement of the total carbon content, a sample is combusted in an oxygen flow of 1150° C., is converted into carbon dioxide (and some carbon monoxide), and is carried by the surplus oxygen flow, and the total carbon content (TC (wt %)) is calculated by a $CO_2+CO$ infrared detector.

A microstrength is a value representing the weight of the sample on a sieve by percentage after inputting 2 g of the sample of 20 to 30 mesh and 12 steel balls with a diameter of ⁵⁄₁₆ inch (7.9 mm) to a steel cylinder (with an inner diameter of 25.4 mm and a length of 304.8 mm), rotating a vertical plane in a direction perpendicular to the tube at 25 rpm by 800 turns (that is, rotating the cylinder in a state in which the rotation axis is set horizontally so as to trade places vertically as if rotating a propeller), and then sieving the resultant with a 48 mesh.

When the raw coke composition with an atomic ratio H/C of 0.30 to 0.50 is pulverized and classified so as to have a predetermined particle size and a compressive stress and a shearing stress are applied thereto, the hexagonal mesh sheet of an appropriate size constituting the raw coke composition is oriented so as to cause crystallite edges not to appear from the particle surfaces, which is particularly desirable. Since the hexagonal mesh sheet is easily oriented to be perpendicular to the stress application direction, a state in which the particle surfaces are covered with the reticulated plane can be realized and the crystallite edges located in the vertical direction of the hexagonal mesh sheet present are not easily present in the particle surfaces. Accordingly, the crystallite edges present on the particle surfaces after the graphitization are very small and unorganized carbon serving as a factor in the reliability degradation of the battery can be greatly reduced.

When the atomic ratio H/C of the raw coke composition is less than 0.30, the area of the hexagonal mesh sheet constituting the raw coke composition is large and the pulverized particle shape is anisotropic, which is not desirable. Here, the anisotropic property means a property in which the area of the hexagonal mesh sheet and the area of the crystallite edge on the particle surface can be easily separated from each other. In this case, an area in which the crystallite edges are collected is present on the particle surface. Accordingly, even when a compressive stress and a shearing stress are applied to the particles thereafter, it is not possible to promote the orientation of the hexagonal mesh sheet on the particle surface. When the raw coke composition is graphitized in this particle state, the crystallite edges can be easily exposed from the surface to lower the reliability of the battery, which is not desirable.

In contrast, when the atomic ratio H/C of the raw coke composition is more than 0.50, the structure of a carbon skeleton thereof is not sufficiently formed. Accordingly, a meltdown occurs in a carbonized and/or graphitized step thereafter, the three-dimensional laminated arrangement of the reticulated plane is greatly disturbed, and the crystallite edges easily appear on the particle surfaces after the graphitization, which is not desirable. In this case, when the raw coke composition is pulverized and classified so as to have a predetermined particle size, a compressive stress and a shearing stress are applied thereto, and the hexagonal mesh sheet of an appropriate size is oriented so as to cause the crystallite edges not to appear on the particle surface, the raw coke composition cannot be graphitized with the three-dimensional arrangement maintained. Accordingly, the crystallite edges can be easily exposed from the particle surfaces after the graphitization, which is not desirable.

As described above, the H/C of the raw coke composition is limited to 0.30 to 0.50. By pulverizing and classifying the raw coke composition having a physical property in this range so as to have a predetermined particle size and applying a compressive stress and a shearing stress thereto, it is possible to realize a state in which very few crystallite edges are present on the particle surfaces after the graphitization.

The microstrength of the raw coke composition is in a range of 7 wt % to 17 wt %. The microstrength is an index indicating the bonding strength between neighboring crystallites. In general, unorganized carbons having a structure other than a benzene ring serving as a constituent unit of the hexagonal mesh sheet are present between neighboring crystallites and have a function of bonding the neighboring crystallites. The unorganized carbons remain and perform the same function even after the raw coke composition is carbonized and/or graphitized.

When the microstrength of the raw coke composition is less than 7 wt %, it means that the bonding strength between the neighboring crystallites is very small. When such a raw coke composition is pulverized and classified so as to have a predetermined particle size and a compressive stress and a shearing stress are applied thereto, a hexagonal mesh sheet of an appropriate size constituting the raw coke composition is oriented so as to cause the crystallite edges not to appear on the particle surfaces, as described above, and thus a structure which is desirable as the state of the raw coke composition is realized. However, when the raw coke composition is carbonized and/or graphitized therefore, the bonding strength between the crystallites is small, the structure of the particle surfaces of the raw coke composition is thus not maintained, the anisotropic property of the particle shape after the graphitization becomes stronger, and the edges are more easily exposed from the particle surfaces, which is not desirable. This is because the bonding strength between the crystallites in the state of the raw coke composition is less than the stress due to the development of the crystallites with the graphitization.

When the microstrength of the raw coke composition is greater than 17 wt %, the bonding strength between the neighboring crystallites becomes extremely greater. This is because an unorganized carbon present between the neighboring crystallites constructs a strong three-dimensional chemical bond to the neighboring crystallites. Here, the unorganized carbon means a carbon not attached to a carbon hexagonal mesh sheet and is characterized in that it is a carbon atom which is slowly received in the carbon hexagonal mesh sheet with a rise in processing temperature while preventing the growth or the selective orientation of the neighboring carbon crystallites. Even when the raw coke composition is pulverized and classified so as to have a predetermined particle size and a compressive stress and a shearing stress are applied thereto, the hexagonal mesh sheet is not easily oriented on the particle surface, which is not desirable. This is because the crystallites are strongly bonded to each other. When a compressive stress and a shearing stress greater than the bonding strength are applied thereto, the probability of pulverizing a particle increases even by forming a structure in which a hexagonal mesh sheet of an appropriate size is oriented on the particle surface. As a result, even when a particle is cracked or not cracked, the crystallite edges are easily exposed from the particle surface, which is not desirable.

As described above, the microstrength of the raw coke composition is limited to the range of 7 wt % to 17 wt %. When a raw coke composition having a physical property within this range is pulverized and classified and a compressive stress and a shearing stress are applied thereto, a state in which a hexagonal mesh sheet of an appropriate size is oriented on the particle surface can be maintained even after the carbonization and/or graphitization. As a result, it is possible to obtain a graphite material in which very few crystallite edges are present in the particle surface layer after the graphitization (very little crystal disturbance is presents in the particle surface layer after the graphitization). When this carbon material is used for a negative electrode of a lithium ion secondary battery, it is possible to secure very high reliability.

In this way, when a raw coke composition having an atomic ratio H/C of 0.30 to 0.50 and a microstrength of 7 wt % to 17 wt % is pulverized and classified so as to have a predetermined particle size and a compressive stress and a shearing stress are applied thereto, crystallites with an appropriate size are oriented so that a hexagonal mesh sheet is located on the particle surface, and the surface structure can be maintained even after the subsequent carbonization and/or graphitization.

In the past, there was no example in which a graphite material produced using a desulfurized deasphalted oil as a source material is used as a negative electrode material of a lithium ion secondary battery. The invention can provide a desired graphite material by mixing a desulfurized deasphalted oil as a preferable aspect of a base oil composition to obtain a raw coke composition having a predetermined atomic ratio H/C and a predetermined microstrength.

The raw coke composition used in the invention is obtained by coking a heavy oil composition through the use of a delayed coking process.

Examples of the components of a heavy oil composition include a bottom oil (fluid catalytic cracking decant oil (FCC DO)) of a fluid catalytic cracker, an aromatic content extracted from the fluid catalytic cracking decant oil, hydrodesulfurized oil obtained by performing a hydrodesulfurization process on a heavy oil, a vacuum residual oil (VR), a desulfurized deasphalted oil, coal-derived liquid, a coal solvent-extracted oil, an atmospheric residual oil, a shell oil, a tar sand bitumen, a naphtha-tar pitch, an ethylene bottom oil, a coal-tar pitch, and heavy oils obtained by hydrogenating them. When two or more types of the heavy oils are blended to prepare a heavy oil composition, the blending ratio can be appropriately adjusted depending on the features and states of a base oil to be used so that the physical properties of the raw coke composition obtained by coking the raw coke composition through the use of a delayed coking process include an atomic ratio H/C of 0.30 to 0.50 and a microstrength of 7 wt % to 17 wt %. The features and states of the base oil vary depending on the type of a crude oil, the processing conditions until the base oil is obtained from the crude oil, and the like.

The bottom oil of the fluid catalytic cracker is a bottom oil of a fluidized-bed fluid catalytic cracker for selectively performing a decomposition reaction using a catalyst and using a vacuum gas oil as a base oil to obtain high-octane FCC gasoline. The vacuum gas oil used as the base oil is preferably a desulfurized vacuum gas oil (preferably with a sulfur content of 500 wt ppm or less and a density of $0.8/cm^3$ or more at 15° C.) obtained by directly desulfurizing an atmospheric distillation residual oil.

The aromatic content extracted from the fluid catalytic cracking decant oil is an aromatic content when a component is selectively extracted using dimethylformamide or the like and is divided into an aromatic content and a saturated content.

The hydrodesulfurized oil obtained by performing a high hydrodesulfurization process on a heavy oil is, for example, a heavy oil with a sulfur content of 1.0 wt % or less, a nitrogen content of 0.5 wt % or less, an aromatic carbon content (fa) of 0.1 or more which is obtained by performing a hydrodesulfurization process on a heavy oil with a sulfur content of 1 wt % or more at a hydrogen partial pressure of 10 MPa or more. The hydrodesulfurized oil is preferably a hydrodesulfurized oil obtained by hydrodesulfurizing an atmospheric distillation residual oil in the presence of a catalyst so as to have a hydrocracking ratio of 25% or less.

The vacuum residual oil (VR) is a bottom oil of a vacuum distillator obtained by inputting a crude oil to an atmospheric distillatory to obtain gases, a light oil, and an atmospheric residual oil and then changing the atmospheric residual oil, for example, at a reduced pressure of 10 to 30 Torr in a heating furnace outlet temperature range of 320° C. to 360° C.

The desulfurized deasphalted oil is obtained by processing an oil such as a vacuum distillation residual oil by the use of a solvent deasphalting apparatus using propane, butane, pentane, or a mixture thereof as a solvent, removing the asphaltene content, and desulfurizing the obtained deasphalted oil (DAO) preferably up to a sulfur content of 0.05 wt % to 0.40 wt % using an indirect desulfurizer (Isomax) or the like.

The atmospheric residual oil is a fraction having the highest boiling point which is obtained by inputting a crude oil to an atmospheric distillatory and fractionally distilling the crude oil into gases and LPG, a gasoline fraction, a lamp oil fraction, a light oil fraction, and an atmospheric residual oil depending on the boiling points of the fractions. The heating temperature varies depending on the producing area of the crude oil or the like and is not particularly limited as long as the crude oil can be fractionally distilled into the fractions. For example, the crude oil is heated at 320° C.

A preferable example of heavy oil composition is a heavy oil composition satisfying three conditions of (1) an aromatic content ratio (aromatic index) fa of 0.3 to 0.65, (2) a normal paraffin content of 5 wt % to 20 wt %, and (3) a content of a desulfurized deasphalted oil of 7 wt % to 15 wt %.

The heavy oil is processed at high temperatures to cause pyrolytic reactions and polycondensation reactions and a green coke is produced through a process of producing a large liquid crystal called a mesophase as an intermediate product.

At this time, a base oil composition including all of (1) a heavy oil component forming an excellent bulk mesophase, (2) a heavy oil component which can produce a gas having a function of limiting the size of a hexagonal mesh laminate constituting a mesophase when carbonizing and solidifying the bulk mesophase by polycondensation, and (3) a component bonding the cut hexagonal mesh laminates to each other can be particularly preferably used. The (1) heavy oil component forming an excellent bulk mesophase is a component giving an aromatic index fa of 0.3 to 0.65, the (2) heavy oil component which can produce a gas is a component corresponding to the normal paraffin content of 5 wt % to 20 wt %, and the (3) component bonding the hexagonal mesh laminates is a desulfurized deasphalted oil contained in the range of 7 wt % to 15 wt %.

The reason for using such a heavy oil composition as a source material of the raw coke composition of the invention is that a hexagonal mesh sheet formed by the heavy oil component producing an excellent bulk mesophase is limited to a relatively small size to keep the degree of parallelism between the neighboring mesh sheets of the hexagonal mesh laminate formed after the coking high and the desulfurized deasphalted oil appropriately bonds the neighboring hexagonal mesh laminates to each other.

The aromatic carbon content ratio (aromatic index) (fa) can be obtained through the use of a Knight method. In the Knight method, a carbon distribution is divided into three components $(A_1, A_2, A_3)$ in a spectrum of an aromatic carbon using a $^{13}$C-NMR method. Here, $A_1$ represents the number of carbons in an aromatic ring and substituted aromatic carbons and a half of non-substituted aromatic carbons (corresponding to peaks of about 40 to 60 ppm of $^{13}$C-NMR), $A_2$ represents the other half of the non-substituted aromatic carbons (corresponding to peaks of about 60 to 80 ppm of $^{13}$C-NMR), and $A_3$ represents the number of aliphatic carbons (corresponding to peaks of about 130 to 190 ppm of $^{13}$C-NMR). From these, fa is obtained using the following expression.

Numerical Expression 2

$$fa=(A_1+A_2)/(A_1+A_2+A_3)$$

It is described in the Document ("Characterization of Pitches II. Chemical Structure", Yokono, Sanada, (Carbon, 1981 (No. 105), pp. 73-81) that the $^{13}$C-NMR method is the best method capable of quantitatively calculating the most basic quantity fa of a pitch-based chemical structure parameter.

The content of normal paraffin in the base oil composition means a value measured through the use of gas chromatography using a capillary column. Specifically, verification is performed using a standard reference material of normal paraffin and then a sample of a non-aromatic components separated by the elution chromatography is measured using the capillary column. The content based on the total weight of the base oil composition can be calculated from this measured value.

When the aromatic index fa of the heavy oil composition is less than 0.3, the yield of coke from the heavy oil composition is extremely lowered, an excellent bulk mesophase is not formed, and it is difficult to develop a crystalline structure in spite of the carbonization and graphitization, which is not desirable. When fa is more than 0.65, plural mesophases are rapidly generated in a matrix in the course of producing a green coke and rapid combination of mesophases is more repeated than single growth of mesophases. Accordingly, since the combination rate of the mesophases is higher than the generation rate of gases from the normal paraffin-containing component, it is not possible to limit a hexagonal mesh sheet of a bulk mesophase to a small size, which is not desirable.

The aromatic index fa of the heavy oil composition is preferably in a range of 0.3 to 0.65. Here, fa can be calculated from a density D and a viscosity V of a heavy oil composition, and fa of a heavy oil composition with a density D of 0.91 to 1.02 g/cm$^3$ and with a viscosity V of 10 to 220 mm$^2$/sec is preferably in a range of 0.3 to 0.65.

The normal paraffin component appropriately included in the heavy oil composition performs an important function of limiting a bulk mesophase to a small size by generating gases during the coking process as described above. The generation of gases also serves to uniaxially orient neighboring mesophases limited to a small size and to selectively orient the overall system. When the content of the normal paraffin-containing component is less than 5 wt %, mesophases grow more than necessary and large carbon reticulated plane are formed, which is not desirable. When the content of the normal paraffin-containing component is more than 20 wt %, excessive gases are generated from the normal paraffin, the orientation of the bulk mesophase tends to be disturbed in the opposite direction, and it is thus difficult to develop the crystalline structure in spite of the carbonization and graphitization, which is not desirable. As described above, the content of the normal paraffin is preferably in a range of 5 wt % to 20 wt %.

The desulfurized deasphalted oil serves to appropriately combine the neighboring hexagonal mesh laminates as described above, and the content in the heavy oil composition is preferably in a range of 7 wt % to 15 wt %. When the content of the desulfurized deasphalted oil is less than 7 wt % or more than 15 wt %, the microstrength of the heavy oil composition obtained after the coking process may be less than 7 wt % or more than 17 wt %, which is not desirable.

Examples of the heavy oil composition satisfying three conditions of (1) the aromatic index fa of 0.3 to 0.65, (2) the normal paraffin content of 5 wt % to 20 wt %, and (3) the desulfurized deasphalted oil of 7 wt % to 15 wt % include heavy oil compositions including two or more types selected from a group consisting of a hydrodesulfurized oil, a fluid catalytic cracking decant oil, and a desulfurized deasphalted oil. Preferably, the hydrodesulfurized oil and the fluid catalytic cracking decant oil are included at a weight ratio of 1:3 to 1:5 and including the desulfurized deasphalted oil in a range of 7 wt % to 15 wt % (with respect to 100 wt % of the overall composition including the desulfurized deasphalted oil).

There is no example in which the desulfurized deasphalted oil is added during manufacturing the green coke, and it comes as a surprise that containing the desulfurized deasphalted oil is effective.

The heavy oil composition having this feature is coked to form the raw coke composition in the invention. A delayed coking method can be preferably used as a method of coking a heavy oil composition satisfying a predetermined condition. More specifically, a method of heating a base oil composition to obtain a green coke through the use of a delayed coker under the condition of a controlled coking pressure can be preferably used. The preferable operating conditions of the delayed coker include a pressure of 0.1 MPa to 0.8 MPa and a temperature of 400° C. to 600° C.

The reason for setting the preferable range of the operating pressure of a coker is that the emission speed of gases generated from the normal paraffin-containing component to the outside of the system can be controlled by the use of the pressure. As described above, since the size of the carbon reticulated plane constituting a mesophase is controlled by the use of the generated gases, the residence time of the generated gases in the system serves as an important control parameter for determining the size of the reticulated plane. The reason for setting the preferable range of the coker operating temperature is that it is a temperature necessary for causing a mesophase to grow from a heavy oil adjusted to achieve the advantageous effect of the invention.

The raw coke composition obtained in this way is pulverized and classified so as to have a predetermined particle size. The particle size is preferably equal to or less than 30 μm and more preferably in a range of 5 μm to 30 μm in terms of an average particle diameter. This is because this particle size range is generally and suitably used for a negative carbon material of a lithium ion secondary battery. The average particle diameter is measured by the use of a laser-diffraction particle size analyzer.

By heating (carbonizing and/or graphitizing) a graphite precursor obtained by applying a compressive stress and a shearing stress to the pulverized and classified raw coke composition, the graphite material according too the invention is obtained. At this time, in addition to the compressive stress and the shearing stress, collision, friction, rheological stresses, and the like are also generated. The mechanical energy provided by these stresses is larger than the energy provided by general agitation, and these types of energy are given to the particle surfaces, thereby exhibiting an effect called a mechanochemical phenomenon such as spheronization of particle shapes and complexing of particles. In order to provide the mechanical energy for causing the mechanochemical phenomenon to the raw coke composition, an apparatus capable of simultaneously applying shearing, compression, collision stresses, and the like has only to be used and the structure and principle of the apparatus are not particularly limited. Examples of such an apparatus include a ball type kneader such as rotary ball mill, a wheel type kneader such as an edge runner, a hybridization system (made by Nara Machinery Co., Ltd.), a mechano-fusion (made by Hosokawa Micron Corporation), a NOBILTA (made by Hosokawa Micron Corporation), a COMPOSI (made by Nippon Coke & Engineering Co., Ltd.).

Figure 4:
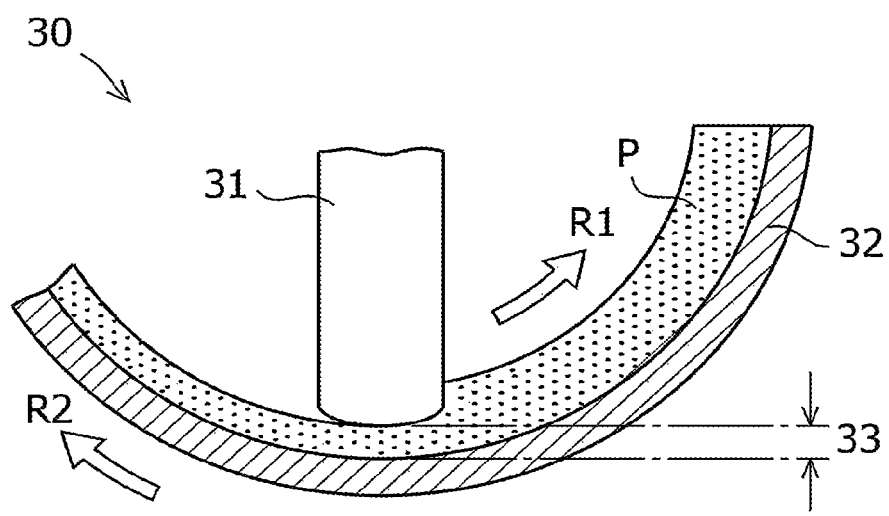
FIG. 4 is a diagram illustrating an operating principle in an example of an apparatus applying a compressive shearing stress.

The manufacturing conditions in the process of applying a compressive stress and a shearing stress differ depending on the apparatus to be used. For example, as shown in FIG. 4, in an apparatus 30 having a structure in which compaction and compressive stresses are added to a powder P in a gap 33 between a rotating blade (in a rotating direction R1) 31 and a housing 32, the peripheral speed of the blade is set to a range of 5 m/s to 100 m/s, the gap therebetween is set to a range of 2 to 20 mm, and the processing time is set to a range of 5 minutes to 120 minutes. The peripheral speed is preferably set to a range of 20 m/s to 80 m/s. When the peripheral speed is equal to or less than 20 m/s, the spheronization effect is not sufficient. When the peripheral speed is greater than 80 m/s, there is a problem in scaling up a machine. An apparatus in which a blade and a housing rotate differently from each other may be used as the apparatus applying a compressive stress and a shearing stress. In this case, the difference in peripheral speed between the blade and the housing can be set to a range of 5 m/s to 100 m/s and preferably a range of 20 m/s to 80 m/s.

When the raw coke composition in the invention is used, a graphite precursor having a higher degree of sphericity is obtained by preferably setting the processing control temperature to a range of 60° C. to 250° C. Particularly, the processing control temperature is preferably set to a range of 120° C. to 200° C. By processing the raw coke composition in the invention in this temperature range, uniform stresses can be easily applied to the particle surfaces and reticulated plane having an appropriate size are selectively oriented in the direction perpendicular to the applied stress on the particle surfaces. Since this selective orientation can be realized in the raw coke composition in the invention, the crystallite edges are not exposed well from the particle surfaces after the graphitization and it is thus possible to improve the reliability as a negative electrode.

The surface treatment of applying a compressive stress and a shearing stress to particles of a raw coke composition is a process of chip out corners of particles and instantaneously attaching the chips to the particles to make the particles round, which is preferably performed such that the appearing particle diameter is hardly changed. Therefore, this process is not pulverization of generating fine powder to reduce the particle diameter. The raw coke composition includes a volatile component and thus has viscosity. This viscosity preferably operates to facilitate the instantaneous attachment of the cut portions to the particles.

By graphitizing the graphite precursor which is obtained by applying a compressive stress and a shearing stress to the raw coke composition so that the crystallite size Lc(112) of a (112) diffraction line measured through the use of a wide-angle X-ray diffraction method is 4 nm or more, the graphite material according to the invention is obtained.

The graphitization method is not particularly limited, but a method of carbonizing (preliminarily calcining) the graphite precursor in the atmosphere of inert gas such as nitrogen, argon, or helium at a highest temperature of 900° C. to 1500° C. for a highest temperature retention time of 0 to 10 hours and performing a heating process in the same atmosphere of inert gas at a highest temperature of 2500° C. to 3200° C. for a highest temperature retention time of 0 to 100 hours can be used. After the graphitization, the resultant can be used as a negative electrode of a lithium ion secondary battery.

The method of manufacturing a negative electrode of a lithium ion secondary battery is not particularly limited but, for example, a method of pressing and shaping a mixture (negative-electrode mixture) including the graphite material according to the invention, a binder (binding agent), a conducting agent if necessary, and an organic solvent in a predetermined size can be used. The method of rolling a material (negative-electrode mixture), which is obtained by kneading the graphite material according to the invention, a binder (binding agent), a conducting agent, and the like in an organic solvent to produce slurry and applying and drying the slurry onto a collector such as a copper foil, and cutting out the resultant in a predetermined size can be also used.

Examples of the binder (binding agent) include polyvinylidene fluoride, polytetrafluoroethylene, and SBR (Styrene-Butadiene Rubber). The content of the binder in the negative-electrode mixture can be appropriately set to a range of about 1 to 30 parts by weight with respect to 100 parts by weight of a carbon material if necessary in design of a battery. Examples of the conducting agent include carbon black, graphite, acetylene black, indium-tin oxide exhibiting conductivity, and conductive polymers such as polyaniline, polythiophene, and polyphenylenevinylene. The content of the conducting agent is preferably in a range of 1 to 15 parts by weight with respect to 100 parts by weight of a carbon material.

Examples of the organic solvent include dimethylformamide, N-methylpyrrolidone, isopropanol, and toluene.

The method of mixing a carbon material, a binder, a conducting agent if necessary, and an organic solvent can employ a known apparatus such as a screw kneader, a ribbon mixer, a universal mixer, and a planetary mixer. The mixture is shaped through roll pressing or press pressing, and the pressure at that time is preferably in a range of 100 MPa to 300 MPa.

The material of the collector is not particularly limited as long as it does not form an alloy with lithium. Examples thereof include copper, nickel, titanium, and stainless steel. The shape of the collector is not particularly limited, but examples thereof include band shapes such as a foil shape, a punched foil shape, and a mesh shape. A porous material such as porous metal (foamed metal) or carbon paper can be used.

The method of applying the slurry onto the collector is not particularly limited, but examples thereof include known methods such as a metal mask printing method, an electrostatic coating method, a dip coating method, a spray coating method, a roll coating method, a doctor blade method, a gravure coating method, a screen printing method, and a die coater method. After the application, a rolling process using a flat press, a calender roll, or the like is generally performed if necessary.

The unification of the negative-electrode slurry formed in a sheet shape or pellet shape and the collector can be performed using known methods such as rolling, pressing, and a combination thereof.

A lithium ion secondary battery using the graphite material for a negative electrode of a lithium ion secondary battery according to this embodiment is obtained, for example, by arranging the negative electrode manufactured as described above and the positive electrode to face each other with a separator interposed therebetween and injecting an electrolyte solution thereto.

The active material used for the positive electrode is not particularly limited, and metal compound, metal oxide, metal sulfide, or a conductive polymer material capable of doping or intercalating lithium ions can be used. Examples thereof include lithium cobalt oxide ($LiCoO_2$), lithium nickel oxide ($LiNiO_2$), lithium manganese oxide ($LiMn_2O_4$), composite oxides ($LiCo_XNi_YMn_ZO_2$, X+Y+Z=1), lithium-vanadium compounds, $V_2O_5$, $V_8O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine $LiMPO_4$ (M:Co, Ni, Mn, Fe), conductive polymers such as polyacetylene, polyaniline, polypyrrole, polythiophene, and polyacene, porous carbons, and mixtures thereof.

For example, an unwoven fabric, a cross, and a porous film including polyolefin such as polyethylene and polypropylene as a major component, or combinations thereof can be used as the separator. When the positive electrode and the negative electrode of a lithium ion secondary battery to be manufactured do not come in direct contact with each other, the separator does not have to be used.

Known organic electrolyte solutions, inorganic solid electrolytes, and polymer solid electrolytes can be used as the electrolyte solution and the electrolyte used for a lithium ion secondary battery. From the viewpoint of electric conductivity, the organic electrolyte solution can be preferably used.

Examples of the organic electrolyte solution include ethers such as dibutyl ether, ethyleneglycol monomethyl ether, ethyleneglycol monoethyl ether, ethyleneglycol monobutyl ether, diethyleneglycol monomethyl ether, and ethyleneglycol phenyl ether, amides such as N-methylformamide, N,N-dimethylformamide, N-ethylformamide, N,N-diethylformamide, N-methylacetamide, N,N-dimethylacetamide, N-ethylacetamide, and N,N-diethylacetamide, sulfur-containing compounds such as dimethylsulfoxide and sulfolane, dialkyl ketones such as methylethyl ketones and methylisobutyl ketone, cyclic ethers such as tetrahydrofurane and 2-methoxytetrahydrofurane, cyclic carbonates such as ethylene carbonate, butylene carbonate, propylene carbonate, and vinylene carbonate, chained carbonate such as diethyl carbonate, dimethyl carbonate, methylethyl carbonate, and methylpropyl carbonate, cyclic ester carbonates such as γ-butyrolactone and γ-valerolactone, chained ester carbonates such as methyl acetate, ethyl acetate, methyl propionate, and ethyl propionate, and organic solvents such as N-methyl 2-pyrrolidinone, acetonitrile, and nitromethane. These solvents can be used singly or in combination of two or more.

Various lithium salts can be used as a solute of the solvents. Examples of a known lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$, and $LiN(C_2F_5SO_2)_2$.

Examples of the polymer solid electrolyte include polyethylene oxide derivatives and polymers including the derivatives, polypropylene oxide derivatives and polymers including the derivatives, ester phosphate polymers, and polycarbonate derivatives and polymers including the derivatives.

Selection of members necessary for the configuration of a battery other than the above-mentioned ones is not limited at all.

The structure of the lithium ion secondary battery is not particularly limited, but a structure in which a winding electrode group in which a positive electrode and a negative electrode formed in a band shape are spirally wound with a separator interposed therebetween is inserted into a battery case and the resultant is sealed or a structure in which a positive electrode and a negative electrode formed in a flat panel shape are sequentially stacked with a separator interposed therebetween is enclosed in a case is generally employed. The lithium ion secondary battery can be used, for example, as a paper type battery, a button type battery, a coin type battery, a laminated battery, a cylindrical battery, and a square battery.

Hereinafter, a fourth embodiment to a fifth embodiment of the invention will be described in detail.

A raw coke composition used to form the graphite material according to the invention has a ratio of hydrogen atoms H and carbon atoms C, that is, an atomic ratio H/C, in a range of 0.30 to 0.50 and a microstrength of 7 wt % to 17 wt %. Graphite particles which are obtained by carbonizing and graphitizing a powder of the raw coke composition obtained by pulverizing and classifying the raw coke composition having such physical properties have an appropriate void volume therein and have an appropriate bonding strength between crystallites. Here, a void is a gap formed between neighboring crystallites in the graphite particles and the gaps are uniformly distributed in the particles. When a compressive shearing stress is applied to the graphite particles, the mechanical energy due to the compressive shearing stress is absorbed by the voids present in the vicinity of the particle surfaces and the energy propagates in the crystallites via the voids, whereby the relative position of the neighboring crystallites varies and disturbance is introduced into the crystalline structures on the surfaces of the graphite particles.

An unorganized carbon having a structure other than a benzene ring as a constituent unit of a hexagonal mesh sheet is present in the voids. The mechanical energy absorbed in the voids propagates to the crystallites without cutting a carbon-carbon bond of unorganized carbons present in the voids. When a compressive shearing stress greater than the maximum energy which can be absorbed in the voids is applied, the carbon-carbon bond in the voids is cut and edge faces having a dangling bond are exposed from the cut surface, which is not desirable. That is, when the mechanical energy having a magnitude within a range which can be absorbed by the voids is applied, the variation in relative position of the neighboring crystallites can be caused without cutting the carbon-carbon bond in the voids. As a result, disturbance of a crystalline structure is introduced into the particle surfaces and a graphite material having very few crystallite edges exposed from the particle surfaces is obtained.

In the edge portions of crystallites, plural dangling bonds, that is, many localized electrons of which valence electron bonds are not saturated and which are present without bonding opponents, are present. On the surface of the carbon material of a negative electrode, that is, in the interface between the electrolyte and the carbon material, in the charging process, the inventors thought that side reactions and competitive reactions due to the reductive decomposition of the electrolyte based on the catalytic action of the localized electrons occur in addition to the original charging reaction in which lithium is intercalated into the graphite crystals, thereby increasing the leak current of the negative electrode. The inventors had an idea that the leak current of the negative electrode can be suppressed and the storage characteristics of a lithium ion secondary battery can be improved, by greatly reducing the crystallite edges exposed from the particle surfaces, and actively researched to arrive at the present invention.

The H/C of the raw coke composition is a ratio of a value obtained by dividing the total hydrogen content (TH (wt %)) by the atomic weight of hydrogen to a value obtained by dividing the total carbon content (TC (wt %)) by the atomic weight of carbon.

The total hydrogen content is measured from the moisture content, which is generated from a combustion gas obtained by completely combusting a sample in an oxygen flow at 750° C., using a coulometric titration method (Karl-Fisher method). In the Karl-Fisher method of a coulometric titration formula, by inputting an electrolyte solution including iodide ions, sulfur dioxide, a base (RN), and alcohol at major components to a titration cell in advance and inputting a sample to the titration cell, the moisture in the sample reacts as shown in Formula 4. The sample is measured, for example, after being subjected to a coking process and then being cooled in a dry atmosphere.

[Chem. 4]

$$H_2O+I_2+SO_2+CH_3OH+3RN \rightarrow 2RN\cdot HI+RN\cdot HSO_4CH_3 \quad (4)$$

Iodine necessary for this reaction is obtained by causing iodide ions to electrochemically react (two-electron reaction) as shown in Formula 5.

[Chem. 5]

$$2I^- - 2e^- \rightarrow I_2 \quad (5)$$

Since 1 mole of water and 1 mole of iodine react, the quantity of electricity necessary for titrating 1 mg of water is calculated as shown in Formula 6 on the basis of a Faraday's law.

Numerical Expression 3

$$(2 \times 96478)/(18.0153 \times 103) = 10.71 \text{ Coulomb} \quad (6)$$

Here, the constant 96478 is the Faraday constant and 18.0513 is the molecular weight of water.

The moisture content is obtained by measuring the quantity of electricity necessary for producing iodine. The total hydrogen content (TH (wt %)) is calculated by converting the obtained moisture content into a hydrogen content and dividing the hydrogen content by the weight of the sample used for the measurement.

In measurement of the total carbon content, a sample is combusted in an oxygen flow of 1150° C., is converted into carbon dioxide (and some carbon monoxide), and is carried by the surplus oxygen flow, and the total carbon content (TC (wt %)) is calculated by a $CO_2+CO$ infrared detector.

The atomic ratio H/C of the raw coke composition mainly affects the magnitude of the void volume in the graphite particles obtained by graphitizing the raw coke composition.

When the atomic ratio H/C of the raw coke composition is less than 0.30, the area of the reticulated plane constituting the raw coke composition is large and thus the void volume is small in the graphite particles obtained by carbonizing and graphitizing the powder of the raw coke composition obtained by pulverizing and classifying the raw coke composition having such physical properties. Since the void volume is excessively small, the mechanical energy due to the compressive shearing stress is not sufficiently absorbed by the voids present in the vicinity of the particle surfaces and thus the energy given to the graphite particles directly acts on the reticulated plane constituting the crystallites. Accordingly, since the carbon-carbon bond of the reticulated plane on the surfaces of the graphite particles is cut, it is thought that the dangling bonds exposed from the particle surfaces increase. As a result, when the graphite material manufactured by applying the compressive shearing stress to the graphite particles is used as the negative electrode material of a lithium ion secondary battery, the electrolyte in the negative electrode is easily decomposed, the leak current of the negative electrode increases, and the difference from the leak current of the positive electrode increases, whereby the storage characteristics easily degrade.

In contrast, when the atomic ratio H/C in the raw coke composition is more than 0.50, the amount of carbon atoms in the raw coke composition is small and the amount of reticulated plane is small. Accordingly, in the graphite particles obtained by carbonizing and graphitizing the powder of the raw coke composition obtained by pulverizing and classifying the raw coke composition having such physical properties, the void volume is large. Since the void volume is excessively large, the mechanical energy due to the compressive shearing stress can be easily concentrated on the voids and the bond between the crystallites present in the voids is cut. Accordingly, it is thought that the edge faces having a dangling bond are exposed from the cut surface. As a result, when the graphite material manufactured by applying the compressive shearing stress to the graphite particles is used as the negative electrode material of a lithium ion secondary battery, the electrolyte is easily decomposed, the leak current of the negative electrode increases, and the difference from the leak current of the positive electrode increases, whereby the storage characteristics easily degrade.

Accordingly, the H/C of the raw coke composition is limited to the range of 0.30 to 0.50. When the powder of the raw coke composition is obtained by pulverizing and classifying the raw coke composition having a physical property within this range so as to have a predetermined particle size and the compressive shearing stress is applied to the graphite particles obtained by carbonizing and graphitizing the powder, a graphite material in which appropriate disturbance is introduced into the crystalline structure of the particle surfaces and the exposure of the edge faces is very small is obtained.

A microstrength is a value representing the weight of the sample on a sieve by percentage after inputting 2 g of the sample of 20 to 30 mesh and 12 steel balls with a diameter of 5/16 inch (7.9 mm) to a steel cylinder (with an inner diameter of 25.4 mm and a length of 304.8 mm), rotating a vertical plane in a direction perpendicular to the tube at 25 rpm by 800 turns (that is, rotating the cylinder in a state in which the rotation axis is set horizontally so as to trade places vertically as if rotating a propeller), and then sieving the resultant with a 48 mesh.

The microstrength of the raw coke composition is in a range of 7 wt % to 17 wt %. The microstrength is an index indicating the bonding strength between neighboring crystallites. Here, unorganized carbons present in the voids of the graphite particles have a function of bonding the neighboring crystallites. The unorganized carbons remain and perform the same function even after the raw coke composition is carbonized and graphitized.

When the microstrength of the raw coke composition is less than 7 wt %, graphite particles in which the bonding strength between the neighboring crystallites is very small are obtained. Since the bond between the unorganized carbons present in the voids of the graphite particles is very small, the bond between the crystallites present in the voids is very easily cut with the application of the compressive shearing stress to the graphite particles. Accordingly, it is thought that the edge faces having a dangling bond are exposed from the cut surface. As a result, when the graphite material manufactured by applying the compressive shearing stress to the graphite particles is used as the negative electrode material of a lithium ion secondary battery, the electrolyte solution is easily decomposed, the leak current of the negative electrode increases, and the difference from the leak current of the positive electrode increases, whereby the storage characteristics easily degrade.

When the microstrength of the raw coke composition is more than 17 wt %, graphite particles in which the bonding strength between the neighboring crystallites is very great are obtained. When the compressive shearing stress is applied to the graphite particles in this state, the bonding strength between the crystallites present in the voids is excessively large and thus the voids cannot exhibit the function of absorbing the given mechanical energy and causing the energy to propagate to the neighboring crystallites. Accordingly, the variation in relative position of the neighboring crystallites is not allowed the given mechanical energy is concentrated on the unorganized carbons present in the voids. As a result, the carbon-carbon bond of the unorganized carbons is cut. Accordingly, it is thought that the edge faces having a dangling bond are exposed from the cut surface. As a result, when the graphite material manufactured by applying the compressive shearing stress to the graphite particles is used as the negative electrode material of a lithium ion secondary battery, the electrolyte solution is easily decomposed, the leak current of the negative electrode increases, and the difference from the leak current of the positive electrode increases, whereby the storage characteristics easily degrade.

Accordingly, the microstrength of the raw coke composition is limited to the range of 7 wt % to 17 wt %. When the raw coke composition having a physical property within this range is pulverized and classified and the compressive shearing stress is applied to the graphite particles having been subjected to the carbonization and graphitization process, a graphite material in which the disturbance of the crystalline structure due to the variation in relative position between the neighboring crystallites on the particle surfaces is introduced and in which the edge faces exposed from the particle surfaces are very small is obtained.

The raw coke composition used in the invention is obtained by coking a heavy oil composition through the use of a delayed coking process.

Examples of the components of a heavy oil composition include a bottom oil (fluid catalytic cracking decant oil (FCC DO)) of a fluid catalytic cracker, an aromatic content extracted from the fluid catalytic cracking decant oil, hydrodesulfurized oil obtained by performing a hydrodesulfurization process on a heavy oil, a vacuum residual oil (VR), a desulfurized deasphalted oil, coal-derived liquid, a coal solvent-extracted oil, an atmospheric residual oil, a shell oil, a tar sand bitumen, a naphtha-tar pitch, an ethylene bottom oil, a coal-tar pitch, and heavy oils obtained by hydrogenating them. When two or more types of heavy oils are blended to prepare a heavy oil composition, the blending ratio can be appropriately adjusted depending on the features and states of a base oil to be used so that the physical properties of the raw coke composition obtained by coking the raw coke composition through the use of a delayed coking process include an atomic ratio H/C of 0.30 to 0.50 and a microstrength of 7 wt % to 17 wt %. The features and states of the base oil vary depending on the type of a crude oil, the processing conditions until the base oil is obtained from the crude oil, and the like.

The bottom oil of the fluid catalytic cracker is a bottom oil of a fluidized-bed fluid catalytic cracker for selectively performing a decomposition reaction using a catalyst and using a vacuum gas oil as a base oil to obtain high-octane FCC gasoline. The vacuum gas oil used as the base oil is preferably a desulfurized vacuum gas oil (preferably with a sulfur content of 500 wt ppm or less and a density of $0.8/cm^3$ or more at 15° C.) obtained by directly desulfurizing an atmospheric distillation residual oil.

The aromatic content extracted from the fluid catalytic cracking decant oil is an aromatic content when a component is selectively extracted using dimethylformamide or the like and is divided into an aromatic content and a saturated content.

The hydrodesulfurized oil obtained by performing a high hydrodesulfurization process on a heavy oil is, for example, a heavy oil with a sulfur content of 1.0 wt % or less, a nitrogen content of 0.5 wt % or less, an aromatic carbon content (fa) of 0.1 or more which is obtained by performing a hydrodesulfurization process on a heavy oil with a sulfur content of 1 wt % or more at a hydrogen partial pressure of 10 MPa or more. The hydrodesulfurized oil is preferably a hydrodesulfurized oil obtained by hydrodesulfurizing an atmospheric distillation residual oil in the presence of a catalyst so as to have a hydrocracking ratio of 25% or less.

The vacuum residual oil (VR) is a bottom oil of a vacuum distillator obtained by inputting a crude oil to an atmospheric distillatory to obtain gases, a light oil, and an atmospheric residual oil and then changing the atmospheric residual oil, for example, at a reduced pressure of 10 to 30 Torr in a heating furnace outlet temperature range of 320° C. to 360° C.

The desulfurized deasphalted oil is obtained by processing an oil such as a vacuum distillation residual oil by the use of a solvent deasphalting apparatus using propane, butane, pentane, or a mixture thereof as a solvent, removing the asphaltene content, and desulfurizing the obtained deasphalted oil (DAO) preferably up to a sulfur content of 0.05 wt % to 0.40 wt % using an indirect desulfurizer (Isomax) or the like.

The atmospheric residual oil is a fraction having the highest boiling point which is obtained by inputting a crude oil to an atmospheric distillatory and fractionally distilling the crude oil into gases and LPG, a gasoline fraction, a lamp oil fraction, a light oil fraction, and an atmospheric residual oil depending on the boiling points of the fractions. The heating temperature varies depending on the producing area of the crude oil or the like and is not particularly limited as long as the crude oil can be fractionally distilled into the fractions. For example, the crude oil is heated at 320° C.

A preferable example of heavy oil composition is a heavy oil composition satisfying three conditions of (1) an aromatic content ratio (aromatic index) fa of 0.3 to 0.65, (2) a normal paraffin content of 5 wt % to 20 wt %, and (3) a content of a desulfurized deasphalted oil of 7 wt % to 15 wt %. Preferably, the heavy oil composition includes the hydrodesulfurized oil and the fluid catalytic cracking decant oil in a weight ratio range of 1:3 to 1:5 and includes the desulfurized deasphalted oil in a range of 7 wt % to 15 wt % (with respect to 100 wt % of the overall composition including the desulfurized deasphalted oil).

The heavy oil is processed at high temperatures to cause pyrolytic reactions and polycondensation reactions and a green coke is produced through a process of producing a large liquid crystal called a mesophase as an intermediate product.

At this time, a base oil composition including all of (1) a heavy oil component forming an excellent bulk mesophase, (2) a heavy oil component which can produce a gas having a function of limiting the size of a hexagonal mesh laminate constituting a mesophase when carbonizing and solidifying the bulk mesophase by polycondensation, and (3) a heavy oil component bonding the cut hexagonal mesh laminates to each other can be particularly preferably used. The (1) heavy oil component forming an excellent bulk mesophase is a component giving an aromatic index fa of 0.3 to 0.65, the (2) heavy oil component which can produce a gas is a component corresponding to the normal paraffin content of 5 wt % to 20 wt %, and the (3) component bonding the hexagonal mesh laminates is a desulfurized deasphalted oil contained in the range of 7 wt % to 15 wt %.

The reason for using such heavy oil composition as a source material of the raw coke composition of the invention is that a hexagonal mesh sheet formed by the heavy oil component producing an excellent bulk mesophase is limited to a relatively small size to keep a degree of parallelism between the neighboring mesh sheets of the hexagonal mesh laminate formed after the coking high and the desulfurized deasphalted oil appropriately bonds the neighboring hexagonal mesh laminates to each other.

There is no example in which the desulfurized deasphalted oil is added during manufacturing the green coke, and it comes as a surprise that containing the desulfurized deasphalted oil is effective.

The aromatic carbon content ratio (aromatic index) (fa) can be obtained through the use of a Knight method. In the Knight method, a carbon distribution is divided into three components ($A_1, A_2, A_3$) in a spectrum of an aromatic carbon using a $^{13}$C-NMR method. Here, $A_1$ represents the number of carbons in an aromatic ring and substituted aromatic carbons and a half of non-substituted aromatic carbons (corresponding to peaks of about 40 to 60 ppm of $^{13}$C-NMR), $A_2$ represents the other half of the non-substituted aromatic carbons (corresponding to peaks of about 60 to 80 ppm of $^{13}$C-NMR), and $A_3$ represents the number of aliphatic carbons (corresponding to peaks of about 130 to 190 ppm of $^{13}$C-NMR). From these, fa is obtained using the following expression.

Numerical Expression 4

$$fa=(A_1+A_2)/(A_1+A_2+A_3)$$

It is described in Document ("Characterization of Pitches II. Chemical Structure", Yokono, Sanada, (Carbon, 1981 (No. 105), p 73-81) that the $^{13}$C-NMR method is the best method capable of quantitatively calculating the most basic quantity fa of a pitch-based chemical structure parameter.

The content of normal paraffin in the heavy oil composition means a value measured through the use of gas chromatography using a capillary column. Specifically, verification is performed using a standard reference material of normal paraffin and then a sample of a non-aromatic components separated by the elution chromatography is measured using the capillary column. The content based on the total weight of the base oil composition can be calculated from this measured value.

When the aromatic index fa of the heavy oil composition is less than 0.3, the yield of a coke from the heavy oil composition is extremely lowered, an excellent bulk mesophase is not formed, and it is difficult to develop a crystalline structure in spite of the carbonization and graphitization, which is not desirable. When fa is more than 0.65, plural mesophases are rapidly generated in a matrix in the course of producing a green coke and rapid combination of mesophases is more repeated than single growth of mesophases. Accordingly, since the combination rate of the mesophases is higher than the generation rate of gases from the normal paraffin-containing component, it is not possible to limit hexagonal mesh sheet of a bulk mesophase to a small size, which is not desirable.

The aromatic index fa of the heavy oil composition is preferably in a range of 0.3 to 0.65. Here, fa can be calculated from a density D and a viscosity V of a heavy oil composition, and fa of a heavy oil composition with a density D of 0.91 to 1.02 g/cm$^3$ and with a viscosity V of 10 to 220 mm$^2$/sec is preferably in a range of 0.3 to 0.65.

The normal paraffin component appropriately included in the heavy oil composition performs an important function of limiting a bulk mesophase to a small size by generating gases during the coking process as described above. The generation of gases also serves to uniaxially orient neighboring mesophases limited to a small size and to selectively orient the overall system. When the content of the normal paraffin-containing component is less than 5 wt %, mesophases grow more than necessary and large carbon reticulated plane are formed, which is not desirable. When the content of the normal paraffin-containing component is more than 20 wt %, excessive gases are generated from the normal paraffin, the orientation of the bulk mesophase tends to be disturbed in the opposite direction, and it is thus difficult to develop the crystalline structure in spite of the carbonization and graphitization, which is not desirable. As described above, the content of the normal paraffin is preferably in a range of 5 wt % to 20 wt %.

The desulfurized deasphalted oil serves to appropriately combine the neighboring hexagonal mesh laminates as described above, and the content in the heavy oil composition is preferably in a range of 7 wt % to 15 wt %. When the content of the desulfurized deasphalted oil is less than 7 wt % or more than 15 wt %, the microstrength of the heavy oil composition obtained after the coking process may be less than 7 wt % or more than 17 wt %, which is not desirable.

The heavy oil composition having this feature is coked to form the raw coke composition in the invention. A delayed coking method can be preferably used as a method of coking a heavy oil composition satisfying a predetermined condition. More specifically, a method of heating a base oil composition to obtain a green coke through the use of a delayed coker under the condition of a controlled coking pressure can be preferably used. The preferable operating conditions of the delayed coker include a pressure of 0.1 MPa to 0.8 MPa and a temperature of 400° C. to 600° C.

The reason for setting the preferable range of the operating pressure of a coker is that the emission speed of gases generated from the normal paraffin-containing component to the outside of the system can be controlled by the use of the pressure. As described above, since the size of the carbon reticulated plane constituting a mesophase is controlled by the use of the generated gases, the residence time of the generated gases in the system serves as an important control parameter for determining the size of the reticulated plane. The reason for setting the preferable range of the coker operating temperature is that it is a temperature necessary for causing a mesophase to grow from a heavy oil adjusted to achieve the advantageous effects of the invention.

The raw coke composition obtained in this way is pulverized and classified so as to have a predetermined particle size. The average particle diameter of the obtained powder of the raw coke composition is preferably equal to or less than 30 μm. The average particle diameter is measured using a laser-diffraction particle size analyzer. The reason for setting the average particle diameter of the powder of the raw coke composition to be equal to or less than 30 μm is that this particle size range is generally and suitably used for the negative carbon material of a lithium ion secondary battery. The average particle diameter is preferably in a range of 5 μm to 30 μm. This is because when the average particle diameter of the powder of the raw coke composition is less than 5 μm and the compressive shearing stress is applied to the graphite particles obtained after the carbonization and graphitization process, sufficient mechanical energy cannot be applied to the particles.

The powder of the pulverized and classified raw coke composition is carbonized and graphitized such that the crystallite size Lc(112) of a (112) diffraction line measured through the use of a wide-angle X-ray diffraction method is equal to or more than 4 nm.

The carbonization and graphitization method is not particularly limited, but a method of carbonizing (preliminarily calcining) the powder in the atmosphere of inert gas such as nitrogen, argon, or helium at a highest temperature of 900° C. to 1500° C. for a highest temperature retention time of 0 to 10 hours and performing a heating process in the same atmosphere of inert gas at a highest temperature of 2500° C. to 3200° C. for a highest temperature retention time of 0 to 100 hours can be used.

The temperature may be temporarily lowered after the carbonization and then the heating process may be performed to graphitize the powder again.

In the invention, the reason for setting the crystallite size Lc(112) of a (112) diffraction line measured through the use of a wide-angle X-ray diffraction method to be equal to or more than 4 nm as the physical property of the graphite particles to which the compressive shearing stress is applied is that a graphite material manufactured the graphite particles having highly-developed crystals in this way can maintain the highly-developed crystallinity and can secure a reversible capacity of 340 mAh/g or more. This is the same as the reason that a material having the highly-developed crystals is preferably used as a negative electrode material used in such a type of batteries. It is known that the more highly the crystals develop, the greater the capacity that is obtained, which is described, for example, in paragraph [0005] of Patent document 1. When the crystallite size Lc(112) of a (112) diffraction line of the graphite particles which is measured through the use of a wide-angle X-ray diffraction method is less than 4 nm, the development of crystals is not sufficient, the development of crystals in the graphite material manufactured using the graphite particles is not sufficient, and only a small reversible capacity is obtained, which is not desirable.

Then, by applying the compressive shearing stress to the graphite particles obtained through the carbonization and graphitization process, the graphite material according to the invention is obtained. At this time, in addition to the compressive shearing stress, collision, friction, shearing stresses, and the like are also generated. The mechanical energy provided by these stresses is greater than the energy provided by general agitation, and these types of energy are given to the particle surfaces, thereby exhibiting an effect called a mechanochemical phenomenon such as spheronization of particle shapes and complexing of particles. In order to provide the mechanical energy for causing the mechanochemical phenomenon to the graphite particles, an apparatus capable of simultaneously applying shearing, compression, collision stresses, and the like has only to be used and the structure and principle of the apparatus are not particularly limited. Examples of such an apparatus include a ball type kneader such as rotary ball mill, a wheel type kneader such as an edge runner, a hybridization system (made by Nara Machinery Co., Ltd.), a mechano-fusion (made by Hosokawa Micron Corporation), a NOBILTA (made by Hosokawa Micron Corporation), a COMPOSI (made by Nippon Coke & Engineering Co., Ltd.).

The manufacturing conditions in the process of applying the compressive shearing stress differ depending on the apparatus to be used. For example, as shown in FIG. 4, a mechano-fusion apparatus 30 having a structure in which a blade 31 and a housing 32 are made to relatively rotate, preferably in the opposite directions (rotation directions R1 and R2) and compaction and compressive stresses are applied to the powder P in the gap 33 therebetween can be used.

When the NOBILTA (made by Hosokawa Micron Corporation) is used, it is preferable that the number of rotation of the blade be set to a range of 600 rpm to 4000 rpm and the processing time be set to a range of 5 minutes to 90 minutes. When the number of rotation is smaller than 600 rpm or when the processing time is less than 5 minutes, sufficient compressive shearing stress cannot be applied to the graphite particles. On the other hand, when the process is performed for a time longer than 90 minutes, an excessive compressive shearing stress is applied to the graphite particles and the particle shape is markedly deformed, which is not desirable.

When the COMPOSI (made by Nippon Coke & Engineering Co., Ltd.) is used, it is preferable that the peripheral speed be set to a range of 25 m/s to 60 m/s and the processing time be set to a range of 5 minutes to 90 minutes. When the peripheral speed is smaller than 25 m/s or when the processing time is less than 5 minutes, sufficient compressive shearing stress cannot be applied to the graphite particles. On the other hand, when the process is performed for a time longer than 90 minutes, an excessive compressive shearing stress is applied to the graphite particles and the particle shape is markedly deformed, which is not desirable.

When the mechano-fusion (made by Hosokawa Micron Corporation) is used, it is preferable that the number of rotation of the blade be set to a range of 500 rpm to 3000 rpm and the processing time be set to a range of 10 minutes to 300 minutes. When the number of rotation is smaller than 500 rpm or when the processing time is less than 10 minutes, sufficient compressive shearing stress cannot be applied to the graphite particles. On the other hand, when the process is performed for a time longer than 300 minutes, an excessive compressive shearing stress is applied to the graphite particles and the particle shape is markedly deformed, which is not desirable.

When the hybridization system (made by Nara Machinery Co., Ltd.) is used, it is preferable that the peripheral speed be set to a range of 20 m/s to 60 m/s and the processing time be set to a range of 5 minutes to 90 minutes.

The process of applying the compressive shearing stress to the graphite particles is a process of chip out corners of particles and instantaneously attaching the chips to the particles to make the particles round, which is preferably performed such that the appearing particle diameter is hardly changed. Therefore, this process is not pulverization of generating fine powder to reduce the particle diameter. When the raw coke composition in the invention is used, the graphite material having a higher degree of sphericity is obtained by preferably setting the control temperature of the process of applying the compressive shearing stress to a range of 60° C. to 250° C. Particularly, the processing control temperature is preferably set to a range of 120° C. to 200° C.

A process of performing a heating process may be further performed after applying the compressive shearing stress to the graphite particles. The heating process temperature can be set to a temperature range generally used to heat a carbon material, for example, a range of 700° C. to 3000° C. By performing this additional heating process, it is possible to further reduce the dangling bonds exposed from the surface.

As described above, when the powder of the raw coke composition is obtained by pulverizing and classifying the raw coke composition having an H/C of 0.30 to 0.50 and a microstrength of 7 wt % to 17 wt % and the compressive shearing stress is applied to the graphite particles having been subjected to the carbonization and graphitization process, a graphite material is obtained in which the disturbance of the crystalline structure due to the variation in relative position between the neighboring crystallites on the particle surfaces is introduced and in which the edge faces exposed from the particle surfaces are very small. When this graphite material is used as the negative electrode material of a lithium ion secondary battery, it is possible to secure very high reliability.

In the past, there was no example in which a graphite material manufactured using a desulfurized deasphalted oil as a source material is used as the negative electrode material of a lithium ion secondary battery. The invention can provide a desired graphite material by applying the compressive shearing stress to the graphite particles which are obtained by mixing the desulfurized deasphalted oil as a preferable aspect of a heavy oil composition, pulverizing and classifying the raw coke composition having a predetermined atomic ratio H/C and a predetermined microstrength, and carbonizing and graphitizing the resultant.

The method of manufacturing a negative electrode of a lithium ion secondary battery is not particularly limited but, for example, a method of pressing and shaping a mixture (negative-electrode mixture) including the graphite material according to the invention, a binder (binding agent), a conducting agent if necessary, and an organic solvent in a predetermined size can be used. The method of rolling a material (negative-electrode mixture), which is obtained by kneading the graphite material according to the invention, a binder (binding agent), a conducting agent, and the like in an organic solvent to produce slurry and applying and drying the slurry onto a collector such as a copper foil, and cutting out the resultant in a predetermined size can be also used.

Examples of the binder (binding agent) include polyvinylidene fluoride, polytetrafluoroethylene, polyacrylonitrile, polyethyleneterephthalate, and SBR (Styrene-Butadiene Rubber). The content of the binder in the negative-electrode mixture can be appropriately set to a range of about 1 to 30 parts by weight with respect to 100 parts by weight of a graphite material if necessary in design of a battery.

Examples of the conducting agent include carbon black, graphite, acetylene black, indium-tin oxide exhibiting conductivity, and conductive polymers such as polyaniline, polythiophene, and polyphenylenevinylene. The content of the conducting agent is preferably in a range of 1 to 15 parts by weight with respect to 100 parts by weight of a graphite material.

Examples of the organic solvent include dimethylformamide, N-methylpyrrolidone, pyrrolidone, N-methylthiopyrrolidone, hexamethylphosphoamide, dimethylacetamide, isopropanol, and toluene.

The method of mixing a graphite material, a binder, a conducting agent if necessary, and an organic solvent can employ a known apparatus such as a screw kneader, a ribbon mixer, a universal mixer, and a planetary mixer. The mixture is shaped through roll pressing or press pressing, and the pressure at that time is preferably in a range of 100 MPa to 300 MPa.

The material of the collector is not particularly limited as long as it does not form an alloy with lithium. Examples thereof include copper, nickel, titanium, and stainless steel. The shape of the collector is not particularly limited, but examples thereof include band shapes such as a foil shape, a punched foil shape, and a mesh shape. A porous material such as porous metal (foamed metal) or carbon paper can be used.

The method of applying the slurry onto the collector is not particularly limited, but examples thereof include known methods such as a metal mask printing method, an electrostatic coating method, a dip coating method, a spray coating method, a roll coating method, a doctor blade method, a gravure coating method, a screen printing method, and a die coater method. After the application, a rolling process using a flat press, a calender roll, or the like is generally performed if necessary. The unification of the negative-electrode slurry formed in a sheet shape or pellet shape and the collector can be performed using known methods such as rolling, pressing, and a combination thereof.

A lithium ion secondary battery using the graphite material for a negative electrode of a lithium ion secondary battery according to this embodiment is obtained, for example, by arranging the negative electrode manufactured as described above and the positive electrode to face each other with a separator interposed therebetween and injecting an electrolyte solution thereto.

The active material used for the positive electrode is not particularly limited, and metal compound, metal oxide, metal sulfide, or a conductive polymer material capable of doping or intercalating lithium ions can be used. Examples thereof include lithium cobalt oxide ($LiCoO_2$), lithium nickel oxide ($LiNiO_2$), lithium manganase oxide ($LiMn_2O_4$), lithium composite oxides ($LiCo_XNi_YM_ZO_2$, X+Y+Z=1, M: Mn, Al, or the like), oxides in which some transition metals is substituted with other elements, lithium-vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine $LiMPO_4$ (M:Co, Ni, Mn, Fe), conductive polymers such as polyacetylene, polyaniline, polypyrrole, polythiophene, and polyacene, porous carbons, and mixtures thereof.

For example, an unwoven fabric, a cross, and a porous film including polyolefin such as polyethylene and polypropylene as a major component, or combinations thereof can be used as the separator. When the positive electrode and the negative electrode of a lithium ion secondary battery to be manufactured do not come in direct contact with each other, the separator does not have to be used.

Known organic electrolyte solutions, inorganic solid electrolytes, and polymer solid electrolytes can be used as the electrolyte solution and the electrolyte used for a lithium ion secondary battery. From the viewpoint of electric conductivity, the organic electrolyte solution can be preferably used.

Examples of the organic electrolyte solution include ethers such as dibutyl ether, ethyleneglycol monomethyl ether, ethyleneglycol monoethyl ether, ethyleneglycol monobutyl ether, diethyleneglycol monomethyl ether, and ethyleneglycol phenyl ether, amides such as N-methylformamide, N,N-dimethylformamide, N-ethylformamide, N,N-diethylformamide, N-methylacetamide, N,N-dimethylacetamide, N-ethylacetamide, and N,N-diethylacetamide, sulfur-containing compounds such as dimethylsulfoxide and sulfolane, dialkyl ketones such as methylethyl ketones and methylisobutyl ketone, cyclic ethers such as tetrahydrofurane and 2-methoxytetrahydrofurane, cyclic carbonates such as ethylene carbonate, butylene carbonate, propylene carbonate, and vinylene carbonate, chained carbonate such as diethyl carbonate, dimethyl carbonate, methylethyl carbonate, and methylpropyl carbonate, cyclic ester carbonates such as γ-butyrolactone and γ-valerolactone, chained ester carbonates such as methyl acetate, ethyl acetate, methyl propionate, and ethyl propionate, and organic solvents such as N-methyl 2-pyrrolidinone, acetonitrile, and nitromethane. These solvents can be used singly or in combination of two or more.

Various lithium salts can be used as a solute of the solvents. Examples of a known lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$, and $LiN(C_2F_5SO_2)_2$.

Examples of the polymer solid electrolyte include polyethylene oxide derivatives and polymers including the derivatives, polypropylene oxide derivatives and polymers including the derivatives, ester phosphate polymers, and polycarbonate derivatives and polymers including the derivatives.

Selection of members necessary for the configuration of a battery other than the above-mentioned is not limited at all.

The structure of a lithium ion secondary battery is not particularly limited, but a structure in which a winding electrode group in which a positive electrode and a negative electrode formed in a band shape are spirally wound with a separator interposed therebetween is inserted into a battery case and the resultant is sealed or a structure in which a positive electrode and a negative electrode formed in a flat panel shape are sequentially stacked with a separator interposed therebetween is enclosed in a case is generally employed. The lithium ion secondary battery can be used, for example, as a paper type battery, a button type battery, a coin type battery, a laminated battery, a cylindrical battery, and a square battery.

Hereinafter, a sixth embodiment to a seventh embodiment of the invention will be described in detail.

The inventors have an idea of the relationship between a process of carbonizing and graphitizing a compound powder in which a calcined coke is embedded in the particle surfaces of a raw coke composition having an atomic ratio H/C of hydrogen atoms H and carbon atoms C in a range of 0.30 to 0.50 and a microstrength of 7 wt % to 17 wt %, a structure in which areas having a low crystallinity are partially introduced into a highly crystalline structure, and an advantageous effect of obtaining a graphite material having a small amount of edges exposed from the particle surfaces, as follows.

First, a calcined coke used in the invention means a material having a crystalline structure developed by heating a petroleum coke, a coal pitch coke, and the like (1300° C. to 1400° C.) by the use of an industrial furnace (a calciner such as a rotary kiln, a shaft kiln, and a rotary hearth furnace) to remove moisture or volatile components (Carbon Glossary, published by Agne Shofu Publishing Inc.). A calcined coke is obtained by pulverizing and classifying the resultant calcined coke so as to have an average particle diameter of 0.1 μm to 3.0 μm.

For example, by heating one type or a heavy oil composition obtained by blending two or more types of components of a heavy oil composition such as a bottom oil (fluid catalytic cracking decant oil (FCC DO)) of a fluid catalytic cracker, an aromatic content extracted from the fluid catalytic cracking decant oil, hydrodesulfurized oil obtained by performing a hydrodesulfurization process on a heavy oil, a vacuum residual oil (VR), a desulfurized deasphalted oil, coal-derived liquid, a coal solvent-extracted oil, an atmospheric residual oil, a shell oil, a tar sand bitumen, a naphtha-tar pitch, an ethylene bottom oil, a coal-tar pitch, and heavy oils obtained by hydrogenating them, coarsely pulverizing the resultant by the use of a hammer mill, and then carbonizing the resultant at 1300° C. to 1400° C., the calcined coke is obtained. By pulverizing the obtained calcined coke by the use of a mechanical pulverizer (for example, a super rotor mill made by Nisshin Engineering Inc.) and classifying the pulverized calcined coke by the use of a precision air classifier (for example, a turbo classifier made by Nisshin Engineering Inc.), a calcined coke is obtained.

When the calcined coke is pulverized and classified, strong mechanical energy is given to the particle surfaces of the calcined coke. Accordingly, a carbon-carbon bond in a hexagonal mesh sheet present on the particle surfaces is cut and plural unorganized carbons not belonging to the reticulated plane are exposed from the surfaces. Here, unorganized carbon has a structure other than a benzene ring as a constituent unit of a hexagonal mesh sheet chemically connected to a hexagonal mesh laminate and has a feature that it can form a carbon-carbon bond with a neighboring unorganized carbon.

When a compound powder in which the calcined coke having such a feature is embedded in the particle surfaces of a raw coke composition is carbonized and graphitized, a strong carbon-carbon bond is formed in the interface between an unorganized carbon exposed from the particle surface of the calcined coke and an unorganized carbon in the raw coke composition. When the carbon-carbon bond is not formed, a crack is generated in the interface between the calcined coke and the raw coke composition and edges of crystallites are exposed from the cracked portion. In a lithium ion secondary battery using the graphite material as a negative electrode material, an electrolyte solution is easily decomposed in the edges of the crystallites exposed from the cracked portions in the graphite material, the difference between the leak current of the negative electrode and the leak current of the positive electrode increases, the operational ranges of capacities of the positive electrode and the negative electrode vary, and the service life characteristic degrades, which is not desirable.

When the calcined coke is chemically connected to the raw coke composition by a carbon-carbon bond, the hexagonal mesh sheet in the calcined coke and the hexagonal mesh sheet in the raw coke composition are not connected to each other to form a complete plane. This is because the hexagonal mesh sheet in the calcined coke and the hexagonal mesh sheet in the raw coke composition are compounded in a non-parallel state in the compound powder in which the calcined coke is embedded in the powder of the raw coke composition. When this compound powder is carbonized and graphitized, the non-parallel state of both reticulated plane is maintained and a carbon-carbon bond is formed in the interface therebetween. Therefore, it can be said that crystalline structures in which the neighboring reticulated plane are connected in the non-parallel state remain in the graphite material after the graphitization.

When two reticulated plane having the non-parallel relationship are connected to each other, both are connected via an area having a low degree of parallelism, that is, an area having a low crystallinity, of the reticulated plane. The boundary area between two reticulated plane having the non-parallel relationship can be said to be an area having a lower crystallinity than other areas having highly crystalline structures. That is, the graphite material obtained by carbonizing and graphitizing the compound powder in which the calcined coke is embedded in the particle surfaces of the raw coke composition has a crystalline structure in which areas having a low crystallinity are introduced into the graphite material having highly crystalline structures. The introduced areas having a low crystallinity provides an effect of stereoscopically preventing co-intercalation of an electrolyte solution into the graphite layers.

In the obtained graphite material, since the hexagonal mesh laminates in the calcined coke and the graphite are chemically connected to each other with the carbon-carbon bond, cracks are not formed in the interface therebetween. Accordingly, the amount of edge portions exposed from the particle surfaces of the graphite material is small and the decomposition reaction of the electrolyte solution using the localized electrons as a catalyst can be suppressed.

In this way, through the use of the process of carbonizing and graphitizing the compound powder in which the calcined coke is embedded in the particle surfaces of the raw coke composition, a graphite material having a structure in which areas having a low crystallinity are partially introduced into the highly crystalline structure and a small amount of edges exposed from the particle surfaces is obtained.

Here, the state in which the calcined coke is embedded in the particle surfaces of the raw coke composition means a state in which the calcined coke is embedded without actually protruding from the particle surfaces of the raw coke composition when a SEM image magnified to 1,000 to 5,000 times is observed.

In the invention, two reasons for setting the compound powder to the state in which the calcined coke is embedded in the particle surfaces of the raw coke composition will be described below.

The first reason is that it is possible to suppress an increase in specific surface area of the particles after the graphitization by carbonizing and graphitizing the compound powder in which the calcined coke is embedded in the particle surfaces of the raw coke composition.

In the compound powder in which the calcined coke is embedded in the particle surfaces of the raw coke composition, since the amount of calcined coke protruding from the particle surfaces of the raw coke composition is small, the unevenness of the surface of the graphite material obtained by carbonizing and graphitizing the compound powder is very small and the specific surface area is also small. In a lithium ion secondary battery using the resultant graphite material as a negative electrode material, since the contact area between the electrolyte solution and the particle surfaces of the graphite material is small, the decomposition of the electrolyte solution in the negative electrode does not occur well. In this case, since the operational ranges of capacities of the positive and negative electrodes do not vary well, the service life characteristic is superior.

On the other hand, when a compound powder in which the calcined coke is not embedded in the particle surfaces of the raw coke composition but attached to the particle surfaces is carbonized and graphitized, the calcined coke protrudes from the particle surfaces of the graphite material and thus the graphite material having unevenness on the surface and having a large specific surface area is obtained. In a lithium ion secondary battery using the graphite material as a negative electrode material, since the contact area between the electrolyte solution and the particle surfaces of the graphite material is large, the decomposition of the electrolyte solution in the negative electrode easily occurs. In this case, since the difference between leak current of the negative electrode and the leak current of the positive electrode increases, the operational ranges of capacities of the positive and negative electrodes vary and thus the service life characteristic degrades, which is not desirable.

In the invention, the second reason for setting the compound powder to the state in which the calcined coke is embedded in the particle surfaces of the raw coke composition is that a chemical bond is formed in the interface between the highly crystalline structure and the area having a low crystallinity and thus the formation of cracks in the interface therebetween is prevented.

In the course of embedding the calcined coke in the particle surfaces of the raw coke composition due to the compressive shearing stress, the calcined coke is easily embedded in the gap (void area) between the hexagonal mesh laminate constituting the raw coke composition and the neighboring hexagonal mesh laminate. This is because the energy necessary for embedding the calcined coke in the void area between the neighboring hexagonal mesh laminates is smaller than the energy necessary for causing the calcined coke to destroy the hexagonal mesh laminate in the raw coke composition and embedding the calcined coke in the particles. Unorganized carbons having a structure other than a benzene ring as a constituent unit of the hexagonal mesh sheet are present in the void area. These unorganized carbons are chemically connected to the reticulated plane in the powder of the raw coke composition and can form carbon-carbon bonds with other neighboring unorganized carbons.

When the calcined coke is embedded in the void area, the unorganized carbons present on the particle surfaces of the calcined coke can come in sufficient contact with the unorganized carbons in the raw coke composition, and thus a strong carbon-carbon bond is formed between the unorganized carbons contacting each other in the course of subsequent carbonization and graphitization. Accordingly, in the graphite material obtained after the graphitization, the calcined coke and the hexagonal mesh laminate in the graphite are chemically connected to each other without forming a crack in the interface therebetween. In this way, the graphite material having a structure in which an area having a low crystallinity is introduced into a highly crystalline structure is obtained.

On the other hand, when a compound powder in which the calcined coke is not embedded in the particle surface of the raw coke composition but is attached to the surface is carbonized and graphitized, the contact area between an unorganized carbon present on the particle surface of the calcined coke and an unorganized carbon in the raw coke composition is very small and thus it is not possible to form a strong carbon-carbon bond between the unorganized carbons in the calcined coke and the raw coke composition. In this case, in the obtained graphite material, a crack is easily formed in the interface between the hexagonal mesh laminate in the calcined coke and the hexagonal mesh laminate in the graphite and edges of the crystallites are exposed from the cracked portion. In a lithium ion secondary battery using the graphite material as a negative electrode material, the electrolyte solution is easily decomposed in the edges of the crystallites exposed from the cracked portion in the graphite material. In this case, since the difference between the leak current of the negative electrode and the leak current of the positive electrode increases, the operational ranges of capacities of the positive and negative electrodes vary and the service life characteristic degrades, which is not desirable.

In the invention, the reason for setting the average particle diameter of the calcined coke mixed into the powder of the raw coke composition to a range of 0.1 µm to 3.0 µm will be described below.

First, the reason for setting the lower limit to 0.1 µm is that it is very difficult to obtain a calcined coke with an average particle diameter of less than 0.1 µm and it is not suitable for the actual practice. When the powder of the raw coke composition and the calcined coke with an average particle diameter of more than 3.0 µm are mixed, the size of the mixed calcined coke is very larger than the void area between the hexagonal mesh laminated of the raw coke composition, thus the mixed calcined coke is not embedded in the raw coke composition but is attached to the particle surface of the raw coke composition, and a compound powder having large unevenness on the particle surface is obtained. The specific surface area of the graphite material obtained by carbonizing and graphitizing the compound powder is very large. Accordingly, in a lithium ion secondary battery using the graphite material as a negative electrode material, the contact area between the electrolyte solution and the graphite material of the negative electrode increases to easily decompose the electrolyte solution, the leak current in the second electrode increases, the difference from the leak current of the positive electrode increases, the operational ranges of capacities of the positive and negative electrodes vary, and thus the service life characteristic degrades, which is not desirable. A more preferable average particle diameter is in a range of 0.5 µm to 2 µm.

In the invention, the reason for setting the amount of calcined coke mixed into the powder of the raw coke composition to a range of 0.5 wt % to 10 wt % with respect to the raw coke composition will be described below.

In a graphite material obtained by carbonizing and graphitizing a compound powder which is obtained by mixing the powder of the raw coke composition with the calcined coke of less than 0.5 wt % with respect to the raw coke composition and applying a compressive shearing stress thereto, the content of the calcined coke included in the compound powder is very small, thus the contact area between the calcined coke and the raw coke composition is not secured sufficiently, and the interface area therebetween is very small. In this case, the area having a low crystallinity which is introduced into the graphite material is very small. Accordingly, it is not possible to suppress the decomposition of the electrolyte solution due to the solvent co-intercalation. In a lithium ion secondary battery using the graphite material as a negative electrode material, the decomposition of the electrolyte solution in the negative electrode easily occurs, the leak current of the negative electrode increases, the difference from the leak current of the positive electrode increases, the operational ranges of capacities of the positive and negative electrodes vary, and the service life characteristic degrades, which is not desirable.

On the other hand, when the powder of the raw coke composition is mixed with the calcined coke of more than 10 wt % with respect to the raw coke composition, the amount of the mixed calcined coke is very large in the void area between the hexagonal mesh laminates of the raw coke composition. At this time, the void areas necessary for embedding all the mixed calcined coke in the powder of the raw coke composition is very insufficient, thus a large amount of calcined coke is not embedded in the raw coke composition but is attached to the particle surface of the raw coke composition, and thus a compound powder having large unevenness on the particle surface is obtained. The specific surface area of the graphite material obtained by carbonizing and graphitizing the compound powder is very large. Accordingly, in a lithium ion secondary battery using the graphite material as a negative electrode material, the contact area between the electrolyte solution and the graphite material of the negative electrode increases, thus the electrolyte solution is easily decomposed, the leak current of the negative electrode increases, the difference from the leak current of the positive electrode increases, the operational ranges of capacity of the positive and negative electrodes vary, and thus the service life characteristic degrades. The more preferable content of the calcined coke is in a range of 1 wt % to 5 wt %.

In the invention, the reason for setting the atomic ratio H/C of hydrogen atoms H and carbon atoms C in the raw coke composition to a range of 0.30 to 0.50 and setting the microstrength thereof to a range of 7 wt % to 17 wt % will be described below.

Since the raw coke composition having such parameters has a void area between the appropriate hexagonal mesh laminates, it is possible to obtain a compound powder in which the calcined coke is embedded in the particle surface of the raw coke composition. Since the raw coke composition has a bonding strength between the appropriate hexagonal mesh laminates, it is possible to form a strong carbon-carbon bond between the calcined coke and the hexagonal mesh laminates in the graphite in the graphite material obtained by graphitizing the compound powder.

The H/C of the raw coke composition is a ratio of a value obtained by dividing the total hydrogen content (TH (wt %)) by the atomic weight of hydrogen to a value obtained by dividing the total carbon content (TC (wt %)) by the atomic weight of carbon.

The total hydrogen content is measured from the moisture content, which is generated from a combustion gas obtained by completely combusting a sample in an oxygen flow at 750° C., using a coulometric titration method (Karl-Fisher method). In the Karl-Fisher method of a coulometric titration formula, by inputting an electrolyte solution including iodide ions, sulfur dioxide, a base (RN), and alcohol at major components to a titration cell in advance and inputting a sample to the titration cell, the moisture in the sample reacts as shown in Formula 4. The sample is measured, for example, after being subjected to a coking process and then being cooled in a dry atmosphere.

[Chem. 6]

$$H_2O + I_2 + SO_2 + CH_3OH + 3RN \rightarrow 2RN.HI + RN.HSO_4CH \quad (4)$$

Iodine necessary for this reaction is obtained by causing iodide ions to electrochemically react (two-electron reaction) as shown in Formula 5.

[Chem. 7]

$$2I^- - 2e^- \rightarrow I_2 \quad (5)$$

Since 1 mole of water and 1 mole of iodine react, the quantity of electricity necessary for titrating 1 mg of water is calculated as shown in Formula 6 on the basis of a Faraday's law.

Numerical Expression 5

$$(2 \times 96478)/(18.0153 \times 103) = 10.71 \text{ Coulomb} \quad (6)$$

Here, the constant 96478 is the Faraday constant and 18.0513 is the molecular weight of water.

The moisture content is obtained by measuring the quantity of electricity necessary for producing iodine. The total hydrogen content (TH (wt %)) is calculated by converting the obtained moisture content into a hydrogen content and dividing the hydrogen content by the weight of the sample used for the measurement.

In measurement of the total carbon content, a sample is combusted in an oxygen flow of 1150° C., is converted into carbon dioxide (and some carbon monoxide), and is carried by the surplus oxygen flow, and the total carbon content (TC (wt %)) is calculated by a $CO_2 + CO$ infrared detector.

The atomic ratio H/C of the raw coke composition is in a range of 0.30 to 0.50. The atomic ratio H/C is an index indicating the area of a hexagonal mesh sheet, that is, the crystallite size. When the value of H/C is small, the ratio of the carbon component included in the raw coke composition is great, and thus the area of the hexagonal mesh sheet is large. On the other hand, when the value of H/C is large, the ratio of the hydrogen component included in the raw coke composition, thus a carbon-carbon bond is not formed well, and thus the area of the hexagonal mesh sheet is small. A large number of unorganized carbons not belonging to the reticulated plane is included in the raw coke composition. In the process of carbonization and graphitization, the unorganized carbons have a feature that the unorganized carbons received in the reticulated plane are bonded to each other with the growth of the reticulated plane to form a hexagonal mesh sheet or that they form a carbon-carbon bond with the unorganized carbons of the neighboring carbon materials.

The area of the hexagonal mesh sheet of the particles in the powder of the raw coke composition obtained by pulverizing and classifying the raw coke composition having an atomic ratio H/C of less than 0.30 is large. In the powder of the raw coke composition, the amount of unorganized carbons which can form a carbon-carbon bond with the neighboring unorganized carbons is very small. Accordingly, when the compound powder in which the calcined coke is embedded in the particle surface of the raw coke composition is carbonized and graphitized, the unorganized carbons on the particle surface of the calcined coke and the unorganized carbons in the raw coke composition cannot form a carbon-carbon bond.

In this case, in the obtained graphite material, a crack is generated in the interface between the calcined coke and the hexagonal mesh laminate, and edges of crystallites are exposed from the cracked portion. In a lithium ion secondary battery using the graphite material as a negative electrode material, the electrolyte solution is easily decomposed in the edges of the crystallites exposed from the cracked portion of the graphite material. In this case, the difference between the leak current of the negative electrode and the leak current of the positive electrode increases, thus the operational ranges of capacity of the positive and negative electrodes vary, and thus the service life characteristic degrades.

In contrast, when the atomic ratio H/C in the raw coke composition is greater than 0.50, the area of the hexagonal mesh sheet constituting the raw coke composition is small and the void area between the hexagonal mesh laminates is very large. Accordingly, the calcined coke is collectively embedded in a large void area. At this time, since the void area is excessively large, the mechanical energy due to the compressive shearing stress can be easily concentrated on the void and the bond of the unorganized carbons present in the void area is cut. In the graphite material obtained by carbonizing and graphitizing the compound powder in this state, edge faces formed by the cutting of the bond between the unorganized carbons present in the void are exposed from the particle surface. In a lithium ion secondary battery using the graphite material as a negative electrode material, the decomposition of the electrolyte solution using the localized electrons present in the edge faces as a catalyst easily occurs. Accordingly, since the leak current of the negative electrode increases and the difference from the leak current of the positive electrode increases, the operational ranges of capacity of the positive and negative electrodes vary and the service life characteristic degrades, which is not desirable.

Accordingly, the H/C of the raw coke composition is set to the range of 0.30 to 0.50. By mixing the calcined coke with the powder of the raw coke composition having a physical property within this range and being pulverized and classified so as to have a predetermined particle size and applying the compressive shearing stress thereto, a compound powder in which the calcined coke is embedded in the particle surface of the raw coke composition is obtained. When the compound powder is carbonized and graphitized, it is possible to realize a graphite material in which a strong carbon-carbon bond is formed, the amount of crystallite edges exposed form the particle surface is very small, and areas having a low crystallinity are introduced.

A microstrength is a value representing the weight of the sample on a sieve by percentage after inputting 2 g of the sample of 20 to 30 mesh and 12 steel balls with a diameter of 5/16 inch (7.9 mm) to a steel cylinder (with an inner diameter of 25.4 mm and a length of 304.8 mm), rotating a vertical plane in a direction perpendicular to the tube at 25 rpm by 800 turns (that is, rotating the cylinder in a state in which the rotation axis is set horizontally so as to trade places vertically as if rotating a propeller), and then sieving the resultant with a 48 mesh.

The microstrength of the raw coke composition is in a range of 7 wt % to 17 wt %. The microstrength is an index indicating the bonding strength between neighboring crystallites.

When the microstrength of the raw coke composition is less than 7 wt %, the bonding strength between the unorganized carbons present in the void area between the hexagonal mesh laminates is very small. Accordingly, when the calcined coke is embedded in the void area, the bond between the unorganized carbons present in the void can be easily cut. In the graphite material obtained by carbonizing and graphitizing the compound powder in this state, edge faces formed by the cutting of the bond between the unorganized carbons present in the void are exposed from the particle surface. In a lithium ion secondary battery using the graphite material as a negative electrode material, the decomposition of the electrolyte solution using the localized electrons present in the edge faces as a catalyst easily occurs. Accordingly, since the leak current of the negative electrode increases and the difference from the leak current of the positive electrode increases, the operational ranges of capacity of the positive and negative electrodes vary and the service life characteristic degrades, which is not desirable.

When the microstrength of the raw coke composition is more than 17 wt %, the bonding strength between the neighboring crystallites is very large. This is because the unorganized carbon present in the void area and the neighboring hexagonal mesh laminate construct a strong three-dimensional chemical bond. In this way, when the hexagonal mesh laminates have a strong bond, it is difficult to embed the calcined coke in the void area of the raw coke composition. That is, even when the powder of the raw coke composition and the calcined coke are mixed and a compressive shearing stress is applied thereto, a compound complex in which the calcined coke is not embedded in the particle surface of the raw coke composition but is attached to the surface is obtained. In the graphite material obtained by carbonizing and graphitizing the compound powder, unevenness on the particle surface is large and thus the specific surface area is very large. In a lithium ion secondary battery using the graphite material as a negative electrode material, the contact area between the electrolyte solution and the graphite of the negative electrode increases and thus the decomposition of the electrolyte solution easily occurs. Accordingly, since the leak current of the negative electrode increases and the difference from the leak current of the positive electrode increases, the operational ranges of capacity of the positive and negative electrodes vary and the service life characteristic degrades, which is not desirable.

Accordingly, the microstrength of the raw coke composition is set to the range of 7 wt % to 17 wt %. By mixing the calcined coke with the raw coke composition having a physical property within this range and being pulverized and classified so as to have a predetermined particle size and applying the compressive shearing stress thereto, a compound powder in which the calcined coke is embedded in the particle surface of the raw coke composition can be obtained without cutting the bond between the unorganized carbons present in the void area of the raw coke composition. When the compound powder is carbonized and graphitized, it is possible to realize a graphite material in which a strong carbon-carbon bond is formed, the amount of crystallite edges exposed form the particle surface is very small, and areas having a low crystallinity are introduced.

As described above, by using the manufacturing method according to the invention, it is possible to obtain a graphite material having a structure in which areas having a low crystallinity are introduced in highly crystalline structures and having a small amount of edges exposed from the particle surfaces.

The raw coke composition used in the invention is obtained by coking a heavy oil composition through the use of a delayed coking process.

Examples of the components of a heavy oil composition include a bottom oil (fluid catalytic cracking decant oil (FCC DO)) of a fluid catalytic cracker, an aromatic content extracted from the fluid catalytic cracking decant oil, hydrodesulfurized oil obtained by performing a hydrodesulfurization process on a heavy oil, a vacuum residual oil (VR), a desulfurized deasphalted oil, coal-derived liquid, a coal solvent-extracted oil, an atmospheric residual oil, a shell oil, a tar sand bitumen, a naphtha-tar pitch, an ethylene bottom oil, a coal-tar pitch, and heavy oils obtained by hydrogenating them. These heavy oils may be used singly or in combination of two or more types. The blending ratio of two or more types of heavy oils can be appropriately adjusted depending on the features and states of a heavy oil to be used so that the physical properties of the raw coke composition obtained by coking the raw coke composition through the use of a delayed coking process include an atomic ratio H/C of 0.30 to 0.50 and a microstrength of 7 wt % to 17 wt %. The features and states of the base oil vary depending on the type of a crude oil, the processing conditions until the base oil is obtained from the crude oil, and the like.

The bottom oil of the fluid catalytic cracker is a bottom oil of a fluidized-bed fluid catalytic cracker for selectively performing a decomposition reaction using a catalyst and using a vacuum gas oil as a base oil to obtain high-octane FCC gasoline. The vacuum gas oil used as the base oil is preferably a desulfurized vacuum gas oil (preferably with a sulfur content of 500 wt ppm or less and a density of $0.8/cm^3$ or more at 15° C.) obtained by directly desulfurizing an atmospheric distillation residual oil.

The aromatic content extracted from the fluid catalytic cracking decant oil is an aromatic content when a component is selectively extracted using dimethylformamide or the like and is divided into an aromatic content and a saturated content. The hydrodesulfurized oil obtained by performing a high hydrodesulfurization process on a heavy oil is, for example, a heavy oil with a sulfur content of 1.0 wt % or less, a nitrogen content of 0.5 wt % or less, an aromatic carbon content (fa) of 0.1 or more which is obtained by performing a hydrodesulfurization process on a heavy oil with a sulfur content of 1 wt % or more at a hydrogen partial pressure of 10 MPa or more. The hydrodesulfurized oil is preferably a hydrodesulfurized oil obtained by hydrodesulfurizing an atmospheric distillation residual oil in the presence of a catalyst so as to have a hydrocracking ratio of 25% or less.

The vacuum residual oil (VR) is a bottom oil of a vacuum distillator obtained by inputting a crude oil to an atmospheric distillatory to obtain gases, a light oil, and an atmospheric residual oil and then changing the atmospheric residual oil, for example, at a reduced pressure of 10 to 30 Torr in a heating furnace outlet temperature range of 320° C. to 360° C.

The desulfurized deasphalted oil is obtained by processing an oil such as a vacuum distillation residual oil by the use of a solvent deasphalting apparatus using propane, butane, pentane, or a mixture thereof as a solvent, removing the asphaltene content, and desulfurizing the obtained deasphalted oil (DAO) preferably up to a sulfur content of 0.05 wt % to 0.40 wt % using an indirect desulfurizer (Isomax) or the like.

The atmospheric residual oil is a fraction having the highest boiling point which is obtained by inputting a crude oil to an atmospheric distillatory and fractionally distilling the crude oil into gases and LPG, a gasoline fraction, a lamp oil fraction, a light oil fraction, and an atmospheric residual oil depending on the boiling points of the fractions. The heating temperature varies depending on the producing area of the crude oil or the like and is not particularly limited as long as the crude oil can be fractionally distilled into the fractions. For example, the crude oil is heated at 320° C.

A preferable example of heavy oil composition is a heavy oil composition satisfying three conditions of (1) an aromatic content ratio (aromatic index) fa of 0.3 to 0.65, (2) a normal paraffin content of 5 wt % to 20 wt %, and (3) a content of a desulfurized deasphalted oil of 7 wt % to 15 wt %.

The heavy oil is processed at high temperatures to cause pyrolytic reactions and polycondensation reactions and a green coke is produced through a process of producing a large liquid crystal called a mesophase as an intermediate product.

At this time, a base oil composition including all of (1) a heavy oil component forming an excellent bulk mesophase, (2) a heavy oil component which can produce a gas having a function of limiting the size of a hexagonal mesh laminate constituting a mesophase when carbonizing and solidifying the bulk mesophase by polycondensation, and (3) a base oil component bonding the cut hexagonal mesh laminates to each other can be particularly preferably used. The (1) heavy oil component forming an excellent bulk mesophase is a component giving an aromatic index fa of 0.3 to 0.65, the (2) heavy oil component which can produce a gas is a component corresponding to the normal paraffin content of 5 wt % to 20 wt %, and the (3) component bonding the hexagonal mesh laminates is a desulfurized deasphalted oil contained in the range of 7 wt % to 15 wt %.

The reason for using such heavy oil composition as a source material of the raw coke composition of the invention is that a hexagonal mesh sheet formed by the heavy oil component producing an excellent bulk mesophase is limited to a relatively small size to keep a degree of parallelism between the neighboring mesh sheets of the hexagonal mesh laminate formed after the coking high and the desulfurized deasphalted oil appropriately bonds the neighboring hexagonal mesh laminates to each other.

There is no example in which the desulfurized deasphalted oil is added during manufacturing the green coke, and it comes as a surprise that containing the desulfurized deasphalted oil is effective.

The aromatic carbon content ratio (aromatic index) (fa) can be obtained through the use of a Knight method. In the Knight method, a carbon distribution is divided into three components $(A_1, A_2, A_3)$ in a spectrum of an aromatic carbon using a $^{13}$C-NMR method. Here, $A_1$ represents the number of carbons in an aromatic ring and substituted aromatic carbons and a half of non-substituted aromatic carbons (corresponding to peaks of about 40 to 60 ppm of $^{13}$C-NMR), $A_2$ represents the other half of the non-substituted aromatic carbons (corresponding to peaks of about 60 to 80 ppm of $^{13}$C-NMR), and $A_3$ represents the number of aliphatic carbons (corresponding to peaks of about 130 to 190 ppm of $^{13}$C-NMR). From these, fa is obtained using the following expression.

Numerical Expression 6

$$fa=(A_1+A_2)/(A_1+A_2+A_3)$$

It is described in Document ("Characterization of Pitches II. Chemical Structure", Yokono, Sanada, (Carbon, 1981 (No. 105), pp. 73-81) that the $^{13}$C-NMR method is the best method capable of quantitatively calculating the most basic quantity fa of a pitch-based chemical structure parameter.

The content of normal paraffin in the heavy oil composition means a value measured through the use of gas chromatography using a capillary column. Specifically, verification is performed using a standard reference material of normal paraffin and then a sample of a non-aromatic components separated by the elution chromatography is measured using the capillary column. The content based on the total weight of the base oil composition can be calculated from this measured value.

When the aromatic index fa of the heavy oil composition is less than 0.3, the yield of a coke from the heavy oil composition is extremely lowered, an excellent bulk mesophase is not formed, and it is difficult to develop a crystalline structure in spite of the carbonization and graphitization, which is not desirable. When fa is more than 0.65, plural mesophases are rapidly generated in a matrix in the course of producing a green coke and rapid combination of mesophases is more repeated than single growth of mesophases. Accordingly, since the combination rate of the mesophases is higher than the generation rate of gases from the normal paraffin-containing component, it is not possible to limit hexagonal mesh sheet of a bulk mesophase to a small size, which is not desirable.

The aromatic index fa of the heavy oil composition is preferably in a range of 0.3 to 0.65. Here, fa can be calculated from a density D and a viscosity V of a heavy oil composition, and fa of a heavy oil composition with a density D of 0.91 to 1.02 g/cm$^3$ and with a viscosity V of 10 to 220 mm$^2$/sec is preferably in a range of 0.3 to 0.65.

The normal paraffin component appropriately included in the heavy oil composition performs an important function of limiting a bulk mesophase to a small size by generating gases during the coking process as described above. The generation of gases also serves to uniaxially orient neighboring mesophases limited to a small size and to selectively orient the overall system. When the content of the normal paraffin-containing component is less than 5 wt %, mesophases grow more than necessary and large carbon reticulated plane are formed, which is not desirable. When the content of the normal paraffin-containing component is more than 20 wt %, excessive gases are generated from the normal paraffin, the orientation of the bulk mesophase tends to be disturbed in the opposite direction, and it is thus difficult to develop the crystalline structure in spite of the carbonization and graphitization, which is not desirable. As described above, the content of the normal paraffin is preferably in a range of 5 wt % to 20 wt %.

The desulfurized deasphalted oil serves to appropriately combine the neighboring hexagonal mesh laminates as described above, and the content in the heavy oil composition is preferably in a range of 7 wt % to 15 wt %. When the content of the desulfurized deasphalted oil is less than 7 wt % or more than 15 wt %, the microstrength of the heavy oil composition obtained after the coking process may be less than 7 wt % or more than 17 wt %, which is not desirable.

The heavy oil composition having this feature is coked to form the raw coke composition in the invention. A delayed coking method can be preferably used as a method of coking a heavy oil composition satisfying a predetermined condition. More specifically, a method of heating a base oil composition to obtain a green coke through the use of a delayed coker under the condition of a controlled coking pressure can be preferably used. The preferable operating conditions of the delayed coker include a pressure of 0.1 MPa to 0.8 MPa and a temperature of 400° C. to 600° C.

The reason for setting the preferable range of the operating pressure of a coker is that the emission speed of gases generated from the normal paraffin-containing component to the outside of the system can be controlled by the use of the pressure. As described above, since the size of the carbon reticulated plane constituting a mesophase is controlled by the use of the generated gases, the residence time of the generated gases in the system serves as an important control parameter for determining the size of the reticulated plane. The reason for setting the preferable range of the coker operating temperature is that it is a temperature necessary for causing a mesophase to grow from a heavy oil adjusted to achieve the advantageous effect of the invention.

The raw coke composition obtained in this way is pulverized and classified so as to have a predetermined particle size. The particle size is preferably equal to or less than 30 µm in terms of an average particle diameter. The average particle diameter is measured using a laser-diffraction particle size analyzer. The reason for setting the average particle diameter to be equal to or less than 30 µm is that this particle size range is generally and suitably used for the negative carbon material of a lithium ion secondary battery. The average particle diameter is preferably in a range of 5 µm to 30 µm. This is because when the powder of the raw coke composition with an average particle diameter of less than 5 µm and the calcined coke are mixed and the compressive shearing stress is applied thereto, sufficient mechanical energy cannot be applied to the particles and thus the calcined coke cannot be embedded in the particle surface of the raw coke composition.

Here, the method of manufacturing a graphite material used as a negative electrode of a lithium ion secondary battery according to the invention includes a process of mixing the powder of the raw coke composition with the calcined coke and applying the compressive shearing stress. At this time, the compressive shearing stress applied includes collision, friction, shearing stresses, and the like in addition to the compressive stress and the shearing stress. The mechanical energy provided by these stresses is greater than the energy provided by general agitation, and these types of energy are given to the particle surfaces, thereby exhibiting an effect called a mechanochemical phenomenon such as spheronization of particle shapes and complexing of particles. In order to provide the mechanical energy for causing the mechanochemical phenomenon to the raw coke composition, an apparatus capable of simultaneously applying shearing, compression, collision stresses, and the like has only to be used and the structure and principle of the apparatus are not particularly limited. Examples of such an apparatus include a ball type kneader such as rotary ball mill, a wheel type kneader such as an edge runner, a hybridization system (made by Nara Machinery Co., Ltd.), a mechano-fusion (made by Hosokawa Micron Corporation), a NOBILTA (made by Hosokawa Micron Corporation), a COMPOSI (made by Nippon Coke & Engineering Co., Ltd.).

The manufacturing conditions in the process of applying the compressive shearing stress differ depending on the apparatus to be used. For example, as shown in FIG. 4, an apparatus 30 having a structure in which compaction and compressive stresses are added to a powder P in a gap 33 between a rotating blade (in a rotating direction R1) 31 and a housing 32 is used.

When the NOBILTA (made by Hosokawa Micron Corporation) is used, it is preferable that the number of rotation of the blade be set to a range of 1500 rpm to 5000 rpm and the processing time be set to a range of 10 minutes to 180 minutes. When the number of rotation is less than 1500 rpm or when the processing time is less than 10 minutes, sufficient compressive shearing stress cannot be applied to the powder of the raw coke composition. On the other hand, when the process is performed for a time longer than 180 minutes, an excessive compressive shearing stress is applied to the powder of the raw coke composition and the particle shape is markedly deformed, which is not desirable.

When the COMPOSI (made by Nippon Coke & Engineering Co., Ltd.) is used, it is preferable that the peripheral speed be set to a range of 50 m/s to 80 m/s and the processing time be set to a range of 10 minutes to 180 minutes. When the peripheral speed is less than 50 m/s or when the processing time is less than 10 minutes, sufficient compressive shearing stress cannot be applied to the powder of the raw coke composition. On the other hand, when the process is performed for a time greater than 180 minutes, an excessive compressive shearing stress is applied to the powder of the raw coke composition and the particle shape is markedly deformed, which is not desirable.

When the mechano-fusion (made by Hosokawa Micron Corporation) is used, it is preferable that the number of rotation of the blade be set to a range of 500 rpm to 3000 rpm and the processing time be set to a range of 10 minutes to 300 minutes. When the number of rotation is less than 500 rpm or when the processing time is less than 10 minutes, sufficient compressive shearing stress cannot be applied to the powder of the raw coke composition. On the other hand, when the process is performed for a time longer than 300 minutes, an excessive compressive shearing stress is applied to the powder of the raw coke composition and the particle shape is markedly deformed, which is not desirable.

When the hybridization system (made by Nara Machinery Co., Ltd.) is used, it is preferable that the peripheral speed be set to a range of 40 m/s to 60 m/s and the processing time be set to a range of 5 minutes to 180 minutes. When these conditions are satisfied, a sufficient compressive shearing stress can be applied to the powder of the raw coke composition without markedly changing the particle shape.

When the raw coke composition in the invention is used, a compound powder in which the calcined coke is embedded in the particle surface of the raw coke composition is obtained by preferably setting the control temperature of the process of applying the compressive shearing stress to a range of 60° C. to 250° C. Particularly, the processing control temperature is preferably set to a range of 120° C. to 200° C.

The compound powder in which the calcined coke is embedded in the particle surface of the raw coke composition in this way is carbonized and graphitized so that the Lc(112) calculated from the (112) diffraction line measured through the use of a wide-angle X-ray diffraction method is in a range of 4 nm to 30 nm.

The carbonization and graphitization method is not particularly limited, but a method of carbonizing (preliminarily calcining) the graphite precursor in the atmosphere of inert gas such as nitrogen, argon, or helium at a highest temperature of 900° C. to 1500° C. for a highest temperature retention time of 0 to 10 hours and performing a heating process in the same atmosphere of inert gas at a highest temperature of 2500° C. to 3200° C. for a highest temperature retention time of 0 to 100 hours can be used.

In general, the graphite material subjected to a heating process at a graphitization temperature of higher than 2800° C. progresses in crystallization, the capacity of a lithium ion secondary battery using the graphite material as a negative electrode material is large, but the decomposition of the electrolyte solution due to the solvent co-intercalation easily occurs, and thus the service life characteristic degrades. However, according to the invention, since the areas having a low crystallinity are partially introduced into the highly crystalline structure, it is possible to have the high capacity and the excellent service life characteristic occur together.

In the invention, the reason for setting the Lc(112) calculated from the (112) diffraction line measured through the use of a wide-angle X-ray diffraction method to the range of 4 nm to 30 nm will be described below.

First, in the graphite material in which the Lc(112) is less than 4 nm, the development of a crystalline structure is not sufficient and the capacity of a lithium ion secondary battery using the graphite material is small, which is not desirable. When the raw coke composition in the invention is graphitized at high temperatures for a long time, the Lc(112) does not become greater than 30 nm and thus the upper limit is set to 30 nm.

As described above, the compound powder in which the calcined coke is embedded in the particle surface of the raw coke composition is obtained by mixing the calcined coke with an average particle diameter of 0.1 μm to 3.0 μm with the raw coke composition having an atomic ratio H/C of 0.30 to 0.50 and a microstrength of 7 wt % to 17 wt % at a ratio of 0.5 wt % to 10 wt % and applying the compressive shearing stress thereto, and the graphite material in which the crystallite size Lc(112) of the (112) diffraction line measured through the use of a wide-angle X-ray diffraction method is in the range of 4 nm to 30 nm, the appropriate disturbance is introduced into the crystalline structure on the particle surface, and the edge faces exposed from the particle surface are very small is obtained by carbonizing and graphitizing the compound powder. When this graphite material is used as the negative electrode material of a lithium ion secondary battery, it is possible to secure very high reliability.

In the past, there was no example in which a graphite material manufactured using a desulfurized deasphalted oil as a source material is used as the negative electrode material of a lithium ion secondary battery. The invention can provide a desired graphite material by carbonizing and graphitizing the compound powder which are obtained by mixing the desulfurized deasphalted oil as a preferable aspect of a heavy oil composition, mixing the calcined coke into the powder of the raw coke composition having a predetermined atomic ratio H/C and a predetermined microstrength, and applying the compressive shearing stress thereto.

The method of manufacturing a negative electrode of a lithium ion secondary battery is not particularly limited but, for example, a method of pressing and shaping a mixture (negative-electrode mixture) including the graphite material according to the invention, a binder (binding agent), a conducting agent if necessary, and an organic solvent in a predetermined size can be used. A method of rolling a material (negative-electrode mixture), which is obtained by kneading the graphite material according to the invention, a binder (binding agent), a conducting agent, and the like in an organic solvent to produce slurry and applying and drying the slurry onto a collector such as a copper foil, and cutting out the resultant in a predetermined size can be also used.

Examples of the binder (binding agent) include polyvinylidene fluoride, polytetrafluoroethylene, polyacrylonitrile, polyethyleneterephthalate, and SBR (Styrene-Butadiene Rubber). The content of the binder in the negative-electrode mixture can be appropriately set to a range of about 1 to 30 parts by weight with respect to 100 parts by weight of a graphite material if necessary in design of a battery.

Examples of the conducting agent include carbon black, graphite, acetylene black, indium-tin oxide exhibiting conductivity, and conductive polymers such as polyaniline, polythiophene, and polyphenylenevinylene. The content of the conducting agent is preferably in a range of 1 to 15 parts by weight with respect to 100 parts by weight of a graphite material.

Examples of the organic solvent include dimethylformamide, N-methylpyrrolidone, pyrrolidone, N-methylthiopyrrolidone, hexamethylphosphoamide, dimethylacetamide, isopropanol, and toluene.

The method of mixing a graphite material, a binder, a conducting agent if necessary, and an organic solvent can employ a known apparatus such as a screw kneader, a ribbon mixer, a universal mixer, and a planetary mixer. The mixture is shaped through roll pressing or press pressing, and the pressure at that time is preferably in a range of 100 MPa to 300 MPa.

The material of the collector is not particularly limited as long as it does not form an alloy with lithium. Examples thereof include copper, nickel, titanium, and stainless steel. The shape of the collector is not particularly limited, but examples thereof include band shapes such as a foil shape, a punched foil shape, and a mesh shape. A porous material such as porous metal (foamed metal) or carbon paper can be used.

The method of applying the slurry onto the collector is not particularly limited, but examples thereof include known methods such as a metal mask printing method, an electrostatic coating method, a dip coating method, a spray coating method, a roll coating method, a doctor blade method, a gravure coating method, a screen printing method, and a die coater method. After the application, a rolling process using a flat press, a calender roll, or the like is generally performed if necessary.

The unification of the negative-electrode slurry formed in a sheet shape or pellet shape and the collector can be performed using known methods such as rolling, pressing, and a combination thereof.

A lithium ion secondary battery using the graphite material for a negative electrode of a lithium ion secondary battery according to this embodiment is obtained, for example, by arranging the negative electrode manufactured as described above and the positive electrode to face each other with a separator interposed therebetween and injecting an electrolyte solution thereto.

The active material used for the positive electrode is not particularly limited, and metal compound, metal oxide, metal sulfide, or a conductive polymer material capable of doping or intercalating lithium ions can be used. Examples thereof include lithium cobalt oxide ($LiCoO_2$), lithium nickel oxide ($LiNiO_2$), lithium manganase oxide ($LiMn_2O_4$), lithium composite oxides ($LiCo_XNi_YM_ZO_2$, X+Y+Z=1, M: Mn, Al, or the like), oxides in which some transition metals are substituted with other elements, lithium-vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine $LiMPO_4$ (M:Co, Ni, Mn, Fe), conductive polymers such as polyacetylene, polyaniline, polypyrrole, polythiophene, and polyacene, porous carbons, and mixtures thereof.

For example, an unwoven fabric, a cross, and a porous film including polyolefin such as polyethylene and polypropylene as a major component, or combinations thereof can be used as the separator. When the positive electrode and the negative electrode of a lithium ion secondary battery to be manufactured do not come in direct contact with each other, the separator does not have to be used.

Known organic electrolyte solutions, inorganic solid electrolytes, and polymer solid electrolytes can be used as the electrolyte solution and the electrolyte used for a lithium ion secondary battery. From the viewpoint of electric conductivity, the organic electrolyte solution can be preferably used.

Examples of the organic electrolyte solution include ethers such as dibutyl ether, ethyleneglycol monomethyl ether, ethyleneglycol monoethyl ether, ethyleneglycol monobutyl ether, diethyleneglycol monomethyl ether, and ethyleneglycol phenyl ether, amides such as N-methylformamide, N,N-dimethylformamide, N-ethylformamide, N,N-diethylformamide, N-methylacetamide, N,N-dimethylacetamide, N-ethylacetamide, and N,N-diethylacetamide, sulfur-containing compounds such as dimethylsulfoxide and sulfolane, dialkyl ketones such as methylethyl ketones and methylisobutyl ketone, cyclic ethers such as tetrahydrofurane and 2-methoxytetrahydrofurane, cyclic carbonates such as ethylene carbonate, butylene carbonate, propylene carbonate, and vinylene carbonate, chained carbonate such as diethyl carbonate, dimethyl carbonate, methylethyl carbonate, and methylpropyl carbonate, cyclic ester carbonates such as γ-butyrolactone and γ-valerolactone, chained ester carbonates such as methyl acetate, ethyl acetate, methyl propionate, and ethyl propionate, and organic solvents such as N-methyl 2-pyrrolidinone, acetonitrile, and nitromethane. These solvents can be used singly or in combination of two or more.

Various lithium salts can be used as a solute of the solvents. Examples of a known lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$, and $LiN(C_2F_5SO_2)_2$.

Examples of the polymer solid electrolyte include polyethylene oxide derivatives and polymers including the derivatives, polypropylene oxide derivatives and polymers including the derivatives, ester phosphate polymers, and polycarbonate derivatives and polymers including the derivatives.

Selection of members necessary for the configuration of a battery other than the above-mentioned ones is not limited at all.

The structure of a lithium ion secondary battery is not particularly limited, but a structure in which a winding electrode group in which a positive electrode and a negative electrode formed in a band shape are spirally wound with a separator interposed therebetween is inserted into a battery case and the resultant is sealed or a structure in which a positive electrode and a negative electrode formed in a flat panel shape are sequentially stacked with a separator interposed therebetween is enclosed in a case is generally employed. The lithium ion secondary battery can be used, for example, as a paper type battery, a button type battery, a coin type battery, a laminated battery, a cylindrical battery, and a square battery.

Hereinafter, an eighth embodiment to a ninth embodiment of the invention will be described in detail.

The inventors have an idea of the relationship between a process of carbonizing and graphitizing a compound powder in which acetylene black is embedded in the particle surfaces of a raw coke composition having an atomic ratio H/C of hydrogen atoms H and carbon atoms C in a range of 0.30 to 0.50 and a microstrength of 7 wt % to 17 wt %, a structure in which areas having a low crystallinity are partially introduced into a highly crystalline structure, and an advantageous effect of obtaining a graphite material having a small amount of edges exposed from the particle surfaces, as follows.

First, acetylene black has very high purity because it is manufactured by pyrolyzing an acetylene gas, and is a graphitization-retardant carbon material having a structure in which the same reticulated plane as in the graphite are formed concentrically. Spherical basic particles with a size of about 3 nm to 500 nm are aggregated with a van der Waals force to form an aggregate. The aggregate has a complex aggregated structure in which fine spherical basic particles are irregularly branched, the degree of aggregating of several to several tens of basic particles is called agglomerate, and the state in which the agglomerates are collected is called structure.

When the graphitization-retardant acetylene black is heated and graphitized, the growth of crystallites in the basic particles is very small in comparison with the growth of crystallites when an easily graphitized carbon material is graphitized. Accordingly, the crystallinity of the graphitized acetylene black is much lower than that of the graphite material.

The crystallites in the basic particles of the acetylene black are oriented anisotropically such that the c axis is perpendicular to the surface of a spherical particle. Accordingly, the exposure of crystallite edges is very small in any region of the particle surface. The anisotropic orientation of the crystallites remains in the same state even after the graphitization.

When the compound powder in which acetylene black having this feature is embedded in the particle surface of the raw coke composition is carbonized and graphitized, the crystallites can grow largely in the region of the raw coke composition, but the crystallites can grow small in the region of the acetylene black which is graphitization-retardant carbon. Therefore, in the graphitized graphite material, the region of the raw coke composition in the compound powder remains as an area having a highly crystalline structure, and the region of the acetylene remains as an area having a low crystallinity in the graphite material.

In the process of carbonizing and graphitizing the compound powder, a carbon-carbon bond is formed in the interface between the raw coke composition and the acetylene black. On the other hand, when the carbon-carbon bond is not formed, a crack is generated in the interface between the raw coke composition and the acetylene black and thus edges of the crystallites are exposed from the cracked portion, which is not desirable.

In this way, a graphite material is obtained which has areas having a low crystallinity which are connected by the carbon-carbon bond in the highly crystalline structure. The introduced areas having a low crystallinity exhibit an advantageous effect of stereoscopically preventing the co-intercalation of an electrolyte solution into the graphite layers.

In the areas having a low crystallinity in the obtained graphite material, the crystallites are oriented such that the c axis is perpendicular to the surface of a basic particle, similarly to acetylene black. Accordingly, the amount of edges exposed from the particle surface of the graphite material is small and it is thus possible to suppress the decomposition reaction of the electrolyte solution having localized electrons as a catalyst.

In this way, through the use of the process of carbonizing and graphitizing the compound powder in which the acetylene black is embedded in the particle surfaces of the raw coke composition, a graphite material having a structure in which areas having a low crystallinity are partially introduced into the highly crystalline structure and a small amount of edges exposed from the particle surfaces is obtained.

Here, the state in which the acetylene black is embedded in the particle surfaces of the raw coke composition means a state in which the acetylene black is embedded without actually protruding from the particle surfaces of the raw coke composition when a SEM image magnified to 1,000 to 5,000 times is observed.

In the invention, two reasons for setting the compound powder to the state in which the acetylene black is embedded in the particle surfaces of the raw coke composition will be described below.

The first reason is that it is possible to suppress an increase in specific surface area of the particles after the graphitization by carbonizing and graphitizing the compound powder in which the acetylene black is embedded in the particle surfaces of the raw coke composition.

In the compound powder in which the acetylene black is embedded in the particle surfaces of the raw coke composition, since the amount of acetylene black protruding from the particle surfaces of the raw coke composition is small, the unevenness of the surface of the graphite material obtained by carbonizing and graphitizing the compound powder is very small and the specific surface area is also small. In a lithium ion secondary battery using the resultant graphite material as a negative electrode material, since the contact area between the electrolyte solution and the particle surfaces of the graphite material is small, the decomposition of the electrolyte solution in the negative electrode does not occur well. In this case, since the operational ranges of capacities of the positive and negative electrodes do not vary well, the service life characteristic is superior.

On the other hand, when a compound powder in which the acetylene black is not embedded in the particle surfaces of the raw coke composition but is attached to the particle surfaces and is carbonized and graphitized, the acetylene black protrudes from the particle surfaces of the graphite material and thus the graphite material having unevenness on the surface and having a large specific surface area is obtained. In a lithium ion secondary battery using the graphite material as a negative electrode material, since the contact area between the electrolyte solution and the particle surfaces of the graphite material is large, the decomposition of the electrolyte solution in the negative electrode easily occurs. In this case, since the difference between leak current of the negative electrode and the leak current of the positive electrode increases, the operational ranges of capacities of the positive and negative electrodes vary and thus the service life characteristic degrades, which is not desirable.

In the invention, the second reason for setting the compound powder to the state in which the acetylene black is embedded in the particle surfaces of the raw coke composition is that a chemical bond is formed in the interface between the highly crystalline structure and the area having a low crystallinity and thus the formation of cracks in the interface therebetween is prevented.

In the course of embedding the acetylene black in the particle surfaces of the raw coke composition due to the compressive shearing stress, the acetylene black is easily embedded in the gap (void area) between the hexagonal mesh laminate constituting the raw coke composition and the neighboring hexagonal mesh laminate. This is because the energy necessary for embedding the acetylene black in the void area between the neighboring hexagonal mesh laminates is smaller than the energy necessary for causing the calcined coke to destroy the hexagonal mesh laminate in the raw coke composition and embedding the calcined coke in the particles. Unorganized carbons having a structure other than a benzene ring as a constituent unit of the hexagonal mesh sheet are present in the void area. These unorganized carbons are chemically connected to the hexagonal mesh laminates. The unorganized carbons remain and have the same function even after carbonizing and graphitizing the raw coke composition.

When the acetylene black is embedded in the void area, the unorganized carbons present on the particle surfaces of the acetylene black can come in sufficient contact with the unorganized carbons in the raw coke composition, and thus a strong carbon-carbon bond is formed with the unorganized carbons contacting each other in the course of subsequent carbonization and graphitization. Accordingly, in the graphite material obtained after the graphitization, the acetylene black and the crystallites in the graphite are chemically connected to each other without forming a crack in the interface therebetween. In this way, the graphite material having a structure in which an area having a low crystallinity is introduced into a highly crystalline structure is obtained.

On the other hand, when a compound powder in which the acetylene black is not embedded in the particle surface of the raw coke composition but is attached to the surface is carbonized and graphitized, the contact area between the unorganized carbon in the raw coke composition and the acetylene black is very small and thus it is not possible to form a strong carbon-carbon bond between the acetylene black and the unorganized carbon in the raw coke composition. In this case, in the obtained graphite material, a crack is easily formed in the interface between the acetylene black and the crystallites in the graphite and edges of the crystallites are exposed from the cracked portion. In a lithium ion secondary battery using the graphite material as a negative electrode material, the electrolyte solution is easily decomposed in the edges of the crystallites exposed from the cracked portion in the graphite material. In this case, since the difference between the leak current of the negative electrode and the leak current of the positive electrode increases, the operational ranges of capacities of the positive and negative electrodes vary and the service life characteristic degrades.

In the invention, the reason for setting the amount of acetylene black mixed into the powder of the raw coke composition to a range of 0.5 wt % to 10 wt % with respect to the raw coke composition will be described below.

In a graphite material obtained by carbonizing and graphitizing a compound powder which is obtained by mixing the powder of the raw coke composition with the acetylene black of less than 0.5 wt % with respect to the raw coke composition and applying a compressive shearing stress thereto, the content of the acetylene black included in the compound powder is very small, and thus the areas having a low crystallinity which are introduced into the graphite material are very small. Accordingly, it is not possible to suppress the decomposition of the electrolyte solution due to the solvent co-intercalation. In a lithium ion secondary battery using the graphite material as a negative electrode material, the decomposition of the electrolyte solution in the negative electrode easily occurs, the leak current of the negative electrode increases, the difference from the leak current of the positive electrode increases, the operational ranges of capacities of the positive and negative electrodes vary, and the service life characteristic degrades, which is not desirable.

On the other hand, when the powder of the raw coke composition is mixed with the acetylene black of more than 10 wt % with respect to the raw coke composition, the amount of the mixed acetylene black is very large in the void area between the hexagonal mesh laminates of the raw coke composition. At this time, the void areas necessary for embedding all the mixed acetylene black in the powder of the raw coke composition is very insufficient, thus a large amount of acetylene black is not embedded in the raw coke composition but is attached to the particle surface of the raw coke composition, and thus a compound powder having large unevenness on the particle surface is obtained. The specific surface area of the graphite material obtained by carbonizing and graphitizing the compound powder is very large. Accordingly, in a lithium ion secondary battery using the graphite material as a negative electrode material, the contact area between the electrolyte solution and the graphite material of the negative electrode increases, thus the electrolyte solution is easily decomposed, the leak current of the negative electrode increases, the difference from the leak current of the positive electrode increases, the operational ranges of capacity of the positive and negative electrodes vary, and thus the service life characteristic degrades. The more preferable content of the acetylene black is in a range of 1 wt % to 5 wt %.

The specific surface area of the acetylene black is preferably in a range of 30 $m^2/g$ to 300 $m^2/g$. The specific surface area is measured using a BET multi-point method based on absorption of nitrogen gas after the acetylene black is dried at 180° C. for 3 hours using BELSORP-mini II made by BEL Japan Inc. A compound powder in which the acetylene black is embedded in the particle surface of the raw coke composition is obtained by mixing the acetylene black with the powder of the raw coke composition and applying a compressive shearing stress thereto, and a graphite material having a strong carbon-carbon bond between the acetylene black and the crystallites in the graphite and having an appropriate specific surface area is obtained by carbonizing and graphitizing the compound powder.

In the compound powder obtained by mixing the acetylene black with a specific surface area of less than 30 $m^2/g$ and the powder of the raw coke composition and applying a compressive shearing stress thereto, the contact area between the acetylene black embedded in the void areas in the raw coke composition and the unorganized carbons present in the void areas is very small. When this compound powder is carbonized and graphitized, a strong carbon-carbon bond between the acetylene black and the crystallites in the graphite is not formed during the growth of the crystallites in the course of carbonization and graphitization, which is not desirable.

When acetylene black with a specific surface area of more than 300 $m^2/g$ is added, the specific surface area of the graphite material after graphitization is very large in spite of the graphitization of the compound powder in which the acetylene black is embedded in the raw coke composition. Accordingly, the contact area between the electrolyte solution and the graphite increases and thus capacity degradation is caused, which is not desirable.

The DBP oil absorption of the acetylene black is preferably in a range of 50 to 200 ml/100 g. The DBP oil absorption is an index indicating the development in structure of an aggregate. When the compound powder obtained by mixing the acetylene black with a DBP oil absorption of this range and the powder of the raw coke composition and applying a compressive shearing stress thereto is carbonized and graphitized, a graphite material in which a strong carbon-carbon bond is formed between the acetylene black and the graphite crystallites is obtained.

The DBP oil absorption is defined as an oil absorption per 100 g calculated from 70% of the maximum torque when DBP is added to the acetylene black using an absorption meter.

In the acetylene black of which the DBP absorption is less than 50 ml/100 g, a structure is not developed and the specific surface area is small. When the acetylene black and the powder of the raw coke composition are mixed and a compressive shearing stress is applied thereto, a compound powder in which the contact area between the acetylene black embedded in the void areas of the raw coke composition and the unorganized carbons present in the void areas is very small is obtained. When carbonizing and graphitizing the compound powder, a strong carbon-carbon bond is not formed in the interface therebetween in the course of carbonization and graphitization, which is not desirable.

In the acetylene black of which the DBP absorption is more than 200 ml/100 g, a structure is not highly developed. When the acetylene black and the powder of the raw coke composition are mixed and a compressive shearing stress is applied thereto, the structure of the acetylene black is more greatly developed than the volume of the void areas of the raw coke composition and thus the acetylene black cannot be embedded in the void areas in the raw coke composition. In this case, a compound powder in which the acetylene black is attached to the particle surface of the raw coke composition is obtained. When carbonizing and graphitizing the compound powder, the specific surface area of the graphite particle surface after graphitization greatly increases. Accordingly, the decomposition of the electrolyte solution on the graphite particle surface increases, the leak current of the negative electrode increases, and the difference from the leak current of the positive electrode increases. Accordingly, the operational ranges of capacity of the positive and negative electrodes vary and thus the service life characteristic degrades, which is not desirable.

In the invention, the reason for setting the atomic ratio H/C of hydrogen atoms H and carbon atoms C in the raw coke composition to a range of 0.30 to 0.50 and setting the microstrength thereof to a range of 7 wt % to 17 wt % will be described below.

Since the raw coke composition having such parameters has a void area between the appropriate hexagonal mesh laminates, it is possible to obtain a compound powder in which the acetylene black is embedded in the particle surface of the raw coke composition. Since the raw coke composition has a bonding strength between the appropriate hexagonal mesh laminates, it is possible to form a strong carbon-carbon bond between the acetylene black and the crystallites in the graphite in the graphite material obtained by graphitizing the compound powder.

The H/C of the raw coke composition is a ratio of a value obtained by dividing the total hydrogen content (TH (wt %)) by the atomic weight of hydrogen to a value obtained by dividing the total carbon content (TC (wt %)) by the atomic weight of carbon.

The total hydrogen content is measured from the moisture content, which is generated from a combustion gas obtained by completely combusting a sample in an oxygen flow at 750° C., using a coulometric titration method (Karl-Fisher method). In the Karl-Fisher method of a coulometric titration formula, by inputting an electrolyte solution including iodide ions, sulfur dioxide, a base (RN), and alcohol at major components to a titration cell in advance and inputting a sample to the titration cell, the moisture in the sample reacts as shown in Formula 4. The sample is measured, for example, after being subjected to a coking process and then being cooled in a dry atmosphere.

[Chem. 8]

$$H_2O + I_2 + SO_2 + CH_3OH + 3RN \rightarrow 2RN.HI + RN.HSO_4CH_3 \quad (4)$$

Iodine necessary for this reaction is obtained by causing iodide ions to electrochemically react (two-electron reaction) as shown in Formula 5.

[Chem. 9]

$$2I^- - 2e^- \rightarrow I_2 \quad (5)$$

Since 1 mole of water and 1 mole of iodine react, the quantity of electricity necessary for titrating 1 mg of water is calculated as shown in Formula 6 on the basis of a Faraday's law.

Numerical Expression 7

$$(2 \times 96478)/(18.0153 \times 103) = 10.71 \text{ Coulomb} \quad (6)$$

Here, the constant 96478 is the Faraday constant and 18.0513 is the molecular weight of water.

The moisture content is obtained by measuring the quantity of electricity necessary for producing iodine. The total hydrogen content (TH (wt %)) is calculated by converting the obtained moisture content into a hydrogen content and dividing the hydrogen content by the weight of the sample used for the measurement.

In measurement of the total carbon content, a sample is combusted in an oxygen flow of 1150° C., is converted into carbon dioxide (partially carbon monoxide), and is carried by the surplus oxygen flow, and the total carbon content (TC (wt %)) is calculated by a $CO_2 + CO$ infrared detector.

The atomic ratio H/C of the raw coke composition is in a range of 0.30 to 0.50. The atomic ratio H/C is an index indicating the area of a hexagonal mesh sheet, that is, the crystallite size. When the value of H/C is small, the ratio of the carbon component included in the raw coke composition is large, and thus the area of the hexagonal mesh sheet is large. On the other hand, when the value of H/C is large, the ratio of the hydrogen component included in the raw coke composition, thus a carbon-carbon bond is not formed well, and thus the area of the hexagonal mesh sheet is small.

The area of the hexagonal mesh sheet of the particles in the powder of the raw coke composition obtained by pulverizing and classifying the raw coke composition having an atomic ratio H/C of less than 0.30 is large. Accordingly, the void areas between the hexagonal mesh laminates in which the acetylene black is embedded are very small. When the acetylene black is mixed into the powder of the raw coke composition and a compressive shearing stress is applied thereto, a compound powder in which the acetylene black is not embedded in the raw coke composition but is attached to the particle surface of the raw coke composition is obtained. When such a compound powder is carbonized and graphitized, the specific surface area of the graphite material obtained through graphitization increases greatly. In a lithium ion secondary battery using the graphite material as a negative electrode material, the electrolyte solution in the negative electrode is easily decomposed. Accordingly, since the leak current of the negative electrode increases and the difference from the leak current of the positive electrode increases, the operational ranges of capacity of the positive and negative electrodes vary and the service life characteristic degrades, which is not desirable.

In contrast, when the atomic ratio H/C in the raw coke composition is larger than 0.50, the area of the hexagonal mesh sheet constituting the raw coke composition is small and the void area between the hexagonal mesh laminates is very large. Accordingly, the acetylene black is collectively embedded in a large void area. At this time, since the void area is excessively large, the mechanical energy due to the compressive shearing stress can be easily concentrated on the void and the bond of the unorganized carbons present in the void area is cut. In the graphite material obtained by carbonizing and graphitizing the compound powder in this state, edge faces formed by the cutting of the bond between the unorganized carbons present in the void are exposed from the particle surface. In a lithium ion secondary battery using the graphite material as a negative electrode material, the decomposition of the electrolyte solution using the localized electrons present in the edge faces as a catalyst easily occurs. Accordingly, since the leak current of the negative electrode increases and the difference from the leak current of the positive electrode increases, the operational ranges of capacity of the positive and negative electrodes vary and the service life characteristic degrades, which is not desirable.

Accordingly, the H/C of the raw coke composition is set to the range of 0.30 to 0.50. By mixing the acetylene black with the powder of the raw coke composition having a physical property within this range and being pulverized and classified so as to have a predetermined particle size and applying the compressive shearing stress thereto, a compound powder in which the acetylene black is embedded in the particle surface of the raw coke composition without cutting the bonds between the crystallites present in the void areas in the powder of the raw coke composition is obtained. When the compound powder is carbonized and graphitized, it is possible to realize a graphite material in which the amount of crystallite edges exposed form the particle surface is very small and the areas having a low crystallinity are introduced.

A microstrength is a value representing the weight of the sample on a sieve by percentage after inputting 2 g of the sample of 20 to 30 meshes and 12 steel balls with a diameter of 5/16 inch (7.9 mm) to a steel cylinder (with an inner diameter of 25.4 mm and a length of 304.8 mm), rotating a vertical plane in a direction perpendicular to the tube at 25 rpm by 800 turns (that is, rotating the cylinder in a state in which the rotation axis is set horizontally so as to trade places vertically as if rotating a propeller), and then sieving the resultant with a 48 mesh.

The microstrength of the raw coke composition is in a range of 7 wt % to 17 wt %. The microstrength is an index indicating the bonding strength between neighboring crystallites.

When the microstrength of the raw coke composition is less than 7 wt %, the bonding strength between the unorganized carbons present in the void area between the hexagonal mesh laminates is very small. Accordingly, when the acetylene black is embedded in the void area, the bond between the unorganized carbons present in the void can be easily cut. In the graphite material obtained by carbonizing and graphitizing the compound powder in this state, edge faces formed by the cutting of the bond between the unorganized carbons present in the void are exposed from the particle surface. In a lithium ion secondary battery using the graphite material as a negative electrode material, the decomposition of the electrolyte solution using the localized electrons present in the edge faces as a catalyst easily occurs. Accordingly, since the leak current of the negative electrode increases and the difference from the leak current of the positive electrode increases, the operational ranges of capacity of the positive and negative electrodes vary and the service life characteristic degrades, which is not desirable.

Accordingly, in the compound powder in which the acetylene black is embedded in the void areas, a carbon-carbon bond is not formed well between the acetylene black and the unorganized carbons. In the graphite material obtained by carbonizing and graphitizing the compound powder, a crack can be easily formed in the interface between the acetylene black and the crystallites in the graphite and edges of the crystallites are exposed from the cracked portion. In a lithium ion secondary battery using the graphite material as a negative electrode material, the electrolyte solution in the negative electrode is easily decomposed. Accordingly, since the leak current of the negative electrode increases and the difference from the leak current of the positive electrode increases, the operational ranges of capacity of the positive and negative electrodes vary and the service life characteristic degrades, which is not desirable.

When the microstrength of the raw coke composition is more than 17 wt %, the bonding strength between the neighboring crystallites is very large. This is because the unorganized carbon present in the void area and the neighboring hexagonal mesh laminate construct a strong three-dimensional chemical bond. In this way, when the crystallites have a strong bond, it is difficult to embed the acetylene black in the void area of the raw coke composition. That is, even when the powder of the raw coke composition and the acetylene black are mixed and a compressive shearing stress is applied thereto, a compound complex in which the acetylene black is not embedded in the particle surface of the raw coke composition but is attached to the surface is obtained. In the graphite material obtained by carbonizing and graphitizing the compound powder, unevenness on the particle surface is large and thus the specific surface area is very large. In a lithium ion secondary battery using the graphite material as a negative electrode material, the contact area between the electrolyte solution and the graphite of the negative electrode increases and thus the decomposition of the electrolyte solution easily occurs. Accordingly, since the leak current of the negative electrode increases and the difference from the leak current of the positive electrode increases, the operational ranges of capacity of the positive and negative electrodes vary and the service life characteristic degrades, which is not desirable.

Accordingly, the microstrength of the raw coke composition is set to the range of 7 wt % to 17 wt %. By mixing the acetylene black with the raw coke composition having a physical property within this range and being pulverized and classified so as to have a predetermined particle size and applying the compressive shearing stress thereto, a compound powder in which the acetylene black is embedded in the particle surface of the raw coke composition can be obtained without cutting the bond between the crystallites present in the void area of the raw coke composition. When the compound powder is carbonized and graphitized, it is possible to realize a graphite material in which a strong carbon-carbon bond is formed, the amount of crystallite edges exposed form the particle surface is very small, and areas having a low crystallinity are introduced.

As described above, by using the manufacturing method according to the invention, it is possible to obtain a graphite material having a structure in which areas having a low crystallinity is introduced in highly crystalline structures and having a small amount of edges exposed from the particle surfaces.

The raw coke composition used in the invention is obtained by coking a heavy oil composition through the use of a delayed coking process.

Examples of the components of a heavy oil composition include a bottom oil (fluid catalytic cracking decant oil (FCC DO)) of a fluid catalytic cracker, an aromatic content extracted from the fluid catalytic cracking decant oil, hydrodesulfurized oil obtained by performing a hydrodesulfurization process on a heavy oil, a vacuum residual oil (VR), a desulfurized deasphalted oil, coal-derived liquid, a coal solvent-extracted oil, an atmospheric residual oil, a shell oil, a tar sand bitumen, a naphtha-tar pitch, an ethylene bottom oil, a coal-tar pitch, and heavy oils obtained by hydrogenating them. These heavy oils may be used singly or in combination of two or more types.

The blending ratio of two or more types of heavy oils can be appropriately adjusted depending on the features and states of a heavy oil to be used so that the physical properties of the raw coke composition obtained by coking the raw coke composition through the use of a delayed coking process include an atomic ratio H/C of 0.30 to 0.50 and a microstrength of 7 wt % to 17 wt %. The features and states of the base oil vary depending on the type of a crude oil, the processing conditions until the base oil is obtained from the crude oil, and the like.

The bottom oil of the fluid catalytic cracker is a bottom oil of a fluidized-bed fluid catalytic cracker for selectively performing a decomposition reaction using a catalyst and using a vacuum gas oil as a base oil to obtain high-octane FCC gasoline. The vacuum gas oil used as the base oil is preferably a desulfurized vacuum gas oil (preferably with a sulfur content of 500 wt ppm or less and a density of $0.8/cm^3$ or more at 15° C.) obtained by directly desulfurizing an atmospheric distillation residual oil.

The aromatic content extracted from the fluid catalytic cracking decant oil is an aromatic content when a component is selectively extracted using dimethylformamide or the like and is divided into an aromatic content and a saturated content.

The hydrodesulfurized oil obtained by performing a high hydrodesulfurization process on a heavy oil is, for example, a heavy oil with a sulfur content of 1.0 wt % or less, a nitrogen content of 0.5 wt % or less, an aromatic carbon content (fa) of 0.1 or more which is obtained by performing a hydrodesulfurization process on a heavy oil with a sulfur content of 1 wt % or more at a hydrogen partial pressure of 10 MPa or more. The hydrodesulfurized oil is preferably a hydrodesulfurized oil obtained by hydrodesulfurizing an atmospheric distillation residual oil in the presence of a catalyst so as to have a hydrocracking ratio of 25% or less.

The vacuum residual oil (VR) is a bottom oil of a vacuum distillator obtained by inputting a crude oil to an atmospheric distillatory to obtain gases, a light oil, and an atmospheric residual oil and then changing the atmospheric residual oil, for example, at a reduced pressure of 10 to 30 Torr in a heating furnace outlet temperature range of 320° C. to 360° C.

The desulfurized deasphalted oil is obtained by processing an oil such as a vacuum distillation residual oil by the use of a solvent deasphalting apparatus using propane, butane, pentane, or a mixture thereof as a solvent, removing the asphaltene content, and desulfurizing the obtained deasphalted oil (DAO) preferably up to a sulfur content of 0.05 wt % to 0.40 wt % using an indirect desulfurizer (Isomax) or the like.

The atmospheric residual oil is a fraction having the highest boiling point which is obtained by inputting a crude oil to an atmospheric distillatory and fractionally distilling the crude oil into gases and LPG, a gasoline fraction, a lamp oil fraction, a light oil fraction, and an atmospheric residual oil depending on the boiling points of the fractions. The heating temperature varies depending on the producing area of the crude oil or the like and is not particularly limited as long as the crude oil can be fractionally distilled into the fractions. For example, the crude oil is heated at 320° C.

A preferable example of heavy oil composition is a heavy oil composition satisfying three conditions of (1) an aromatic content ratio (aromatic index) fa of 0.3 to 0.65, (2) a normal paraffin content of 5 wt % to 20 wt %, and (3) a content of a desulfurized deasphalted oil of 7 wt % to 15 wt %.

The heavy oil is processed at high temperatures to cause pyrolytic reactions and polycondensation reactions and a green coke is produced through a process of producing a large liquid crystal called a mesophase as an intermediate product.

At this time, a base oil composition including all of (1) a heavy oil component forming an excellent bulk mesophase, (2) a heavy oil component which can produce a gas having a function of limiting the size of a hexagonal mesh laminate constituting a mesophase when carbonizing and solidifying the bulk mesophase by polycondensation, and (3) a base oil component bonding the cut hexagonal mesh laminates to each other can be particularly preferably used. The (1) heavy oil component forming an excellent bulk mesophase is a component giving an aromatic index fa of 0.3 to 0.65, the (2) heavy oil component which can produce a gas is a component corresponding to the normal paraffin content of 5 wt % to 20 wt %, and the (3) component bonding the hexagonal mesh laminates is a desulfurized deasphalted oil contained in the range of 7 wt % to 15 wt %.

The reason for using such heavy oil composition as a source material of the raw coke composition of the invention is that a hexagonal mesh sheet formed by the heavy oil component producing an excellent bulk mesophase is limited to a relatively small size to keep a degree of parallelism between the neighboring mesh sheets of the hexagonal mesh laminate formed after the coking high and the desulfurized deasphalted oil appropriately bonds the neighboring hexagonal mesh laminates to each other.

There is no example in which the desulfurized deasphalted oil is added during manufacturing the green coke, and it comes as a surprise that containing the desulfurized deasphalted oil is effective.

The aromatic carbon content ratio (aromatic index) (fa) can be obtained through the use of a Knight method. In the Knight method, a carbon distribution is divided into three components $(A_1, A_2, A_3)$ in a spectrum of an aromatic carbon using a $^{13}$C-NMR method. Here, $A_1$ represents the number of carbons in an aromatic ring and substituted aromatic carbons and a half of non-substituted aromatic carbons (corresponding to peaks of about 40 to 60 ppm of $^{13}$C-NMR), $A_2$ represents the other half of the non-substituted aromatic carbons (corresponding to peaks of about 60 to 80 ppm of $^{13}$C-NMR), and $A_3$ represents the number of aliphatic carbons (corresponding to peaks of about 130 to 190 ppm of $^{13}$C-NMR). From these, fa is obtained using the following expression.

Numerical Expression 8

$$fa=(A_1+A_2)/(A_1+A_2+A_3)$$

It is described in Document ("Characterization of Pitches II. Chemical Structure", Yokono, Sanada, (Carbon, 1981 (No. 105), p 73-81) that the $^{13}$C-NMR method is the best method capable of quantitatively calculating the most basic quantity fa of a pitch-based chemical structure parameter.

The content of normal paraffin in the heavy oil composition means a value measured through the use of gas chromatography using a capillary column. Specifically, verification is performed using a standard reference material of normal paraffin and then a sample of a non-aromatic components separated by the elution chromatography is measured using the capillary column. The content based on the total weight of the base oil composition can be calculated from this measured value.

When the aromatic index fa of the heavy oil composition is less than 0.3, the yield of a coke from the heavy oil composition is extremely lowered, an excellent bulk mesophase is not formed, and it is difficult to develop a crystalline structure in spite of the carbonization and graphitization, which is not desirable. When fa is more than 0.65, plural mesophases are rapidly generated in a matrix in the course of producing a green coke and rapid combination of mesophases is more repeated than single growth of mesophases. Accordingly, since the combination rate of the mesophases is higher than the generation rate of gases from the normal paraffin-containing component, it is not possible to limit hexagonal mesh sheet of a bulk mesophase to a small size, which is not desirable.

The aromatic index fa of the heavy oil composition is preferably in a range of 0.3 to 0.65. Here, fa can be calculated from a density D and a viscosity V of a heavy oil composition, and fa of a heavy oil composition with a density D of 0.91 to 1.02 g/cm$^3$ and with a viscosity V of 10 to 220 mm$^2$/sec is preferably in a range of 0.3 to 0.65.

The normal paraffin component appropriately included in the heavy oil composition performs an important function of limiting a bulk mesophase to a small size by generating gases during the coking process as described above. The generation of gases also serves to uniaxially orient neighboring mesophases limited to a small size and to selectively orient the overall system. When the content of the normal paraffin-containing component is less than 5 wt %, mesophases grow more than necessary and large carbon reticulated plane are formed, which is not desirable. When the content of the normal paraffin-containing component is more than 20 wt %, excessive gases are generated from the normal paraffin, the orientation of the bulk mesophase tends to be disturbed in the opposite direction, and it is thus difficult to develop the crystalline structure in spite of the carbonization and graphitization, which is not desirable. As described above, the content of the normal paraffin is preferably in a range of 5 wt % to 20 wt %.

The desulfurized deasphalted oil serves to appropriately combine the neighboring hexagonal mesh laminates as described above, and the content in the heavy oil composition is preferably in a range of 7 wt % to 15 wt %. When the content of the desulfurized deasphalted oil is less than 7 wt % or more than 15 wt %, the microstrength of the heavy oil composition obtained after the coking process may be less than 7 wt % or more than 17 wt %, which is not desirable.

The heavy oil composition having this feature is coked to form the raw coke composition in the invention. A delayed coking method can be preferably used as a method of coking a heavy oil composition satisfying a predetermined condition. More specifically, a method of heating a base oil composition to obtain a green coke through the use of a delayed coker under the condition of a controlled coking pressure can be preferably used. The preferable operating conditions of the delayed coker include a pressure of 0.1 MPa to 0.8 MPa and a temperature of 400° C. to 600° C.

The reason for setting the preferable range of the operating pressure of a coker is that the emission speed of gases generated from the normal paraffin-containing component to the outside of the system can be controlled by the use of the pressure. As described above, since the size of the carbon reticulated plane constituting a mesophase is controlled by the use of the generated gases, the residence time of the generated gases in the system serves as an important control parameter for determining the size of the reticulated plane. The reason for setting the preferable range of the coker operating temperature is that it is a temperature necessary for causing a mesophase to grow from a heavy oil adjusted to achieve the advantageous effect of the invention.

The raw coke composition obtained in this way is pulverized and classified so as to have a predetermined particle size. The particle size is preferably equal to or less than 30 μm in terms of an average particle diameter. The average particle diameter is measured using a laser-diffraction particle size analyzer. The reason for setting the average particle diameter to be equal to or less than 30 μm is that this particle size range is generally and suitably used for the negative carbon material of a lithium ion secondary battery. The average particle diameter is preferably in a range of 5 μm to 30 μm. This is because when the powder of the raw coke composition with an average particle diameter of less than 5 μm and the acetylene black are mixed and the compressive shearing stress is applied thereto, sufficient mechanical energy cannot be applied to the particles and thus the acetylene black cannot be embedded in the particle surface of the raw coke composition.

Here, the method of manufacturing a graphite material used as a negative electrode of a lithium ion secondary battery according to the invention includes a process of mixing the powder of the raw coke composition with the acetylene black and applying the compressive shearing stress. At this time, the compressive shearing stress applied includes collision, friction, shearing stresses, and the like in addition to the compressive stress and the shearing stress. The mechanical energy provided by these stresses is greater than the energy provided by general agitation, and these types of energy are given to the particle surfaces, thereby exhibiting an effect called a mechanochemical phenomenon such as spheronization of particle shapes and complexing of particles. In order to provide the mechanical energy for causing the mechanochemical phenomenon to the raw coke composition, an apparatus capable of simultaneously applying shearing, compression, collision stresses, and the like has only to be used and the structure and principle of the apparatus are not particularly limited. Examples of such an apparatus include a ball type kneader such as rotary ball mill, a wheel type kneader such as an edge runner, a hybridization system (made by Nara Machinery Co., Ltd.), a mechano-fusion (made by Hosokawa Micron Corporation), a NOBILTA (made by Hosokawa Micron Corporation), a COMPOSI (made by Nippon Coke & Engineering Co., Ltd.).

The manufacturing conditions in the process of applying the compressive shearing stress differ depending on the apparatus to be used. For example, as shown in FIG. 4, an apparatus having a structure in which compaction and compressive stresses are added to a powder P in a gap 33 between a rotating blade (in a rotating direction R1) 31 and a housing 32 is used.

When the NOBILTA (made by Hosokawa Micron Corporation) is used, it is preferable that the number of rotation of the blade be set to a range of 1500 rpm to 5000 rpm and the processing time be set to a range of 10 minutes to 180 minutes. When the number of rotation is less than 1500 rpm or when the processing time is less than 10 minutes, sufficient compressive shearing stress cannot be applied to the powder of the raw coke composition. On the other hand, when the process is performed for a time longer than 180 minutes, an excessive compressive shearing stress is applied to the powder of the raw coke composition and the particle shape is markedly deformed, which is not desirable.

When the COMPOSI (made by Nippon Coke & Engineering Co., Ltd.) is used, it is preferable that the peripheral speed be set to a range of 50 m/s to 80 m/s and the processing time be set to a range of 10 minutes to 180 minutes. When the peripheral speed is less than 50 m/s or when the processing time is less than 10 minutes, sufficient compressive shearing stress cannot be applied to the powder of the raw coke composition. On the other hand, when the process is performed for a time longer than 180 minutes, an excessive compressive shearing stress is applied to the powder of the raw coke composition and the particle shape is markedly deformed, which is not desirable.

When the mechano-fusion (made by Hosokawa Micron Corporation) is used, it is preferable that the number of rotation of the blade be set to a range of 500 rpm to 3000 rpm and the processing time be set to a range of 10 minutes to 300 minutes. When the number of rotation is smaller than 500 rpm or when the processing time is less than 10 minutes, sufficient compressive shearing stress cannot be applied to the powder of the raw coke composition. On the other hand, when the process is performed for a time longer than 300 minutes, an excessive compressive shearing stress is applied to the powder of the raw coke composition and the particle shape is markedly deformed, which is not desirable.

When the hybridization system (made by Nara Machinery Co., Ltd.) is used, it is preferable that the peripheral speed be set to a range of 40 m/s to 60 m/s and the processing time be set to a range of 5 minutes to 180 minutes. When these conditions are satisfied, a sufficient compressive shearing stress can be applied to the powder of the raw coke composition without markedly changing the particle shape.

When the raw coke composition in the invention is used, a compound powder in which the acetylene black is embedded in the particle surface of the raw coke composition is obtained by preferably setting the control temperature of the process of applying the compressive shearing stress to a range of 60° C. to 250° C. Particularly, the processing control temperature is preferably set to a range of 120° C. to 200° C.

The compound powder in which the acetylene black is embedded in the particle surface of the raw coke composition in this way is carbonized and graphitized so that the Lc(112) calculated from the (112) diffraction line measured through the use of a wide-angle X-ray diffraction method is in a range of 4 nm to 30 nm.

The carbonization and graphitization method is not particularly limited, but a method of carbonizing (preliminarily calcining) the graphite precursor in the atmosphere of inert gas such as nitrogen, argon, or helium at a highest temperature of 900° C. to 1500° C. for a highest temperature retention time of 0 to 10 hours and performing a heating process in the same atmosphere of inert gas at a highest temperature of 2500° C. to 3200° C. for a highest temperature retention time of 0 to 100 hours can be used.

In general, the graphite material subjected to a heating process at a graphitization temperature of higher than 2800° C. progresses in crystallization, the capacity of a lithium ion secondary battery using the graphite material as a negative electrode material is large, but the decomposition of the electrolyte solution due to the solvent co-intercalation easily occurs, and thus the service life characteristic degrades. However, according to the invention, since the areas having a low crystallinity are partially introduced into the highly crystalline structure, it is possible to cause the high capacity and the excellent service life characteristic to stand together.

In the invention, the reason for setting the Lc(112) calculated from the (112) diffraction line measured through the use of a wide-angle X-ray diffraction method to the range of 4 nm to 30 nm will be described below.

First, in the graphite material in which the Lc(112) is less than 4 nm, the development of a crystalline structure is not sufficient and the capacity of a lithium ion secondary battery using the graphite material is small, which is not desirable. When the raw coke composition in the invention is graphitized at high temperatures for a long time, the Lc(112) does not become greater than 30 nm and thus the upper limit is set to 30 nm.

As described above, the compound powder in which the acetylene black is embedded in the particle surface of the raw coke composition is obtained by mixing the acetylene black in a range of 0.5 wt % to 10 wt % with the raw coke composition having an atomic ratio H/C of 0.30 to 0.50 and a microstrength of 7 wt % to 17 wt % and applying the compressive shearing stress thereto, and the graphite material in which the crystallite size Lc(112) of the (112) diffraction line measured through the use of a wide-angle X-ray diffraction method is in the range of 4 nm to 30 nm, the appropriate disturbance is introduced into the crystalline structure on the particle surface, and the edge faces exposed from the particle surface are very small is obtained by carbonizing and graphitizing the compound powder. When this graphite material is used as the negative electrode material of a lithium ion secondary battery, it is possible to ensure very high reliability.

In the past, there was no example in which a graphite material manufactured using a desulfurized deasphalted oil as a source material is used as the negative electrode material of a lithium ion secondary battery. The invention can provide a desired graphite material by carbonizing and graphitizing the compound powder which are obtained by mixing the desulfurized deasphalted oil as a preferable aspect of a heavy oil composition, mixing the acetylene black into the powder of the raw coke composition having a predetermined atomic ratio H/C and a predetermined microstrength, and applying the compressive shearing stress thereto.

The method of manufacturing a negative electrode of a lithium ion secondary battery is not particularly limited but, for example, a method of pressing and shaping a mixture (negative-electrode mixture) including the graphite material according to the invention, a binder (binding agent), a conducting agent if necessary, and an organic solvent in a predetermined size can be used. A method of rolling a material (negative-electrode mixture), which is obtained by kneading the graphite material according to the invention, a binder (binding agent), a conducting agent, and the like in an organic solvent to produce a slurry and applying and drying the slurry onto a collector such as a copper foil, and cutting out the resultant in a predetermined size can be also used.

Examples of the binder (binding agent) include polyvinylidene fluoride, polytetrafluoroethylene, polyacrylonitrile, polyethyleneterephthalate, and SBR (Styrene-Butadiene Rubber). The content of the binder in the negative-electrode mixture can be appropriately set to a range of about 1 to 30 parts by weight with respect to 100 parts by weight of a graphite material if necessary in a design of a battery. Examples of the conducting agent include carbon black, graphite, acetylene black, indium-tin oxide exhibiting conductivity, and conductive polymers such as polyaniline, polythiophene, and polyphenylenevinylene. The content of the conducting agent is preferably in a range of 1 to 15 parts by weight with respect to 100 parts by weight of a graphite material.

Examples of the organic solvent include dimethylformamide, N-methylpyrrolidone, pyrrolidone, N-methylthiopyrrolidone, hexamethylphosphoamide, dimethylacetamide, isopropanol, and toluene.

The method of mixing a graphite material, a binder, a conducting agent if necessary, and an organic solvent can employ a known apparatus such as a screw kneader, a ribbon mixer, a universal mixer, and a planetary mixer. The mixture is shaped through roll pressing or press pressing, and the pressure at that time is preferably in a range of 100 MPa to 300 MPa.

The material of the collector is not particularly limited as long as it does not form an alloy with lithium. Examples thereof include copper, nickel, titanium, and stainless steel. The shape of the collector is not particularly limited, but examples thereof include band shapes such as a foil shape, a punched foil shape, and a mesh shape. A porous material such as porous metal (foamed metal) or carbon paper can be used.

The method of applying the slurry onto the collector is not particularly limited, but examples thereof include known methods such as a metal mask printing method, an electrostatic coating method, a dip coating method, a spray coating method, a roll coating method, a doctor blade method, a gravure coating method, a screen printing method, and a die coater method. After the application, a rolling process using a flat press, a calender roll, or the like is generally performed if necessary.

The unification of the negative-electrode slurry formed in a sheet shape or pellet shape and the collector can be performed using known methods such as rolling, pressing, and a combination thereof.

A lithium ion secondary battery using the graphite material for a negative electrode of a lithium ion secondary battery according to this embodiment is obtained, for example, by arranging the negative electrode manufactured as described above and the positive electrode to face each other with a separator interposed therebetween and injecting an electrolyte solution thereto.

The active material used for the positive electrode is not particularly limited, and metal compound, metal oxide, metal sulfide, or a conductive polymer material capable of doping or intercalating lithium ions can be used. Examples thereof include lithium cobalt oxide ($LiCoO_2$), lithium nickel oxide ($LiNiO_2$), lithium manganase oxide ($LiMn_2O_4$), lithium composite oxides ($LiCo_XNi_YM_ZO_2$, X+Y+Z=1, M: Mn, Al, or the like), oxides in which some transition metals is substituted with other elements, lithium-vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine $LiMPO_4$ (M:Co, Ni, Mn, Fe), conductive polymers such as polyacetylene, polyaniline, polypyrrole, polythiophene, and polyacene, porous carbons, and mixtures thereof.

For example, an unwoven fabric, a cross, and a porous film including polyolefin such as polyethylene and polypropylene as a major component, or combinations thereof can be used as the separator. When the positive electrode and the negative electrode of a lithium ion secondary battery to be manufactured do not come in direct contact with each other, the separator does not have to be used.

Known organic electrolyte solutions, inorganic solid electrolytes, and polymer solid electrolytes can be used as the electrolyte solution and the electrolyte used for a lithium ion secondary battery. From the viewpoint of electrical conductivity, the organic electrolyte solution can be preferably used.

Examples of the organic electrolyte solution include ethers such as dibutyl ether, ethyleneglycol monomethyl ether, ethyleneglycol monoethyl ether, ethyleneglycol monobutyl ether, diethyleneglycol monomethyl ether, and ethyleneglycol phenyl ether, amides such as N-methylformamide, N,N-dimethylformamide, N-ethylformamide, N,N-diethylformamide, N-methylacetamide, N,N-dimethylacetamide, N-ethylacetamide, and N,N-diethylacetamide, sulfur-containing compounds such as dimethylsulfoxide and sulfolane, dialkyl ketones such as methylethyl ketones and methylisobutyl ketone, cyclic ethers such as tetrahydrofurane and 2-methoxytetrahydrofurane, cyclic carbonates such as ethylene carbonate, butylene carbonate, propylene carbonate, and vinylene carbonate, chained carbonate such as diethyl carbonate, dimethyl carbonate, methylethyl carbonate, and methylpropyl carbonate, cyclic ester carbonates such as γ-butyrolactone and γ-valerolactone, chained ester carbonates such as methyl acetate, ethyl acetate, methyl propionate, and ethyl propionate, and organic solvents such as N-methyl 2-pyrrolidinone, acetonitrile, and nitromethane. These solvents can be used singly or in combination of two or more.

Various lithium salts can be used as a solute of the solvents. Examples of a known lithium salt include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and $LiN(C_2F_5SO_2)_2$.

Examples of the polymer solid electrolyte include polyethylene oxide derivatives and polymers including the derivatives, polypropylene oxide derivatives and polymers including the derivatives, ester phosphate polymers, and polycarbonate derivatives and polymers including the derivatives.

Selection of members necessary for the configuration of a battery other than the above-mentioned ones is not limited at all.

The structure of a lithium ion secondary battery is not particularly limited, but a structure in which a winding electrode group in which a positive electrode and a negative electrode formed in a band shape are spirally wound with a separator interposed therebetween is inserted into a battery case and the resultant is sealed or a structure in which a positive electrode and a negative electrode formed in a flat panel shape are sequentially stacked with a separator interposed therebetween is enclosed in a case is generally employed. The lithium ion secondary battery can be used, for example, as a paper type battery, a button type battery, a coin type battery, a laminated battery, a cylindrical battery, and a square battery.

A lithium ion secondary battery using the graphite material according to the invention as a negative electrode material can guarantee very high reliability in comparison with the lithium ion secondary battery using the carbon material in the related art, and thus can be used for vehicles, hybrid cars, plug-in hybrid cars, electric cars, industries for power storage in a system infrastructure, and the like.

Examples

The first embodiment to the third embodiment of the invention will be described below in more detail with reference to examples and comparative examples; however, the invention is in no way limited to these examples.

1. Raw Coke Composition and Manufacturing Method Thereof (1) Raw Coke Composition A-1

A hydrodesulfurized oil was obtained by hydrodesulfurizing an atmospheric distillation residual oil with a sulfur content of 3.1 wt % in the presence of a catalyst so that the hydrocracking ratio is equal to or less than 25%. The hydrodesulfurizing conditions were set to a total pressure of 180 MPa, a hydrogen partial pressure of 160 MPa, and a temperature of 380° C. A fluid catalytic cracking decant oil was obtained by fluid-catalytically cracking a desulfurized vacuum gas oil (with a sulfur content of 500 wt·ppm and a density of 0.88 g/cm$^3$ at 15° C.). The desulfurized vacuum gas oil was divided into an aromatic content and a saturated content through the use of selective extraction using dimethylformamide and the aromatic content was extracted therefrom. A desulfurized deasphalted oil of 19 wt % (with respect to 100 wt % of the overall mixture including the desulfurized deasphalted oil) was added to a mixture of the extracted aromatic content and the hydrodesulfurized oil at a weight ratio of 8:1, whereby a base oil composition of a coke was obtained. This base oil composition was input to a delayed coker and was subjected to a coking process at 550° C. in the atmosphere of inert gas, whereby Raw coke composition A-1 was obtained.

(2) Raw Coke Composition B-1

A desulfurized deasphalted oil of 11 wt % was added to the mixture of the extracted aromatic content and the hydrodesulfurized oil at a weight ratio of 8:1 in the same way as obtaining the base oil composition of Raw coke composition A-1, whereby a base oil composition of a coke was obtained. This base oil composition was input to a delayed coker and was subjected to a coking process at 550° C. in the atmosphere of inert gas, whereby Raw coke composition B-1 was obtained.

(3) Raw Coke Composition C-1

A desulfurized deasphalted oil of 4 wt % was added to the mixture of the extracted aromatic content and the hydrodesulfurized oil at a weight ratio of 8:1 in the same way as obtaining the base oil composition of Raw coke composition A-1, whereby a base oil composition of a coke was obtained. This base oil composition was input to a delayed coker and was subjected to a coking process at 550° C. in the atmosphere of inert gas, whereby Raw coke composition C-1 was obtained.

(4) Raw Coke Composition D-1

A desulfurized deasphalted oil of 17 wt % was added to the mixture of the extracted aromatic content and the hydrodesulfurized oil at a weight ratio of 6:1 in the same way as obtaining the base oil composition of Raw coke composition A-1, whereby a base oil composition of a coke was obtained. This base oil composition was input to a delayed coker and was subjected to a coking process at 550° C. in the atmosphere of inert gas, whereby Raw coke composition D-1 was obtained.

(5) Raw Coke Composition E-1

A desulfurized deasphalted oil of 11 wt % was added to the mixture of the extracted aromatic content and the hydrodesulfurized oil at a weight ratio of 6:1 in the same way as obtaining the base oil composition of Raw coke composition A-1, whereby a base oil composition of a coke was obtained. This base oil composition was input to a delayed coker and was subjected to a coking process at 550° C. in the atmosphere of inert gas, whereby Raw coke composition E-1 was obtained.

(6) Raw Coke Composition F-1

A desulfurized deasphalted oil of 6 wt % was added to the mixture of the extracted aromatic content and the hydrodesulfurized oil at a weight ratio of 6:1 in the same way as obtaining the base oil composition of Raw coke composition A-1, whereby a base oil composition of a coke was obtained. This base oil composition was input to a delayed coker and was subjected to a coking process at 550° C. in the atmosphere of inert gas, whereby Raw coke composition F-1 was obtained.

(7) Raw Coke Composition G-1

A desulfurized deasphalted oil of 15 wt % was added to the mixture of the hydrodesulfurized oil and the fluid catalytic cracking decant oil, which were source materials of the base oil composition of Raw coke composition A-1, at a weight ratio of 1:5, whereby a base oil composition of a coke was obtained. This base oil composition was input to a delayed coker and was subjected to a coking process at 550° C. in the atmosphere of inert gas, whereby Raw coke composition G-1 was obtained.

(8) Raw Coke Composition H-1

A desulfurized deasphalted oil of 7 wt % was added to the mixture of the hydrodesulfurized oil and the fluid catalytic cracking decant oil, which were source materials of the base oil composition of Raw coke composition A-1, at a weight ratio of 1:5, whereby a base oil composition of a coke was obtained. This base oil composition was input to a delayed coker and was subjected to a coking process at 550° C. in the atmosphere of inert gas, whereby Raw coke composition H-1 was obtained.

(9) Raw Coke Composition I-1

A desulfurized deasphalted oil of 19 wt % was added to the mixture of the hydrodesulfurized oil and the fluid catalytic cracking decant oil, which were source materials of the base oil composition of Raw coke composition A-1, at a weight ratio of 1:4, whereby a base oil composition of a coke was obtained. This base oil composition was input to a delayed coker and was subjected to a coking process at 550° C. in the atmosphere of inert gas, whereby Raw coke composition I-1 was obtained.

(10) Raw Coke Composition J-1

A desulfurized deasphalted oil of 16 wt % was added to the mixture of the hydrodesulfurized oil and the fluid catalytic cracking decant oil, which were source materials of the base oil composition of Raw coke composition A-1, at a weight ratio of 1:4, whereby a base oil composition of a coke was obtained. This base oil composition was input to a delayed coker and was subjected to a coking process at 550° C. in the atmosphere of inert gas, whereby Raw coke composition J-1 was obtained.

(11) Raw Coke Composition K-1

A desulfurized deasphalted oil of 11 wt % was added to the mixture of the hydrodesulfurized oil and the fluid catalytic cracking decant oil, which were source materials of the base oil composition of Raw coke composition A-1, at a weight ratio of 1:4, whereby a base oil composition of a coke was obtained. This base oil composition was input to a delayed coker and was subjected to a coking process at 550° C. in the atmosphere of inert gas, whereby Raw coke composition K-1 was obtained.

(12) Raw Coke Composition L-1

A desulfurized deasphalted oil of 5 wt % was added to the mixture of the hydrodesulfurized oil and the fluid catalytic cracking decant oil, which were source materials of the base oil composition of Raw coke composition A-1, at a weight ratio of 1:4, whereby a base oil composition of a coke was obtained. This base oil composition was input to a delayed coker and was subjected to a coking process at 550° C. in the atmosphere of inert gas, whereby Raw coke composition L-1 was obtained.

(13) Raw Coke Composition M-1

A desulfurized deasphalted oil of 3 wt % was added to the mixture of the hydrodesulfurized oil and the fluid catalytic cracking decant oil, which were source materials of the base oil composition of Raw coke composition A-1, at a weight ratio of 1:4, whereby a base oil composition of a coke was obtained. This base oil composition was input to a delayed coker and was subjected to a coking process at 550° C. in the atmosphere of inert gas, whereby Raw coke composition M-1 was obtained.

(14) Raw Coke Composition N-1

A desulfurized deasphalted oil of 14 wt % was added to the mixture of the hydrodesulfurized oil and the fluid catalytic cracking decant oil, which were source materials of the base oil composition of Raw coke composition A-1, at a weight ratio of 1:3, whereby a base oil composition of a coke was obtained. This base oil composition was input to a delayed coker and was subjected to a coking process at 550° C. in the atmosphere of inert gas, whereby Raw coke composition N-1 was obtained.

(15) Raw Coke Composition O-1

A desulfurized deasphalted oil of 7 wt % was added to the mixture of the hydrodesulfurized oil and the fluid catalytic cracking decant oil, which were source materials of the base oil composition of Raw coke composition A-1, at a weight ratio of 1:3, whereby a base oil composition of a coke was obtained. This base oil composition was input to a delayed coker and was subjected to a coking process at 550° C. in the atmosphere of inert gas, whereby Raw coke composition O-1 was obtained.

(16) Raw Coke Composition P-1

After adding n-heptane of the same volume to the fluid catalytic cracking decant oil which was a source material of the base oil composition of Raw coke composition A-1 and mixing the resultant, the mixture was divided into an aromatic content and a saturated content through the use of selective extraction using dimethylformamide. A desulfurized deasphalted oil of 16 wt % was added to a mixture of the fluid catalytic cracking decant oil and the extracted saturated content at a weight ratio of 1:1, whereby a base oil composition of a coke was obtained. This base oil composition was input to a delayed coker and was subjected to a coking process at 550° C. in the atmosphere of inert gas, whereby Raw coke composition P-1 was obtained.

(17) Raw Coke Composition Q-1

A desulfurized deasphalted oil of 11 wt % was added to the mixture of the fluid catalytic cracking decant oil, which was a source material of the base oil composition of Raw coke composition P-1, and the extracted saturated content at a weight ratio of 1:1, whereby a base oil composition of a coke was obtained. This base oil composition was input to a delayed coker and was subjected to a coking process at 550° C. in the atmosphere of inert gas, whereby Raw coke composition Q-1 was obtained.

(18) Raw Coke Composition R-1

A desulfurized deasphalted oil of 6 wt % was added to the mixture of the fluid catalytic cracking decant oil, which was a source material of the base oil composition of Raw coke composition P-1, and the extracted saturated content at a weight ratio of 1:1, whereby a base oil composition of a coke was obtained. This base oil composition was input to a delayed coker and was subjected to a coking process at 550° C. in the atmosphere of inert gas, whereby Raw coke composition R-1 was obtained.

(19) Raw Coke Composition S-1

A desulfurized deasphalted oil of 19 wt % was added to the mixture of the fluid catalytic cracking decant oil, which was a source material of the base oil composition of Raw coke composition P-1, and the extracted saturated content at a weight ratio of 1:2, whereby a base oil composition of a coke was obtained. This base oil composition was input to a delayed coker and was subjected to a coking process at 550° C. in the atmosphere of inert gas, whereby Raw coke composition S-1 was obtained.

(20) Raw Coke Composition T-1

A desulfurized deasphalted oil of 10 wt % was added to the mixture of the fluid catalytic cracking decant oil, which was a source material of the base oil composition of Raw coke composition P-1, and the extracted saturated content at a weight ratio of 1:2, whereby a base oil composition of a coke was obtained. This base oil composition was input to a delayed coker and was subjected to a coking process at 550° C. in an atmosphere of inert gas, whereby Raw coke composition T-1 was obtained.

(21) Raw Coke Composition U-1

A desulfurized deasphalted oil of 4 wt % was added to the mixture of the fluid catalytic cracking decant oil, which was a source material of the base oil composition of Raw coke composition P-1, and the extracted saturated content at a weight ratio of 1:2, whereby a base oil composition of a coke was obtained. This base oil composition was input to a delayed coker and was subjected to a coking process at 550° C. in the atmosphere of inert gas, whereby Raw coke composition U-1 was obtained.

2. Analysis of Raw Coke Composition (1) Method of Measuring Atomic Ratio H/C of Raw Coke Composition The total hydrogen content of the raw coke composition was measured from the moisture content, which was generated from a combustion gas obtained by completely combusting a sample in an oxygen flow at 750° C., using a coulometric titration method (Karl-Fisher method). The sample of the raw coke composition was combusted in an oxygen flow of 1150° C., was converted into carbon dioxide (and some carbon monoxide), and was carried by the surplus oxygen flow, and then the total carbon content was calculated by a $CO_2+CO$ infrared detector. The H/C of the raw coke composition was calculated as a ratio of a value obtained by dividing the total hydrogen content (TH (wt %)) by the atomic weight of hydrogen to a value obtained by dividing the total carbon content (TC (wt %)) by the atomic weight of carbon. The values of H/C of Raw coke compositions A-1 to U-1 are shown in Table 1.

(2) Method of Measuring Microstrength of Raw Coke Composition

A microstrength was calculated as a value representing the weight of the sample on a sieve by percentage after inputting 2 g of the sample of 20 to 30 mesh and 12 steel balls with a diameter of 5/16 inch (7.9 mm) to a steel cylinder (with an inner diameter of 25.4 mm and a length of 304.8 mm), rotating a vertical plane in a direction perpendicular to the tube at 25 rpm by 800 turns (that is, rotating the cylinder in a state in which the rotation axis is set horizontally so as to trade places vertically as if rotating a propeller), and then sieving the resultant with a 48 mesh. The microstrengths of Raw coke compositions A-1 to U-1 are shown in Table 1.

3. Carbonization and Graphitization of Raw Coke Compositions A-1 to U-1

By pulverizing the obtained raw coke composition by the use of a mechanical pulverizer (for example, a super rotor mill made by Nisshin Engineering Inc.) and classifying the resultant by the use of a precision air classifier (for example, a turbo classifier made by Nisshin Engineering Inc.), a particulate material with an average particle diameter of 12 µm was obtained. Then, the particulates were input to a "NOBILTA 130" made by Hosokawa Micron Corporation to satisfy a filled volume of 500 cc, and the apparatus was operated under the conditions of a peripheral speed of a blade of 30 m/s, a gap therebetween of 5 mm, a processing temperature of about 130° C., and a processing time of 50 minutes, whereby a graphite precursor having a compressive stress and a shearing stress applied thereto was obtained. The particulates having the compressive stress and the shearing stress applied thereto were carbonized in the nitrogen gas flow under the conditions of a highest temperature of 1200° C. and a highest temperature retention time of 5 hours by the use of a roller hearth kiln made by Takasago Industry Co., Ltd. The obtained carbon material was input to a crucible, the crucible was installed in an electric furnace, and the resultant was graphitized in the nitrogen gas flow of 80 L/min at the highest temperature of 2800° C. At this time, the temperature rising rate was set to 200° C./h, the highest temperature retention time was set to 3 hours, the temperature falling rate was set to 100° C./h to 1000° C., and the resultant was cooled to room temperature in a state in which the nitrogen gas flow was maintained. The obtained graphite materials are called Graphites A-1 to U-1 to correspond to Raw coke compositions A-1 to U-1.

4. Method of Manufacturing Graphites V-1 to X-1

By pulverizing Raw coke compositions H-1, K-1, and N-1 by the use of a mechanical pulverizer (for example, a super rotor mill made by Nisshin Engineering Inc.) and classifying the resultant by the use of a precision air classifier (for example, a turbo classifier made by Nisshin Engineering Inc.), a particulate material with an average particle diameter of 12 µm was obtained. The particulates were carbonized in the nitrogen gas flow under the conditions of a highest temperature of 1200° C. and a highest temperature retention time of 5 hours without applying the compressive stress and the shearing stress thereto by the use of a roller hearth kiln made by Takasago Industry Co., Ltd. The obtained carbon material was input to a crucible, the crucible was installed in an electric furnace, and the resultant was graphitized in the nitrogen gas flow of 80 L/min at the highest temperature of 2800° C. At this time, the temperature rising rate was set to 200° C./h, the highest temperature retention time was set to 3 hours, the temperature falling rate was set to 100° C./h to 1000° C., and the resultant was cooled to room temperature in a state in which the nitrogen gas flow was maintained. The obtained graphite materials are called Graphites V-1, W-1, and X-1 to correspond to Raw coke compositions H-1, K-1, and N-1.

5. Method of Manufacturing Graphites Y-1 and Z-1

Raw coke composition K-1 was graphitized in the same way as described in "3. Carbonization and Graphitization of Raw coke compositions A-1 to U-1". Here, the graphite of which the highest graphitization temperature was 2600° C. is called Graphite Y-1 and the graphite of which the highest graphitization temperature was 2300° C. is called Graphite Z-1.

6. Calculation of Crystallite Size Lc(112) of Graphite Powder

A Si standard sample of 10 wt % as an internal standard was mixed into the obtained graphite powder, was filled in a glass rotating sample holder (25 mm diameter×0.2 mmt), was subjected to measurement using a wide-angle X-ray diffraction method on the basis of a method (Carbon 2006, No. 221, P52-60) defined by the eleventh committee of Japan Society for the Promotion of Science, and the crystallite size Lc(112) of the graphite powder was calculated. D8 ADVANCE (enclosed tube type) made by Bruker-AXS Co. was used as an X-ray diffractometer, a CuKα ray (using Kβ filter-Ni) was used as an X-ray source, the application voltage and the application current to an X-ray bulb were set to 40 kV and 40 mA.

The obtained diffraction pattern was analyzed by the use of the method (Carbon 2006, No. 221, P52-60) defined by Committee 117 of Japan Society for the Promotion of Science. Specifically, the measured data was subjected to a smoothing process, a background removing process, an absorption correcting process, a polarization correcting process, and a Lorentz correcting process, the (112) diffraction line of the graphite powder was corrected using the peak position and the value width of a (422) diffraction line of the Si standard sample, and the crystallite size was calculated. The crystallite size was calculated from the half-value width of the corrected peak using the following Scherrer's formula. The measurement and analysis were carried out three times and the average value thereof was set as the Lc(112). The measurement results of the graphite powders are shown in Table 1.

Numerical Expression 9

$$L = K \times \lambda / (\beta 0 \times \cos \theta B) \quad \text{Scherrer's formula}$$

Here, L: crystallite size (nm)
K: shape factor constant (=1.0)
λ: wavelength of X-ray (=0.15406 nm)
θB: Bragg angle 7. Manufacturing of Battery and Evaluation of Characteristics (1) Method of Manufacturing Battery FIG. 1 is a cross-sectional view illustrating a manufactured battery. A positive electrode is a sheet electrode obtained by mixing lithium nickel oxide ($LiNi_{0.8}Co_{0.15}Al_{0.05}O_2$ made by Toda Kogyo Corp.) with an average particle diameter of 6 μm as a positive electrode material, polyvinylidene fluoride (KF#1320 made by Kureha Corporation) as a binder, and acetylene black (Denka Black made by Denki Kagaku Kogyo Kabushiki Kaisha) at a weight ratio of 89:6:5, adding N-methyl-2-pyrrolidinone thereto, kneading and forming the resultant in a paste shape, applying the paste to one surface of an aluminum foil with a thickness of 30 μm, and performing a drying process and a rolling process thereon, and cutting the resultant so that the size of the applied portion includes a width of 30 mm and a length of 50 mm. At this time, the amount of application per unit area was set to 10 $mg/cm^2$ in terms of the weight of lithium nickel oxide.

A positive electrode mixture is removed perpendicularly to the length direction of the sheet from a part of the sheet electrode, and the exposed aluminum foil is unified with and connected to the collector (the aluminum foil) of the applied portion and serves as a positive electrode lead plate.

A negative electrode is a sheet electrode obtained by mixing graphite powders of Graphites A-1 to W-1 as a negative electrode material, polyvinylidene fluoride (KF#9310 made by Kureha Corporation) as a binder, and acetylene black (Denka Black made by Denki Kagaku Kogyo Kabushiki Kaisha) at a weight ratio of 91:2:8, adding N-methyl-2-pyrrolidinone thereto, kneading and forming the resultant in a paste shape, applying the paste to one surface of a copper foil with a thickness of 18 μm, and performing a drying process and a rolling process thereon, and cutting the resultant so that the size of the applied portion includes a width of 32 mm and a length of 52 mm. At this time, the amount of application per unit area was set to 6 $mg/cm^2$ in terms of the weight of the graphite powder.

A negative electrode mixture is removed perpendicularly to the length direction of the sheet from a part of the sheet electrode, and the exposed copper foil is unified with and connected to the collector (the copper foil) of the applied portion and serves as a negative electrode lead plate.

A battery is assembled in a state in which the positive electrode, the negative electrode, the separator, and other components are sufficiently dried and are introduced into a glove box filled with argon gas with a dew point of −100° C. The drying conditions of the positive electrode and the negative electrode include a depressurized state, 150° C., and 12 hours or more and the drying conditions of the separator and other components include a depressurized state, 70° C., and 12 hours or more.

The dried positive electrode and the dried negative electrode were stacked and fixed with a polyimide tape in a state in which the applied portion of the positive electrode the applied portion of the negative electrode face each other with a micro-porous film (#2400 made by Celgard LLC.), which is formed of polypropylene, interposed therebetween. They were made to face each other so that the peripheral edge of the applied portion of the positive electrode projected onto the applied portion of the negative electrode was surrounded with the inside of the peripheral edge of the applied portion of the negative electrode. The obtained single-layered electrode member is embedded in an aluminum laminate film, an electrolyte solution is injected thereto, and the laminate film was thermally fused in a state in which the positive and negative electrode lead plates protrude, whereby a closed single-layered laminate battery was manufactured. The used electrolyte solution was obtained by dissolving lithium hexafluorophosphate ($LiPF_6$) in a solvent in which ethylene carbonate and ethylmethyl carbonate were mixed at a volume ratio of 3:7 so as to form a concentration of 1 mol/L.

(2) Method of Evaluating Battery

The obtained battery was set into a thermostatic chamber of 25° C. and the following charging and discharging test was performed. A static current charging operation was performed with a current of 1.5 mA until the battery voltage reaches 4.2 V. After a 10 minute pause, a static current discharging operation was performed with the same current until the battery voltage reaches 3.0 V. This charging and discharging cycle was repeatedly performed 10 times. Since this charging and discharging cycle is intended to check for abnormality of the battery, this charging and discharging cycle was not included in the number of cycles of the charging and discharging test. It was confirmed that all the batteries manufactured in the examples did not have abnormality.

The static current/static voltage charging operation with a charging current of 15 mA, a charging voltage of 4.2 V, and a charging time of 3 hours was performed and the static current discharging operation was performed with the same current (15 mA) until the battery voltage reaches 3.0 V after a 1 minute pause. The discharging capacity obtained at this time was defined as the discharging capacity of the first cycle. The charging and discharging cycle under the same conditions was repeatedly performed 3000 times, and the ratio (%) of the discharging capacity of the 3000-th cycle to the discharging capacity of the first cycle was calculated and was defined as a "3000-cycle capacity retention rate (%)". The discharging capacity of the first cycle, the discharging capacity of the 3000-th cycle, and the 3000-cycle capacity retention rate (%) are shown in Table 1.

8. Review of Test Results

Table 1 shows the H/C values and the microstrengths of Raw coke compositions A-1 to U-1, the crystallite sizes Lc(112) of Graphites A-1 to Z-1 corresponding to Raw coke compositions A-1 to U-1, and the discharging capacity (mAh) of the first cycle, the discharging capacity (mAh) of the 3000-th cycle, and the 3000-cycle capacity retention rate (%) of the lithium ion secondary batteries using the material as a negative electrode material.

Figure 2:
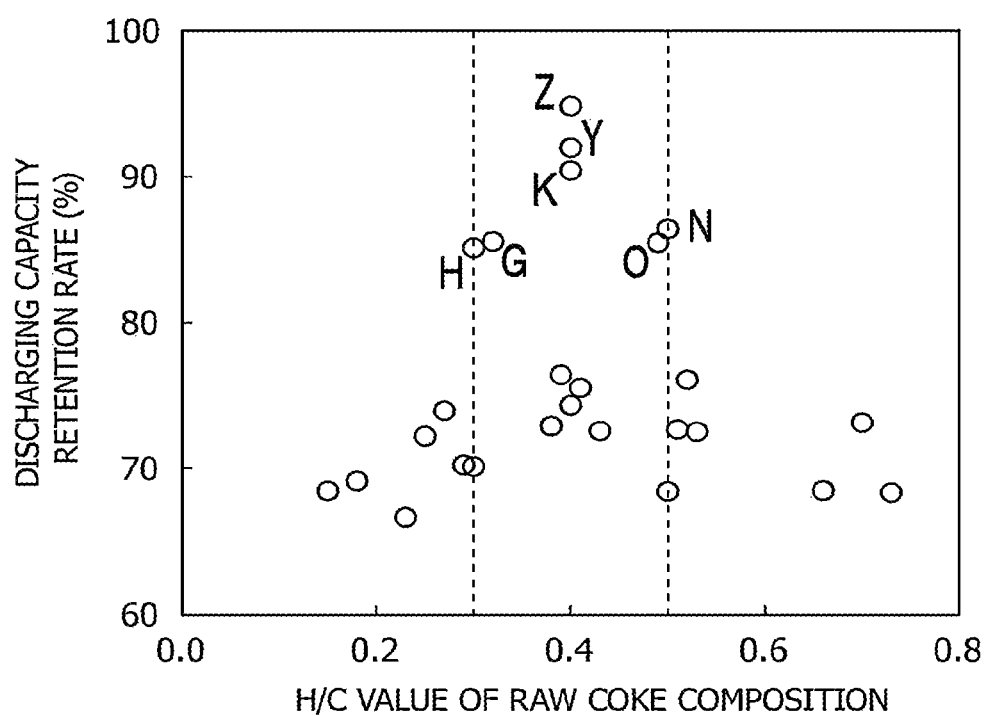
FIG. 2 is a diagram illustrating the relationship between the atomic ratio H/C of a raw coke composition and the discharging capacity retention rate of a battery.
Figure 3:
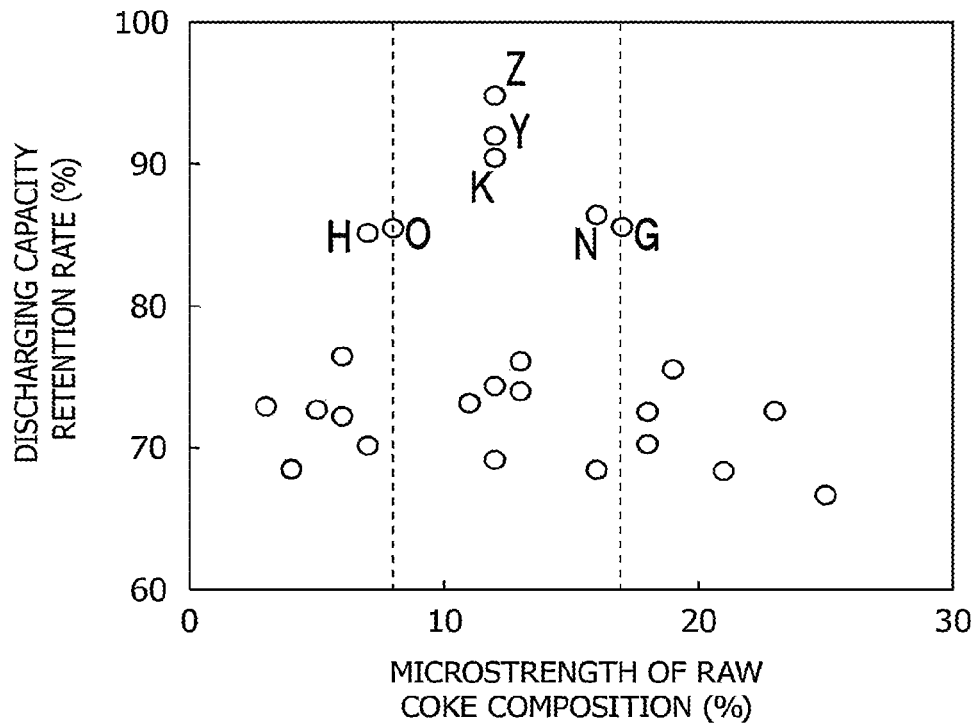
FIG. 3 is a diagram illustrating the relationship between the microstrength of a raw coke composition and the discharging capacity retention rate of a battery.

From FIGS. 2 and 3, it could be seen that the raw coke compositions satisfy the range of the invention, that is, the H/C values are in the range of 0.3 to 0.5 and the microstrengths are in the range of 7 wt % to 17 wt %, but the materials (G-1, H-1, K-1, N-1, O-1, Y-1, Z-1) obtained by applying a compressive stress and a shearing stress thereto and graphitizing them have the 3000-cycle discharging capacity retention rate of 85% or more, and thus it is possible to realize a lithium ion secondary battery with reduced cycle degradation and high reliability. The dotted lines perpendicular to the X axis in the graph shown in FIG. 2 are drawn at X=0.3 and X=0.5, and the dotted lines perpendicular to the X axis in the graph shown in FIG. 3 are drawn at X=7 and X=17.

In the batteries using the materials (graphites V-1, W-1, and X-1), which were graphitized without applying the compressive stress and the shearing stress thereto in the graphite manufacturing method using the raw coke compositions (H-1, K-1, and N-1), as a negative electrode material, the 3000-cycle capacity retention rate were 70.1%, 74.3%, and 68.4%, and the cycle degradation markedly increased in comparison with the graphites (85% or more) (H-1, K-1, and N-1) manufactured by applying the compressive stress and the shearing stress. In the batteries using the materials, of which the physical properties of the raw coke compositions are in the range of the invention but which are graphitized without applying the compressive stress and the shearing stress thereto, as a negative electrode material, since the cycle degradation increased, it could be seen that it was necessary as conditions for guaranteeing the 3000-cycle capacity retention rate of 85% or more the physical properties of the raw coke compositions satisfy the range of the invention and that the compressive stress and the shearing stress were applied thereto.

Graphites Y-1 and Z-1 were obtained by setting the graphitization temperature of Raw coke composition K-1 to 2600° C. and 2300° C., respectively. The crystallite size Lc(112) of Graphite K-1 processed at 2800° C. was 7.2 nm, but that of Graphite Y-1 processed at 2600° C. was 4 nm, and that of Graphite Z-1 processed at 2300° C. was 3.5 nm. On the other hand, since the discharging capacity of the first cycle of the batteries using these as a negative electrode material was 18.8 mAh for Graphite K-1, 16.2 mAh for Graphite Y-1, and 13.5 mAh for Graphite Z-1, it could be seen that as the crystallite size of the graphite used for the negative electrode decreases, the battery capacity decreases. In order to guarantee the capacity of 16 mAh with the battery having this size, it could be understood that the crystallite size Lc(112) of the graphite material used for the negative electrode should be 4 nm or more. Since Graphite Y-1 and Z-1 have physical properties of the raw coke compositions satisfying the ranges of the invention and were graphitized after applying the compressive stress and the shearing stress thereto, the 3000-cycle capacity retention rate was 92% or more. Accordingly, they could be said to be graphite materials for a negative electrode which can realize a battery with high cycle stability. However, since the crystallite sizes thereof are small, only a battery with small capacity can be realized, which is not desirable.

As described above, when a graphite material was obtained by graphitizing the graphite precursor, which was obtained by applying a compressive stress and a shearing stress to the pulverized and classified raw coke composition, so that the crystallite size Lc(112) of the (112) diffraction line measured using a wide-angle X-ray diffraction method is 4 nm or more, the pulverized and classified raw coke composition was obtained by coking a heavy oil composition through the use of the delayed coking process, the ratio of hydrogen atoms H and carbon atoms C, that is, the atomic ratio H/C, was in the range of 0.30 to 0.50, and the microstrength thereof was in the range of 7 wt % to 17 wt %, a lithium ion secondary battery using the graphite material as a negative electrode material could guarantee capacity of 16 mAh or more and the 3000-cycle capacity retention rate thereof could achieve 85% or more.

TABLE 1

| Raw coke composition | H/C of raw coke composition | Microstrength of raw coke composition (%) | Graphite powder corresponding to raw coke composition | Crystallite size of graphite Lc(112) (nm) | Discharging capacity of first cycle (mAh) | Discharging capacity of 3000-th cycle (mAh) | 3000-cycle capacity retention rate (%) |
|---|---|---|---|---|---|---|---|
| A-1 | 0.23 | 25 | A-1 | 10.4 | 19.8 | 13.2 | 66.7 |
| B-1 | 0.18 | 12 | B-1 | 11.7 | 20.1 | 13.9 | 69.2 |
| C-1 | 0.15 | 4 | C-1 | 12.6 | 20.3 | 13.9 | 68.5 |
| D-1 | 0.29 | 18 | D-1 | 9.4 | 19.5 | 13.7 | 70.3 |
| E-1 | 0.27 | 13 | E-1 | 9.7 | 19.6 | 14.5 | 74.0 |
| F-1 | 0.25 | 6 | F-1 | 10.6 | 19.8 | 14.3 | 72.2 |
| G-1 | 0.32 | 17 | G-1 | 9.2 | 19.4 | 16.6 | 85.6 |
| H-1 | 0.30 | 7 | H-1 | 9.5 | 19.5 | 16.6 | 85.1 |
| I-1 | 0.43 | 23 | I-1 | 6.8 | 18.6 | 13.5 | 72.6 |
| J-1 | 0.41 | 19 | J-1 | 7.3 | 18.8 | 14.2 | 75.5 |
| K-1 | 0.40 | 12 | K-1 | 7.2 | 18.8 | 17.0 | 90.4 |
| L-1 | 0.39 | 6 | L-1 | 8.1 | 19.1 | 14.6 | 76.4 |

TABLE 1-continued

| Raw coke composition | H/C of raw coke composition | Microstrength of raw coke composition (%) | Graphite powder corresponding to raw coke composition | Crystallite size of graphite Lc(112) (nm) | Discharging capacity of first cycle (mAh) | Discharging capacity of 3000-th cycle (mAh) | 3000-cycle capacity retention rate (%) |
|---|---|---|---|---|---|---|---|
| M-1 | 0.38 | 3 | M-1 | 8.4 | 19.2 | 14.0 | 72.9 |
| N-1 | 0.50 | 16 | N-1 | 6.4 | 18.4 | 15.9 | 86.4 |
| O-1 | 0.49 | 8 | O-1 | 6.8 | 18.6 | 15.9 | 85.5 |
| P-1 | 0.53 | 18 | P-1 | 6.0 | 18.2 | 13.2 | 72.5 |
| Q-1 | 0.52 | 13 | Q-1 | 6.4 | 18.4 | 14.0 | 76.1 |
| R-1 | 0.51 | 5 | R-1 | 6.1 | 18.3 | 13.3 | 72.7 |
| S-1 | 0.73 | 21 | S-1 | 5.3 | 17.7 | 12.1 | 68.4 |
| T-1 | 0.70 | 11 | T-1 | 7.8 | 19.0 | 13.9 | 73.2 |
| U-1 | 0.66 | 4 | U-1 | 5.8 | 18.1 | 12.4 | 68.5 |
| H-1 | 0.30 | 7 | V-1 | 11.7 | 20.1 | 14.1 | 70.1 |
| K-1 | 0.40 | 12 | W-1 | 8.1 | 19.1 | 14.2 | 74.3 |
| N-1 | 0.50 | 16 | X-1 | 7.1 | 18.7 | 12.8 | 68.4 |
| K-1 | 0.40 | 12 | Y-1 | 4.0 | 16.2 | 14.9 | 92.0 |
| K-1 | 0.40 | 12 | Z-1 | 3.5 | 13.5 | 12.8 | 94.8 |

The fourth embodiment to the fifth embodiment of the invention will be described below in more detail with reference to examples and comparative examples, but the invention is not in any way limited to the examples.

1. Raw Coke Composition and Manufacturing Method Thereof (1) Raw Coke Composition A-2

A hydrodesulfurized oil was obtained by hydrodesulfurizing an atmospheric distillation residual oil with a sulfur content of 3.1 wt % in the presence of a catalyst so that the hydrocracking ratio is equal to or less than 25%. The hydrodesulfurizing conditions were set to a total pressure of 180 MPa, a hydrogen partial pressure of 160 MPa, and a temperature of 380° C. A fluid catalytic cracking decant oil was obtained by fluid-catalytically cracking a desulfurized vacuum gas oil (with a sulfur content of 500 wt·ppm and a density of 0.88 g/cm³ at 15° C.). The desulfurized vacuum gas oil was divided into an aromatic content and a saturated content through the use of selective extraction using dimethylformamide and the aromatic content was extracted therefrom. A desulfurized deasphalted oil of 19 wt % (with respect to 100 wt % of the overall mixture including the desulfurized deasphalted oil) was added to a mixture of the extracted aromatic content and the hydrodesulfurized oil at a weight ratio of 8:1, whereby a heavy oil composition of a coke was obtained. This heavy oil composition was input to a delayed coker and was subjected to a coking process at 550° C. in the atmosphere of inert gas, whereby Raw coke composition A-2 was obtained.

(2) Raw Coke Composition B-2

A desulfurized deasphalted oil of 11 wt % was added to the mixture of the extracted aromatic content of the fluid catalytic cracking decant oil and the hydrodesulfurized oil, which were obtained in the same way as manufacturing Raw coke composition A-2, at a weight ratio of 8:1, whereby a heavy oil composition of a coke was obtained. This heavy oil composition was input to a delayed coker and was subjected to a coking process at 550° C. in the atmosphere of inert gas, whereby Raw coke composition B-2 was obtained.

(3) Raw Coke Composition C-2

A desulfurized deasphalted oil of 4 wt % was added to the mixture of the extracted aromatic content of the fluid catalytic cracking decant oil and the hydrodesulfurized oil, which were obtained in the same way as manufacturing Raw coke composition A-2, at a weight ratio of 8:1, whereby a heavy oil composition of a coke was obtained. This heavy oil composition was input to a delayed coker and was subjected to a coking process at 550° C. in the atmosphere of inert gas, whereby Raw coke composition C-2 was obtained.

(4) Raw Coke Composition D-2

A desulfurized deasphalted oil of 17 wt % was added to the mixture of the extracted aromatic content of the fluid catalytic cracking decant oil and the hydrodesulfurized oil, which were obtained in the same way as manufacturing Raw coke composition A-2, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition D-2 was obtained.

(5) Raw Coke Composition E-2

A desulfurized deasphalted oil of 11 wt % was added to the mixture of the extracted aromatic content of the fluid catalytic cracking decant oil and the hydrodesulfurized oil, which were obtained in the same way as manufacturing Raw coke composition A-2, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition E-2 was obtained.

(6) Raw Coke Composition F-2

A desulfurized deasphalted oil of 6 wt % was added to the mixture of the extracted aromatic content of the fluid catalytic cracking decant oil and the hydrodesulfurized oil, which were obtained in the same way as manufacturing Raw coke composition A-2, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition F-2 was obtained.

(7) Raw Coke Composition G-2

A desulfurized deasphalted oil of 15 wt % was added to the mixture of the hydrodesulfurized oil and the fluid catalytic cracking decant oil, which were obtained in the same way as manufacturing Raw coke composition A-2, at a weight ratio of 1:5, whereby a heavy oil composition of a coke was obtained. This heavy oil composition was input to a delayed coker and was subjected to a coking process at 550° C. in the atmosphere of inert gas, whereby Raw coke composition G-2 was obtained.

(8) Raw Coke Composition H-2

A desulfurized deasphalted oil of 7 wt % was added to the mixture of the hydrodesulfurized oil and the fluid catalytic cracking decant oil, which were obtained in the same way as manufacturing Raw coke composition A-2, at a weight ratio of 1:5, whereby a heavy oil composition of a coke was obtained. This heavy oil composition was input to a delayed coker and was subjected to a coking process at 550° C. in the atmosphere of inert gas, whereby Raw coke composition H-2 was obtained.

(9) Raw Coke Composition I-2

A desulfurized deasphalted oil of 19 wt % was added to the mixture of the hydrodesulfurized oil and the fluid catalytic cracking decant oil, which were obtained in the same way as manufacturing Raw coke composition A-2, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition I-2 was obtained.

(10) Raw Coke Composition J-2

A desulfurized deasphalted oil of 16 wt % was added to the mixture of the hydrodesulfurized oil and the fluid catalytic cracking decant oil, which were obtained in the same way as manufacturing Raw coke composition A-2, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition J-2 was obtained.

(11) Raw Coke Composition K-2

A desulfurized deasphalted oil of 11 wt % was added to the mixture of the hydrodesulfurized oil and the fluid catalytic cracking decant oil, which were obtained in the same way as manufacturing Raw coke composition A-2, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition K-2 was obtained.

(12) Raw Coke Composition L-2

A desulfurized deasphalted oil of 5 wt % was added to the mixture of the hydrodesulfurized oil and the fluid catalytic cracking decant oil, which were obtained in the same way as manufacturing Raw coke composition A-2, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition L-2 was obtained.

(13) Raw Coke Composition M-2

A desulfurized deasphalted oil of 3 wt % was added to the mixture of the hydrodesulfurized oil and the fluid catalytic cracking decant oil, which were obtained in the same way as manufacturing Raw coke composition A-2, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition M-2 was obtained.

(14) Raw Coke Composition N-2

A desulfurized deasphalted oil of 14 wt % was added to the mixture of the hydrodesulfurized oil and the fluid catalytic cracking decant oil, which were obtained in the same way as manufacturing Raw coke composition A-2, at a weight ratio of 1:3, whereby a heavy oil composition of a coke was obtained. This heavy oil composition was input to a delayed coker and was subjected to a coking process at 550° C. in the atmosphere of inert gas, whereby Raw coke composition N-2 was obtained.

(14) Raw Coke Composition O-2

A desulfurized deasphalted oil of 7 wt % was added to the mixture of the hydrodesulfurized oil and the fluid catalytic cracking decant oil, which were obtained in the same way as manufacturing Raw coke composition A-2, at a weight ratio of 1:3, whereby a heavy oil composition of a coke was obtained. This heavy oil composition was input to a delayed coker and was subjected to a coking process at 550° C. in the atmosphere of inert gas, whereby Raw coke composition O-2 was obtained.

(16) Raw Coke Composition P-2

After adding n-heptane of the same volume to the fluid catalytic cracking decant oil which was obtained in the same as obtaining Raw coke composition A-2 and mixing the resultant, the mixture was divided into an aromatic content and a saturated content through the use of selective extraction using dimethylformamide. A desulfurized deasphalted oil of 16 wt % was added to a mixture of the fluid catalytic cracking decant oil and the extracted saturated content at a weight ratio of 1:1, whereby a heavy oil composition of a coke was obtained. This heavy oil composition was input to a delayed coker and was subjected to a coking process at 550° C. in the atmosphere of inert gas, whereby Raw coke composition P-2 was obtained.

(17) Raw Coke Composition Q-2

A desulfurized deasphalted oil of 11 wt % was added to the mixture of the fluid catalytic cracking decant oil obtained in the same way as manufacturing Raw coke composition A-2, the fluid catalytic cracking decant oil obtained in the same way as manufacturing Raw coke composition P-2, and the extracted saturated content of n-heptane at a weight ratio of 1:1, whereby a heavy oil composition of a coke was obtained. This heavy oil composition was input to a delayed coker and was subjected to a coking process at 550° C. in the atmosphere of inert gas, whereby Raw coke composition Q-2 was obtained.

(18) Raw Coke Composition R-2

A desulfurized deasphalted oil of 6 wt % was added to the mixture of the fluid catalytic cracking decant oil obtained in the same way as manufacturing Raw coke composition A-2, the fluid catalytic cracking decant oil obtained in the same way as manufacturing Raw coke composition P-2, and the extracted saturated content of n-heptane at a weight ratio of 1:1, whereby a heavy oil composition of a coke was obtained. This heavy oil composition was input to a delayed coker and was subjected to a coking process at 550° C. in the atmosphere of inert gas, whereby Raw coke composition R-2 was obtained.

(19) Raw Coke Composition S-2

A desulfurized deasphalted oil of 19 wt % was added to the mixture of the fluid catalytic cracking decant oil obtained in the same way as manufacturing Raw coke composition A-2, the fluid catalytic cracking decant oil obtained in the same way as manufacturing Raw coke composition P-2, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition S-2 was obtained.

(20) Raw Coke Composition T-2

A desulfurized deasphalted oil of 10 wt % was added to the mixture of the fluid catalytic cracking decant oil obtained in the same way as manufacturing Raw coke composition A-2, the fluid catalytic cracking decant oil obtained in the same way as manufacturing Raw coke composition P-2, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition T-2 was obtained.

(21) Raw Coke Composition U-2

A desulfurized deasphalted oil of 4 wt % was added to the mixture of the fluid catalytic cracking decant oil obtained in the same way as manufacturing Raw coke composition A-2, the fluid catalytic cracking decant oil obtained in the same way as manufacturing Raw coke composition P-2, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition U-2 was obtained.

2. Analysis of Raw Coke Composition (1) Method of Measuring Atomic Ratio H/C of Raw Coke Composition The total hydrogen content of the raw coke composition was measured from the moisture content, which was generated from a combustion gas obtained by completely combusting a sample in an oxygen flow at 750° C., using a coulometric titration method (Karl-Fisher method). The sample of the raw coke composition was combusted in an oxygen flow of 1150° C., was converted into carbon dioxide (partially carbon monoxide), and was carried by the surplus oxygen flow, and then the total carbon content was calculated by a $CO_2+CO$ infrared detector. The H/C of the raw coke composition was calculated as a ratio of a value obtained by dividing the total hydrogen content (TH (wt %)) by the atomic weight of hydrogen to a value obtained by dividing the total carbon content (TC (wt %)) by the atomic weight of carbon. The values of H/C of Raw coke compositions A-2 to U-2 are shown in Table 2.

(2) Method of Measuring Microstrength of Raw Coke Composition

A microstrength was calculated as a value representing the weight of the sample on a sieve by percentage after inputting 2 g of the sample of 20 to 30 mesh and 12 steel balls with a diameter of 5/16 inch (7.9 mm) to a steel cylinder (with an inner diameter of 25.4 mm and a length of 304.8 mm), rotating a vertical plane in a direction perpendicular to the tube at 25 rpm by 800 turns (that is, rotating the cylinder in a state in which the rotation axis is set horizontally so as to trade places vertically as if rotating a propeller), and then sieving the resultant with a 48 mesh. The microstrengths of Raw coke compositions A-2 to U-2 are shown in Table 2.

3. Method of Manufacturing Graphite Material According to Example 1

By pulverizing Raw coke composition G-2 by the use of a mechanical pulverizer (for example, a super rotor mill made by Nisshin Engineering Inc.) and classifying the resultant by the use of a precision air classifier (for example, a turbo classifier made by Nisshin Engineering Inc.), a powder of the raw coke composition with an average particle diameter of 10 μm was obtained. Then, the powder having the compressive stress and the shearing stress applied thereto was carbonized in the nitrogen gas flow under the conditions of a highest temperature of 1200° C. and a highest temperature retention time of 5 hours by the use of a roller hearth kiln made by Takasago Industry Co., Ltd. The obtained carbon material was input to a crucible, the crucible was installed in an electric furnace, and the resultant was graphitized in the nitrogen gas flow of 80 L/min at the highest temperature of 2800° C. At this time, the temperature rising rate was set to 200° C./h, the highest temperature retention time was set to 3 hours, the temperature falling rate was set to 100° C./h to 1000° C., and the resultant was cooled to room temperature in a state in which the nitrogen gas flow was maintained, whereby graphite particles were obtained. In the obtained graphite particles, the crystallite size Lc(112) of the (112) diffraction line measured through the use of the wide-angle X-ray diffraction method was 10.9 nm. The obtained graphite particles were input to a "NOBILTA 130" made by Hosokawa Micron Corporation to satisfy a filled volume of 500 cc, and the apparatus was operated under the conditions of the number of rotation of a blade of 1300 rpm, a processing temperature of about 130° C., and a processing time of 15 minutes, whereby a graphite material having a compressive stress and a shearing stress applied thereto was obtained.

Method of Manufacturing Graphite Materials According to Examples 2 to 11 and Comparative Examples 1 to 16

The raw coke compositions described in Table 2 were pulverized and classified to satisfy the average particle diameters described in the table and were carbonized and graphitized under the same conditions as described in Example 1, whereby graphite particles were obtained. The same apparatuses as used in Example 1 were used as the pulverization and classification apparatuses and the carbonization and graphitization apparatuses. The obtained graphite particles were subjected to surface treatment using the apparatuses and conditions (the number of rotation or the peripheral speed, and the processing time) described in the table.

Method of Manufacturing Graphite Materials According to Examples 12 to 14

Raw coke compositions H-2, K-2, and N-2 were pulverized and classified to satisfy the average particle diameters described in the table and were carbonized and graphitized under the same conditions as described in Example 1, whereby graphite particles were obtained. The same apparatuses as used in Example 1 were used as the pulverization and classification apparatuses and the carbonization and graphitization apparatuses. The obtained graphite particles were subjected to surface treatment using the apparatuses and conditions (the number of rotation or the peripheral speed, and the processing time) described in the table. Thereafter, the graphite particles were subjected to heat treatment in the nitrogen gas flow under the conditions of a highest temperature of 1200° C. and a highest temperature retention time of 3 hours by the use of a roller hearth kiln made by Takasago Industry Co., Ltd.

Method of Manufacturing Graphite Materials According to Comparative Examples 17 and 18

Raw coke composition K-2 described in Table 2 were pulverized and classified to satisfy the average particle diameters described in the table and were carbonized and graphitized under the same conditions as described in Example 1, whereby graphite particles were obtained. The highest graphitization temperature was set to 2600° C. in Comparative Example 17 and was set to 2300° C. in Comparative Example 18. The same apparatuses as used in Example 1 were used as the pulverization and classification apparatuses and the carbonization and graphitization apparatuses. The obtained graphite particles were subjected to surface treatment using the apparatuses and conditions (the number of rotation or the peripheral speed, and the processing time) described in the table.

4. Calculation of Crystallite Size Lc(112) of Graphite Particles

A Si standard sample of 10 wt % as an internal standard was mixed into the obtained graphite particles, was filled in a glass rotating sample holder (25 mm diameter×0.2 mmt), was subjected to measurement using a wide-angle X-ray diffraction method on the basis of a method (Carbon 2006, No. 221, P52-60) defined by Committee 117 of Japan Society for the Promotion of Science, and the crystallite size Lc(112) of the graphite particles was calculated. D8 ADVANCE (enclosed tube type) made by Bruker-AXS Co. was used as an X-ray diffractometer, a CuKα ray (using Kβ filter-Ni) was used as an X-ray source, the application voltage and the application current to an X-ray bulb were set to 40 kV and 40 mA.

The obtained diffraction pattern was analyzed by the use of the method (Carbon 2006, No. 221, P52-60) defined by Committee 117 of Japan Society for the Promotion of Science. Specifically, the measured data was subjected to a smoothing process, a background removing process, an absorption correcting process, a polarization correcting process, and a Lorentz correcting process, the (112) diffraction line of the graphite powder was corrected using the peak position and the value width of a (422) diffraction line of the Si standard sample, and the crystallite size was calculated. The crystallite size was calculated from the half-value width of the corrected peak using the following Scherrer's formula. The measurement and analysis were carried out three times and the average value thereof was set as the Lc(112). The measurement results of Lc(112) of the graphite powders are shown in Table 2.

Numerical Expression 9

$$L = K \times \lambda / (\beta 0 \times \cos \theta B) \quad \text{Scherrer's formula}$$

Here, L: crystallite size (nm)
K: shape factor constant (=1.0)
λ: wavelength of X-ray (=0.15406 nm)
θB: Bragg angle
β0: half-value width (corrected value)

5. Manufacturing of Battery and Evaluation of Characteristics (1) Method of Manufacturing Battery FIG. 1 is a cross-sectional view illustrating a manufactured battery 10. In FIG. 1, a negative electrode 11, a negative electrode collector 12, a positive electrode 13, a positive electrode collector 14, a separator 15, and an aluminum laminate package 16 are shown.

A positive electrode is a sheet electrode obtained by mixing lithium nickel oxide ($LiNi_{0.8}Co_{0.15}Al_{0.05}O_2$ made by Toda Kogyo Corp.) with an average particle diameter of 6 μm as a positive electrode material, polyvinylidene fluoride (KF#1320 made by Kureha Corporation) as a binder, and acetylene black (Denka Black made by Denki Kagaku Kogyo Kabushiki Kaisha) at a weight ratio of 89:6:5, adding N-methyl-2-pyrrolidinone thereto, kneading and forming the resultant in a paste shape, applying the paste to one surface of an aluminum foil with a thickness of 30 μm, and performing a drying process and a rolling process thereon, and cutting the resultant so that the size of the applied portion includes a width of 30 mm and a length of 50 mm. At this time, the amount of application per unit area was set to 10 mg/cm$^2$ in terms of the weight of lithium nickel oxide.

A positive electrode mixture is removed perpendicularly to the length direction of the sheet from a part of the sheet electrode, the exposed aluminum foil is unified with and connected to the collector (the aluminum foil) of the applied portion and serves as a positive electrode lead plate.

A negative electrode is a sheet electrode obtained by mixing the graphite materials as a negative electrode material obtained in the examples and the comparative examples, polyvinylidene fluoride (KF#9310 made by Kureha Corporation) as a binder, and acetylene black (Denka Black made by Denki Kagaku Kogyo Kabushiki Kaisha) at a weight ratio of 91:2:8, adding N-methyl-2-pyrrolidinone thereto, kneading and forming the resultant in a paste shape, applying the paste to one surface of a copper foil with a thickness of 18 μm, and performing a drying process and a rolling process thereon, and cutting the resultant so that the size of the applied portion includes a width of 32 mm and a length of 52 mm. At this time, the amount of application per unit area was set to 6 mg/cm$^2$ in terms of the weight of the graphite material.

A negative electrode mixture is removed perpendicularly to the length direction of the sheet from a part of the sheet electrode, the exposed copper foil is unified with and connected to the collector (the copper foil) of the applied portion and serves as a negative electrode lead plate.

A battery is assembled in a state in which the positive electrode, the negative electrode, the separator, and other components are sufficiently dried and are introduced into a glove box filled with argon gas with a dew point of −100° C. The drying conditions of the positive electrode and the negative electrode include a depressurized state, 150° C., and 12 hours or more and the drying conditions of the separator and other components include a depressurized state, 70° C., and 12 hours or more.

The dried positive electrode and the dried negative electrode were stacked and fixed with a polyimide tape in a state in which the applied portion of the positive electrode and the applied portion of the negative electrode face each other with a micro-porous film (#2400 made by Celgard LLC.), which is formed of polypropylene, interposed therebetween. Regarding the laminated positional relationship of the positive electrode and the negative electrode, they were made to face each other so that the peripheral edge of the applied portion of the positive electrode projected onto the applied portion of the negative electrode was surrounded with the inside of the peripheral edge of the applied portion of the negative electrode. The obtained single-layered electrode member is embedded in an aluminum laminate film, an electrolyte solution is injected thereto, and the laminate film was thermally fused in a state in which the positive and negative electrode lead plates protrude, whereby a closed single-layered laminate battery was manufactured. The used electrolyte solution was obtained by dissolving lithium hexafluorophosphate ($LiPF_6$) in a solvent in which ethylene carbonate and ethylmethyl carbonate were mixed at a volume ratio of 3:7 so as to form a concentration of 1 mol/L.

(2) Method of Evaluating Battery

The obtained battery was set into a thermostatic chamber of 25° C. and the following charging and discharging test was performed. The static current/static voltage charging operation with a charging current of 15 mA, a charging voltage of 4.2 V, and a charging time of 3 hour was performed and the static current discharging operation was performed with the same current (15 mA) until the battery voltage reaches 3.0 V after a 1 minute pause. The charging and discharging cycle under the same conditions was repeatedly performed five times and the discharging capacity of the fifth cycle was defined as an "initial discharging capacity". In the sixth cycle, the battery was set into a thermostatic chamber of 60° C. in a state in which the charging operation was performed under the same conditions and was left therein for 30 days. Thereafter, the thermostatic chamber was set to 25° C., the battery was left for 5 hours, and then was discharged. Then, the charging and discharging cycle under the same conditions as described above was repeatedly performed five times, and the discharging capacity of the fifth cycle was defined as a "60° C. 30-days discharging capacity". The ratio (%) of the "60° C. 30-days discharging capacity" to the "initial discharging capacity" was calculated as an index indicating the storage characteristics and was defined as a "60° C. 30-days capacity retention rate (%)". The initial discharging capacity, the 60° C. 30-days discharging capacity, and the 60° C. 30-days capacity retention rate (%) are shown in Table 2.

TABLE 2

| | Raw coke composition | H/C of raw coke composition | Microstrength of raw coke composition | Property of Raw coke composition Average particle diameter (μm) | Property of graphite particles Lc(112) (nm) | Conditions for applying compressing shearing stress Apparatus | Number of turns rpm | Peripheral speed m/s | Time min | Battery characteristics Initial discharging capacity (mAh) | 60° C. 30-days discharging capacity (mAh) | 60° C. 30-days capacity retention rate (%) |
|---|---|---|---|---|---|---|---|---|---|---|---|---|
| Ex. 1 | G-2 | 0.32 | 17 | 10 | 10.9 | Nobilta | 1300 | — | 15 | 18.7 | 16.7 | 89.1 |
| Ex. 2 | H-2 | 0.30 | 7 | 12 | 9.5 | Nobilta | 1300 | — | 60 | 18.3 | 16.5 | 89.9 |
| Ex. 3 | K-2 | 0.40 | 12 | 12 | 6.9 | Nobilta | 1300 | — | 15 | 17.8 | 16.4 | 92.0 |
| Ex. 4 | N-2 | 0.50 | 16 | 18 | 6.4 | Nobilta | 1300 | — | 15 | 17.8 | 16.0 | 89.7 |
| Ex. 5 | O-2 | 0.49 | 8 | 18 | 6.8 | Nobilta | 1000 | — | 30 | 18.1 | 16.2 | 89.6 |
| Ex. 6 | K-2 | 0.40 | 12 | 5 | 7.6 | Nobilta | 1000 | — | 15 | 18.0 | 16.3 | 90.8 |
| Ex. 7 | G-2 | 0.32 | 17 | 30 | 30 | Nobilta | 600 | — | 5 | 22.9 | 20.4 | 89.0 |
| Ex. 8 | K-2 | 0.40 | 12 | 14 | 6.9 | Nobilta | 4000 | — | 5 | 17.7 | 16.1 | 91.2 |
| Ex. 9 | N-2 | 0.50 | 16 | 28 | 4.0 | COMPOSI | — | 25 | 90 | 17.2 | 16.0 | 92.8 |
| Ex. 10 | K-2 | 0.40 | 12 | 15 | 6.9 | COMPOSI | — | 60 | 15 | 17.8 | 16.1 | 90.3 |
| Ex. 11 | K-2 | 0.40 | 12 | 16 | 7.5 | Mechano-fusion | 2650 | — | 30 | 17.9 | 16.3 | 91.0 |
| Ex. 12 | H-2 | 0.30 | 7 | 22 | 9.5 | Nobilta | 1300 | — | 5 | 18.3 | 16.5 | 90.1 |
| Ex. 13 | K-2 | 0.40 | 12 | 25 | 7.2 | Nobilta | 900 | — | 90 | 17.9 | 16.5 | 92.4 |
| Ex. 14 | N-2 | 0.50 | 16 | 16 | 6.4 | Nobilta | 1300 | — | 30 | 17.6 | 16.8 | 95.2 |
| Com. Ex. 1 | A-2 | 0.23 | 25 | 21 | 10.4 | Nobilta | 1300 | — | 30 | 18.4 | 12.2 | 66.4 |
| Com. Ex. 2 | B-2 | 0.18 | 12 | 15 | 11.7 | Nobilta | 1300 | — | 15 | 18.7 | 12.6 | 67.5 |
| Com. Ex. 3 | C-2 | 0.15 | 4 | 5 | 12.6 | Nobilta | 1300 | — | 30 | 19.0 | 12.4 | 65.1 |
| Com. Ex. 4 | D-2 | 0.29 | 18 | 15 | 9.4 | Nobilta | 1300 | — | 15 | 18.4 | 14.4 | 78.2 |
| Com. Ex. 5 | E-2 | 0.27 | 13 | 15 | 9.7 | Nobilta | 1300 | — | 15 | 18.3 | 14.0 | 76.3 |
| Com. Ex. 6 | F-2 | 0.25 | 6 | 15 | 10.6 | Nobilta | 1300 | — | 15 | 18.5 | 13.9 | 75.4 |
| Com. Ex. 7 | I-2 | 0.43 | 23 | 12 | 6.8 | Nobilta | 1300 | — | 15 | 17.8 | 12.6 | 70.7 |
| Com. Ex. 8 | J-2 | 0.41 | 19 | 13 | 7.3 | Nobilta | 1300 | — | 30 | 17.8 | 13.7 | 77.2 |
| Com. Ex. 9 | L-2 | 0.39 | 6 | 14 | 8.1 | Nobilta | 1300 | — | 45 | 18.0 | 13.6 | 75.8 |
| Com. Ex. 10 | M-2 | 0.38 | 3 | 12 | 8.4 | Nobilta | 1300 | — | 30 | 18.0 | 12.6 | 69.9 |
| Com. Ex. 11 | P-2 | 0.53 | 18 | 12 | 6.0 | Nobilta | 1300 | — | 15 | 17.6 | 13.3 | 75.3 |
| Com. Ex. 12 | Q-2 | 0.52 | 13 | 15 | 6.4 | Nobilta | 1300 | — | 90 | 17.7 | 13.7 | 77.3 |
| Com. Ex. 13 | R-2 | 0.51 | 5 | 13 | 6.1 | Nobilta | 1300 | — | 45 | 17.5 | 13.9 | 79.4 |
| Com. Ex. 14 | S-2 | 0.73 | 21 | 18 | 5.3 | Nobilta | 1300 | — | 30 | 17.4 | 11.5 | 66.3 |
| Com. Ex. 15 | T-2 | 0.70 | 11 | 18 | 7.8 | Nobilta | 1300 | — | 30 | 19.5 | 12.6 | 64.5 |
| Com. Ex. 16 | U-2 | 0.66 | 4 | 12 | 5.8 | Nobilta | 1300 | — | 30 | 18.7 | 11.6 | 62.1 |
| Com. Ex. 17 | K-2 | 0.40 | 12 | 12 | 3.9 | Nobilta | 1300 | — | 15 | 16.6 | 15.0 | 90.1 |
| Com. Ex. 18 | K-2 | 0.40 | 12 | 12 | 3.2 | Nobilta | 1300 | — | 15 | 16.2 | 14.8 | 91.2 |

6. Review of Test Result

Table 2 shows the H/C values and the microstrengths of the raw coke compositions, the average particle diameters of the raw coke compositions, the Lc(112) values of the graphite particles, the surface treatment conditions, and the initial discharging capacity (mAh), the 60° C. 30-days discharging capacity (mAh), and the 60° C. 30-days capacity retention rate (%) of the lithium ion batteries using the graphite materials, which were obtained in the examples and the comparative examples, as a negative electrode material.

In Examples 1 to 11, the graphite particles obtained by carbonizing and graphitizing the powders of the raw coke compositions, which were obtained by pulverizing and classifying the raw coke compositions (G-2, H-2, K-2, N-2, and O-2) satisfying the range of the invention, that is, the H/C range of 0.3 to 0.5 and the microstrength range of 7 to 17, satisfied the ranges of the invention, that is, the crystallite size Lc(112) calculated from the (112) diffraction line measured through the use of the wide-angle X-ray diffraction method was in the range of 4 nm to 30 nm. The 60° C. 30-days capacity retention rates of the batteries using the graphite materials obtained by applying the compressive shearing stress to the graphite particles as a negative electrode material were 89% or more, and it was thus seen that it was possible to realize a lithium ion secondary battery with very excellent storage characteristics.

In Examples 12 to 14, the graphite particles obtained by carbonizing and graphitizing the powders of the raw coke compositions, which were obtained by pulverizing and classifying the raw coke compositions (H-2, K-2, and N-2) satisfying the H/C range of 0.3 to 0.5 and the microstrength range of 7 to 17, satisfied the ranges of the invention, that is, the crystallite size Lc(112) calculated from the (112) diffraction line measured through the use of the wide-angle X-ray diffraction method was in the range of 4 nm to 30 nm. The 60° C. 30-days capacity retention rates of the batteries using the graphite materials obtained by performing heat treatment after obtaining graphite materials by applying the compressive shearing stress to the graphite particles as a negative electrode material were higher than those in the cases (Examples 2, 3, and 4) in which the heat treatment was not performed. From this result, the manufacturing method of performing heat treatment on the graphite material obtained by applying the compressive shearing stress to the graphite particles obtained by graphitizing the raw coke compositions (H-2, K-2, and N-2) can be said to be means effective for improvement in the capacity retention rate.

The raw coke compositions used in Comparative Examples 1 to 16 did not satisfy the ranges of the invention, that is, the H/C range of 0.3 to 0.5 and the microstrength range of 7 to 17. The 60° C. 30-days capacity retention rates of the batteries using the graphite materials, which were obtained by applying the compressive shearing stress to the graphite particles obtained by pulverizing and classifying the raw coke compositions and then carbonizing and graphitizing the resultant, as a negative electrode material were very low.

From these results, the use of the raw coke composition having an atomic ratio H/C of hydrogen atoms H and carbon atoms C in a range of 0.30 to 0.50 and has a microstrength of 7 wt % to 17 wt % in the method of manufacturing a graphite material for a negative electrode of a lithium ion secondary battery, including at least: a step of pulverizing and classifying a raw coke composition obtained by coking a heavy oil composition through the use of a delayed coking process to obtain a powder of the raw coke composition; a step of heating the pulverized and classified powder of the raw coke composition to obtain a carbonized composition; a step of graphitizing the carbonized composition by heating to obtain graphite particles in which a crystallite size Lc(112) of a (112) diffraction line measured through the use of a wide-angle X-ray diffraction method is 4 nm to 30 nm; and a step of applying a compressive shearing stress to the graphite particles to obtain a graphite material can be said to be necessary and essential conditions for obtaining a graphite material for a negative electrode of a lithium ion secondary battery achieving high storage characteristics that the 60° C. 30-days capacity retention rate is 89% or more.

In Comparative Examples 17 and 18, the graphitization temperatures of Raw coke composition K-2 were set to 2600° C. and 2300° C., respectively. The crystallite size Lc(112) of Graphite Particle K-2 (Example 3) processed at 2800° C. was 6.9 nm, but the crystallite size Lc(112) of the graphite particles obtained in Comparative Example 17 at 2600° C. was 3.9 nm and the crystallite size Lc(112) of the graphite particles obtained in Comparative Example 18 at 2300° C. was 3.2 nm. The 60° C. 30-days capacity retention rate of the lithium ion secondary battery using the graphite material, which was obtained by applying the compressive shearing stress to the graphite particles, as a negative electrode material was 16.4 mAh in Example 3, but 15.0 mAh in Comparative Example 17 and 14.8 mAh in Comparative Example 18.

From these results, it could be seen that as the crystallite size of graphite used for the negative electrode decreases, the battery capacity decreases. In order to guarantee the 60° C. 30-days discharging capacity of 16 mAh with the battery having this size, it could be understood that the crystallite size Lc(112) of the graphite material used for the negative electrode should be 4 nm or more.

In Comparative Examples 17 and 18, since the physical properties of the raw coke compositions are within the ranges of the invention, the capacity retention rate was 90% or more and thus the graphite materials could be said to be graphite materials for a negative electrode which can realize a battery with high cycle stability. However, since the crystallite sizes thereof are small, only a battery with small capacity can be realized, which is not desirable.

As described above, when a graphite material for a negative electrode of a lithium ion secondary battery is obtained by applying the compressive shearing stress to the graphite particles, which were obtained by carbonizing and graphitizing the powder of the pulverized and classified raw coke composition so that the crystallite size Lc(112) of the (112) diffraction line measured using a wide-angle X-ray diffraction method is 4 nm or more, the raw coke composition is obtained by coking a heavy oil composition through the use of the delayed coking process, the ratio of hydrogen atoms H and carbon atoms C, that is, the atomic ratio H/C, is in the range of 0.30 to 0.50, and the microstrength thereof is in the range of 7 wt % to 17 wt %, a lithium ion secondary battery using the graphite material as a negative electrode material can guarantee capacity of 16 mAh or more and the capacity retention rate thereof after it is left in a thermostatic chamber of 60° C. for 30 days can achieve 89% or more.

The sixth embodiment to the seventh embodiment of the invention will be described below in more detail with reference to examples and comparative examples, but the invention is not limited to the examples at all.

1. Raw Coke Composition and Manufacturing Method Thereof (1) Raw Coke Composition A-3

A hydrodesulfurized oil was obtained by hydrodesulfurizing an atmospheric distillation residual oil with a sulfur content of 3.1 wt % in the presence of a catalyst so that the hydrocracking ratio is equal to or less than 25%. The hydrodesulfurizing conditions were set to a total pressure of 180 MPa, a hydrogen partial pressure of 160 MPa, and a temperature of 380° C. A fluid catalytic cracking decant oil was obtained by fluid-catalytically cracking a desulfurized vacuum gas oil (with a sulfur content of 500 wt·ppm and a density of 0.88 g/cm$^3$ at 15° C.). The desulfurized vacuum gas oil was divided into an aromatic content and a saturated content through the use of selective extraction using dimethylformamide and the aromatic content was extracted therefrom. A desulfurized deasphalted oil of 19 wt % (with respect to 100 wt % of the overall mixture including the desulfurized deasphalted oil) was added to a mixture of the extracted aromatic content and the hydrodesulfurized oil at a weight ratio of 8:1, whereby a heavy oil composition of a coke was obtained. This heavy oil composition was input to a delayed coker and was subjected to a coking process at 550° C. in the atmosphere of inert gas, whereby Raw coke composition A-3 was obtained.

(2) Raw Coke Composition B-3

A desulfurized deasphalted oil of 11 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-3, at a weight ratio of 8:1, whereby a heavy oil composition of a coke was obtained. This heavy oil composition was input to a delayed coker and was subjected to a coking process at 550° C. in the atmosphere of inert gas, whereby Raw coke composition B-3 was obtained.

(3) Raw Coke Composition C-3

A desulfurized deasphalted oil of 4 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-3, at a weight ratio of 8:1, whereby a heavy oil composition of a coke was obtained. This heavy oil composition was input to a delayed coker and was subjected to a coking process at 550° C. in the atmosphere of inert gas, whereby Raw coke composition C-3 was obtained.

(4) Raw Coke Composition D-3

A desulfurized deasphalted oil of 17 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-3, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition D-3 was obtained.

(5) Raw Coke Composition E-3

A desulfurized deasphalted oil of 11 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-3, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition E-3 was obtained.

(6) Raw Coke Composition F-3

A desulfurized deasphalted oil of 6 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-3, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition F-3 was obtained.

(7) Raw Coke Composition G-3

A desulfurized deasphalted oil of 15 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:5, whereby a heavy oil composition of a coke was obtained. This heavy oil composition was input to a delayed coker and was subjected to a coking process at 550° C. in the atmosphere of inert gas, whereby Raw coke composition G-3 was obtained.

(8) Raw Coke Composition H-3

A desulfurized deasphalted oil of 7 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:5, whereby a heavy oil composition of a coke was obtained. This heavy oil composition was input to a delayed coker and was subjected to a coking process at 550° C. in the atmosphere of inert gas, whereby Raw coke composition H-3 was obtained.

(9) Raw Coke Composition I-3

A desulfurized deasphalted oil of 19 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition I-3 was obtained.

(10) Raw Coke Composition J-3

A desulfurized deasphalted oil of 16 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition J-3 was obtained.

(11) Raw Coke Composition K-3

A desulfurized deasphalted oil of 11 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition K-3 was obtained.

(12) Raw Coke Composition L-3

A desulfurized deasphalted oil of 5 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition L-3 was obtained.

(13) Raw Coke Composition M-3

A desulfurized deasphalted oil of 3 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition M-3 was obtained.

(14) Raw Coke Composition N-3

A desulfurized deasphalted oil of 14 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:3, whereby a heavy oil composition of a coke was obtained. This heavy oil composition was input to a delayed coker and was subjected to a coking process at 550° C. in the atmosphere of inert gas, whereby Raw coke composition N-3 was obtained.

(15) Raw Coke Composition O-3

A desulfurized deasphalted oil of 7 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-3, at a weight ratio of 1:3, whereby a heavy oil composition of a coke was obtained. This heavy oil composition was input to a delayed coker and was subjected to a coking process at 550° C. in the atmosphere of inert gas, whereby Raw coke composition O-3 was obtained.

(16) Raw Coke Composition P-3

After adding n-heptane of the same volume to the fluid catalytic cracking decant oil which was obtained in the same as obtaining Raw coke composition A-3 and mixing the resultant, the mixture was divided into an aromatic content and a saturated content through the use of selective extraction using dimethylformamide. A desulfurized deasphalted oil of 16 wt % (with respect to 100 wt % of the total mixture including the desulfurized deasphalted oil) was added to a mixture of the fluid catalytic cracking decant oil and the extracted saturated content at a weight ratio of 1:1, whereby a heavy oil composition of a coke was obtained. This heavy oil composition was input to a delayed coker and was subjected to a coking process at 550° C. in the atmosphere of inert gas, whereby Raw coke composition P-3 was obtained.

(17) Raw Coke Composition Q-3

A desulfurized deasphalted oil of 11 wt % (with respect to 100 wt % of the total mixture including the desulfurized deasphalted oil) was added to the mixture of the fluid catalytic cracking decant oil obtained in the same way as manufacturing Raw coke composition A-3, the fluid catalytic cracking decant oil obtained in the same way as manufacturing Raw coke composition P-3, and the extracted saturated content of n-heptane at a weight ratio of 1:1, whereby a heavy oil composition of a coke was obtained. This heavy oil composition was input to a delayed coker and was subjected to a coking process at 550° C. in the atmosphere of inert gas, whereby Raw coke composition Q-3 was obtained.

(18) Raw Coke Composition R-3

A desulfurized deasphalted oil of 6 wt % (with respect to 100 wt % of the total mixture including the desulfurized deasphalted oil) was added to the mixture of the fluid catalytic cracking decant oil obtained in the same way as manufacturing Raw coke composition A-3, the fluid catalytic cracking decant oil obtained in the same way as manufacturing Raw coke composition P-3, and the extracted saturated content of n-heptane at a weight ratio of 1:1, whereby a heavy oil composition of a coke was obtained. This heavy oil composition was input to a delayed coker and was subjected to a coking process at 550° C. in the atmosphere of inert gas, whereby Raw coke composition R-3 was obtained.

(19) Raw Coke Composition S-3

A desulfurized deasphalted oil of 19 wt % (with respect to 100 wt % of the total mixture including the desulfurized deasphalted oil) was added to the mixture of the fluid catalytic cracking decant oil obtained in the same way as manufacturing Raw coke composition A-3, the fluid catalytic cracking decant oil obtained in the same way as manufacturing Raw coke composition P-3, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition S-3 was obtained.

(20) Raw Coke Composition T-3

A desulfurized deasphalted oil of 10 wt % (with respect to 100 wt % of the total mixture including the desulfurized deasphalted oil) was added to the mixture of the fluid catalytic cracking decant oil obtained in the same way as manufacturing Raw coke composition A-3, the fluid catalytic cracking decant oil obtained in the same way as manufacturing Raw coke composition P-3, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition T-3 was obtained.

(21) Raw Coke Composition U-3

A desulfurized deasphalted oil of 4 wt % (with respect to 100 wt % of the total mixture including the desulfurized deasphalted oil) was added to the mixture of the fluid catalytic cracking decant oil obtained in the same way as manufacturing Raw coke composition A-3, the fluid catalytic cracking decant oil obtained in the same way as manufacturing Raw coke composition P-3, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition U-3 was obtained.

2. Analysis of Raw Coke Composition (1) Method of Measuring Atomic Ratio H/C of Raw Coke Composition The total hydrogen content of the raw coke composition was measured from the moisture content, which was generated from a combustion gas obtained by completely combusting a sample in an oxygen flow at 750° C., using a coulometric titration method (Karl-Fisher method). The sample of the raw coke composition was combusted in an oxygen flow of 1150° C., was converted into carbon dioxide (partially carbon monoxide), and was carried by the surplus oxygen flow, and then the total carbon content was calculated by a $CO_2$+CO infrared detector. The H/C of the raw coke composition was calculated as a ratio of a value obtained by dividing the total hydrogen content (TH (wt %)) by the atomic weight of hydrogen to a value obtained by dividing the total carbon content (TC (wt %)) by the atomic weight of carbon. The values of H/C of Raw coke compositions A-3 to U-3 are shown in Table 3.

(2) Method of Measuring Microstrength of Raw Coke Composition

A microstrength was calculated as a value representing the weight of the sample on a sieve by percentage after inputting 2 g of the sample of 20 to 30 mesh and 12 steel balls with a diameter of 5/16 inch (7.9 mm) to a steel cylinder (with an inner diameter of 25.4 mm and a length of 304.8 mm), rotating a vertical plane in a direction perpendicular to the tube at 25 rpm by 800 turns (that is, rotating the cylinder in a state in which the rotation axis is set horizontally so as to trade places vertically as if rotating a propeller), and then sieving the resultant with a 48 mesh. The microstrengths of Raw coke compositions A-3 to U-3 are shown in Table 3.

By pulverizing Raw coke compositions A-3 to U-3 by the use of a mechanical pulverizer (for example, a super rotor mill made by Nisshin Engineering Inc.) and classifying the resultant by the use of a precision air classifier (for example, a turbo classifier made by Nisshin Engineering Inc.), a powder of the raw coke composition with an average particle diameter of 14 μm was obtained. Here, the average particle diameter of the powder of the raw coke composition was measured using a laser diffraction/scattering particle size analyzer LA950 made by Horiba Ltd.

3. Method of Manufacturing Calcined Coke

A method of manufacturing a calcined coke will be described below. A hydrodesulfurized oil was obtained by hydrodesulfurizing an atmospheric distillation residual oil with a sulfur content of 3.1 wt % in the presence of a catalyst so that the hydrocracking ratio is equal to or less than 25%. The hydrodesulfurizing conditions were set to a total pressure of 180 MPa, a hydrogen partial pressure of 160 MPa, and a temperature of 380° C. A fluid catalytic cracking decant oil was obtained by fluid-catalytically cracking a desulfurized vacuum gas oil (with a sulfur content of 500 wt·ppm and a density of 0.88 g/cm³ at 15° C.). The desulfurized vacuum gas oil was divided into an aromatic content and a saturated content through the use of selective extraction using dimethylformamide and the aromatic content was extracted therefrom. A desulfurized deasphalted oil was added to a mixture of the extracted aromatic content and the hydrodesulfurized oil at a weight ratio of 8:1, whereby a heavy oil composition of a coke was obtained. This heavy oil composition was input to a delayed coker, was subjected to a coking process at 550° C. in the atmosphere of inert gas, was coarsely pulverized so as to include particles with a particle diameter of 2 mm or more by 0.1 wt % using a hammer mill (with a hammer diameter of 500 mm) formed of SUS304, and was then carbonized at 1400° C. using a rotary kiln, whereby the calcined coke was obtained.

By pulverizing the obtained calcined coke by the use of a mechanical pulverizer (for example, a super rotor mill made by Nisshin Engineering Inc.) and classifying the resultant by the use of a precision air classifier (for example, a turbo classifier made by Nisshin Engineering Inc.), a powder of the calcined coke with an average particle diameter described in Table 3 was obtained. Here, the average particle diameter of the calcined coke was measured using a laser diffraction/ scattering particle size analyzer LA950 made by Horiba Ltd.

4. Method of Manufacturing Graphite Material According to Example 15

The powder of Raw coke composition K-3 and the obtained calcined coke with an average particle diameter of 2.0 μm were mixed in advance at a ratio 0.5 wt % of the calcined coke to Raw coke composition K-3. Then, the mixture was input to a "NOBILTA 130" made by Hosokawa Micron Corporation to satisfy a filled volume of 500 cc, and the apparatus was operated under the conditions of the number of rotation of a blade of 3500 rpm, a processing temperature of about 130° C., and a processing time of 60 minutes, whereby a compound powder was obtained by applying the compressive shearing stress thereto.

The compound powder was carbonized in the nitrogen gas flow under the conditions of a highest temperature of 1200° C. and a highest temperature retention time of 5 hours by the use of a roller hearth kiln made by Takasago Industry Co., Ltd. The obtained carbon material was input to a crucible, the crucible was installed in an electric furnace, and the resultant was graphitized in the nitrogen gas flow of 80 L/min at the highest temperature of 2800° C. At this time, the temperature rising rate was set to 200° C./h, the highest temperature retention time was set to 3 hours, the temperature falling rate was set to 100° C./h to 1000° C., and the resultant was cooled to room temperature in a state in which the nitrogen gas flow was maintained, whereby a graphite material was obtained. In the obtained graphite material, the crystallite size Lc(112) of the (112) diffraction line measured through the use of the wide-angle X-ray diffraction method was 7.9 nm.

Method of Manufacturing Graphite Materials According to Examples 16 to 31 and Comparative Examples 19 to 46

In Examples 16 to 31 and Comparative Examples 19 to 46, the powders of Raw coke compositions A-3 to U-3 and the calcined coke were mixed, the compressive shearing stress was applied thereto to obtain compound powders, and the obtained compound powders were carbonized and graphitized under the same conditions as in Example 1, whereby graphite materials were obtained. The average particle diameter and the amount of the calcined coke and the compressive shearing stress applying conditions were the same as shown in Table 3. Here, as the apparatus applying the compressive shearing stress, the "NOBILTA 130" made by Hosokawa Micron Corporation was used in Examples 16 to 28 and Comparative Examples 19 to 46, the "COMPOSI CP-15" made by Nippon Coke & Engineering Co., Ltd. was used in Examples 29 and 30, and the "Mechano-fusion AMS-Lab" made by Hosokawa Micron Corporation was used in Example 31. In Table 3, the "NOBILTA 130" was abbreviated as "N", the "COMPOSI CP-15" was abbreviated as "C", and the "Mechano-fusion AMS-Lab" was abbreviated as "M". The apparatuses other than the apparatus applying the compressive shearing stress were the same as used in Example 15.

5. Calculation of Crystallite Size Lc(112) of Graphite Powder

A Si standard sample of 5 wt % as an internal standard was mixed into the obtained graphite material, was filled in a glass rotating sample holder (25 mm diameter×0.2 mmt), was subjected to measurement using a wide-angle X-ray diffraction method on the basis of a method (Carbon 2006, No. 221, P52-60) defined by the 117 committee of Japan Society for the Promotion of Science, and the crystallite size Lc(112) of the graphite powder was calculated. ULTIMA IV made by Rigaku Corporation was used as an X-ray diffractometer, a CuKα ray (using Kβ filter-Ni) was used as an X-ray source, the application voltage and the application current to an X-ray bulb were set to 40 kV and 40 mA.

The obtained diffraction pattern was analyzed by the use of the method (Carbon 2006, No. 221, P52-60) defined by the 117 committee of Japan Society for the Promotion of Science. Specifically, the measured data was subjected to a smoothing process, a background removing process, an absorption correcting process, a polarization correcting process, and a Lorentz correcting process, the (112) diffraction line of the graphite powder was corrected using the peak position and the value width of a (422) diffraction line of the Si standard sample, and the crystallite size was calculated. The crystallite size was calculated from the half-value width of the corrected peak using the following Scherrer's formula. The measurement and analysis were carried out three times and the average value thereof was set as the Lc(112). The measurement results of Lc(112) the graphite materials are shown in Table 3.

Numerical Expression 11

$$L = K \times \lambda / (\beta 0 \times \cos \theta B) \quad \text{Scherrer's formula}$$

Here, L: crystallite size (nm)
K: shape factor constant (=1.0)
λ: wavelength of X-ray (=0.15406 nm)
θB: Bragg angle
β0: half-value width (corrected value)

6. Manufacturing of Battery and Evaluation of Characteristics (1) Method of Manufacturing Battery FIG. 1 is a cross-sectional view illustrating a manufactured battery 10. In FIG. 1, a negative electrode 11, a negative electrode collector 12, a positive electrode 13, a positive electrode collector 14, a separator 15, and an aluminum laminate package 16.

A positive electrode 13 is a sheet electrode obtained by mixing lithium nickel oxide ($LiNi_{0.8}Co_{0.15}Al_{0.05}O_2$ made by Toda Kogyo Corp.) with an average particle diameter of 6 μm as a positive electrode material, polyvinylidene fluoride (KF#1320 made by Kureha Corporation) as a binder, and acetylene black (Denka Black made by Denki Kagaku Kogyo Kabushiki Kaisha) at a weight ratio of 89:6:5, adding N-methyl-2-pyrrolidinone thereto, kneading and forming the resultant in a paste shape, applying the paste to one surface of an aluminum foil with a thickness of 30 μm, and performing a drying process and a rolling process thereon, and cutting the resultant so that the size of the applied portion includes a

TABLE 3

| | | | | Powder of calcined coke | | Conditions of applying compressive shearing stress | | | | Property of graphite material (nm) |
|---|---|---|---|---|---|---|---|---|---|---|
| | Raw coke composition | H/C | Microstrength | Average particle diameter (μm) | Amount mixed (wt %) | Apparatus | Number of turns (rpm) | Peripheral speed (m/s) | time (min) | |
| Ex. 15 | K-3 | 0.40 | 12 | 2.0 | 0.5 | N | 3500 | — | 60 | 7.9 |
| Ex. 16 | K-3 | 0.40 | 12 | 2.0 | 2.0 | N | 3500 | — | 60 | 7.2 |
| Ex. 17 | K-3 | 0.40 | 12 | 2.0 | 5.0 | N | 3500 | — | 60 | 7.0 |
| Ex. 18 | K-3 | 0.40 | 12 | 2.0 | 10.0 | N | 3500 | — | 60 | 6.9 |
| Ex. 19 | K-3 | 0.40 | 12 | 0.1 | 5.0 | N | 3500 | — | 60 | 6.8 |
| Ex. 20 | K-3 | 0.40 | 12 | 3.0 | 0.5 | N | 3500 | — | 60 | 7.8 |
| Ex. 21 | K-3 | 0.40 | 12 | 3.0 | 5.0 | N | 3500 | — | 60 | 6.9 |
| Ex. 22 | K-3 | 0.40 | 12 | 3.0 | 10.0 | N | 3500 | — | 60 | 6.8 |
| Ex. 23 | G-3 | 0.32 | 17 | 0.1 | 2.0 | N | 3500 | — | 40 | 30.0 |
| Ex. 24 | H-3 | 0.30 | 7 | 2.0 | 5.0 | N | 3500 | — | 60 | 8.5 |
| Ex. 25 | O-3 | 0.49 | 8 | 3.0 | 8.0 | N | 3500 | — | 160 | 4.0 |
| Ex. 26 | N-3 | 0.50 | 16 | 1.0 | 3.0 | N | 2000 | — | 10 | 8.9 |
| Ex. 27 | K-3 | 0.40 | 12 | 2.0 | 5.0 | N | 1500 | — | 180 | 8.3 |
| Ex. 28 | K-3 | 0.40 | 12 | 3.0 | 5.0 | N | 4000 | — | 60 | 7.7 |
| Ex. 29 | K-3 | 0.40 | 12 | 2.0 | 5.0 | C | — | 76 | 90 | 7.1 |
| Ex. 30 | H-3 | 0.30 | 7 | 2.0 | 5.0 | C | — | 76 | 60 | 7.3 |
| Ex. 31 | K-3 | 0.40 | 12 | 2.0 | 5.0 | M | 2650 | — | 60 | 7.2 |
| Com. Ex. 19 | A-3 | 0.23 | 25 | 2.0 | 5.0 | N | 3500 | — | 60 | 11.2 |
| Com. Ex. 20 | B-3 | 0.18 | 12 | 2.0 | 3.0 | N | 3500 | — | 90 | 12.6 |
| Com. Ex. 21 | C-3 | 0.15 | 4 | 2.0 | 5.0 | N | 3500 | — | 60 | 13.2 |
| Com. Ex. 22 | D-3 | 0.29 | 18 | 0.4 | 3.0 | N | 3500 | — | 60 | 9.1 |
| Com. Ex. 23 | E-3 | 0.27 | 13 | 2.0 | 5.0 | N | 3500 | — | 60 | 9.5 |
| Com. Ex. 24 | F-3 | 0.25 | 6 | 0.5 | 2.0 | N | 3500 | — | 60 | 10 |
| Com. Ex. 25 | I-3 | 0.43 | 23 | 3.0 | 5.0 | N | 3500 | — | 60 | 9.0 |
| Com. Ex. 26 | J-3 | 0.41 | 19 | 2.0 | 5.0 | N | 3500 | — | 60 | 7.1 |
| Com. Ex. 27 | L-3 | 0.39 | 6 | 2.0 | 3.0 | N | 3500 | — | 60 | 5.0 |
| Com. Ex. 28 | M-3 | 0.38 | 3 | 2.0 | 1.0 | N | 3500 | — | 120 | 7.0 |
| Com. Ex. 29 | P-3 | 0.53 | 18 | 2.0 | 1.0 | N | 3500 | — | 60 | 6.2 |
| Com. Ex. 30 | Q-3 | 0.52 | 13 | 2.0 | 6.0 | N | 3500 | — | 90 | 6.5 |
| Com. Ex. 31 | R-3 | 0.51 | 5 | 2.0 | 5.0 | N | 3500 | — | 120 | 6.4 |
| Com. Ex. 32 | S-3 | 0.73 | 21 | 2.0 | 7.0 | N | 3500 | — | 90 | 4.9 |
| Com. Ex. 33 | T-3 | 0.70 | 11 | 2.0 | 5.0 | N | 3500 | — | 90 | 5.3 |
| Com. Ex. 34 | U-3 | 0.66 | 4 | 2.0 | 5.0 | N | 3500 | — | 120 | 1.0 |
| Com. Ex. 35 | K-3 | 0.40 | 12 | 2.0 | 0.2 | N | 3500 | — | 60 | 8.3 |
| Com. Ex. 36 | K-3 | 0.40 | 12 | 2.0 | 0.4 | N | 3500 | — | 60 | 8.1 |
| Com. Ex. 37 | K-3 | 0.40 | 12 | 2.0 | 11.0 | N | 3500 | — | 60 | 6.4 |
| Com. Ex. 38 | K-3 | 0.40 | 12 | 2.0 | 14.0 | N | 3500 | — | 60 | 5.9 |
| Com. Ex. 39 | K-3 | 0.40 | 12 | 0.1 | 12.0 | N | 3500 | — | 60 | 6.3 |
| Com. Ex. 40 | K-3 | 0.40 | 12 | 0.1 | 0.2 | N | 3500 | — | 60 | 8.8 |
| Com. Ex. 41 | K-3 | 0.40 | 12 | 3.2 | 11.0 | N | 3500 | — | 60 | 4.5 |
| Com. Ex. 42 | K-3 | 0.40 | 12 | 3.2 | 5.0 | N | 3500 | — | 60 | 5.2 |
| Com. Ex. 43 | K-3 | 0.40 | 12 | 3.2 | 0.4 | N | 3500 | — | 60 | 6.7 |
| Com. Ex. 44 | K-3 | 0.40 | 12 | 5.0 | 0.3 | N | 3500 | — | 60 | 4.1 |
| Com. Ex. 45 | K-3 | 0.40 | 12 | 4.0 | 4.0 | N | 3500 | — | 60 | 4.6 |
| Com. Ex. 46 | K-3 | 0.40 | 12 | 6.0 | 12.0 | N | 3500 | — | 60 | 4.0 | width of 30 mm and a length of 50 mm. At this time, the amount of application per unit area was set to 10 mg/cm² in terms of the weight of lithium nickel oxide.

A positive electrode mixture is removed perpendicularly to the length direction of the sheet from a part of the sheet electrode, the exposed aluminum foil is unified with and connected to the collector 14 (the aluminum foil) of the applied portion and serves as a positive electrode lead plate.

A negative electrode 11 is a sheet electrode obtained by mixing the graphite materials obtained in Examples 15 to 31 and Comparative Examples 19 to 46 as a negative electrode material obtained in the examples and the comparative examples, polyvinylidene fluoride (KF#9310 made by Kureha Corporation) as a binder, and acetylene black (Denka Black made by Denki Kagaku Kogyo Kabushiki Kaisha) at a weight ratio of 91:2:8, adding N-methyl-2-pyrrolidinone thereto, kneading and forming the resultant in a paste shape, applying the paste to one surface of a copper foil with a thickness of 18 μm, and performing a drying process and a rolling process thereon, and cutting the resultant so that the size of the applied portion includes a width of 32 mm and a length of 52 mm. At this time, the amount of application per unit area was set to 6 mg/cm² in terms of the weight of the graphite material.

A negative electrode mixture is removed perpendicularly to the length direction of the sheet from a part of the sheet electrode, the exposed copper foil is unified with and connected to the collector 12 (the copper foil) of the applied portion and serves as a negative electrode lead plate.

A battery 10 is assembled in a state in which the positive electrode 13, the negative electrode 11, the separator 15, and other components are sufficiently dried and are introduced into a glove box filled with argon gas with a dew point of −100° C. The drying conditions of the positive electrode 13 and the negative electrode 11 include a depressurized state, 150° C., and 12 hours or more and the drying conditions of the separator 15 and other components include a depressurized state, 70° C., and 12 hours or more.

The dried positive electrode 13 and the dried negative electrode 11 were stacked and fixed with a polyimide tape in a state in which the applied portion of the positive electrode 13 and the applied portion of the negative electrode 11 face each other with a micro-porous film (#2400 made by Celgard LLC.), which is formed of polypropylene, interposed therebetween. Regarding the laminated positional relationship of the positive electrode 13 and the negative electrode 11, they were made to face each other so that the peripheral edge of the applied portion of the positive electrode projected onto the applied portion of the negative electrode 11 was surrounded with the inside of the peripheral edge of the applied portion of the negative electrode 11. The obtained single-layered electrode member is embedded in an aluminum laminate film, an electrolyte solution is injected thereto, and the laminate film was thermally fused in a state in which the positive and negative electrode lead plates protrude, whereby a closed single-layered laminate battery 10 was manufactured. The used electrolyte solution was obtained by dissolving lithium hexafluorophosphate (LiPF$_6$) in a solvent in which ethylene carbonate and ethylmethyl carbonate were mixed at a volume ratio of 3:7 so as to form a concentration of 1 mol/L.

(2) Method of Evaluating Battery

The obtained battery was set into a thermostatic chamber of 25° C. and the following charging and discharging test was performed.

First, a static current charging operation was performed with a current of 1.5 mA until the battery voltage reaches 4.2 V. After a 10 minute pause, a static current discharging operation was performed with the same current until the battery voltage reaches 3.0 V. This charging and discharging cycle was repeatedly performed 10 times. Since this charging and discharging cycle is a preliminary test for checking abnormality of the battery, this charging and discharging cycle was not included in the number of cycles of the charging and discharging test in the examples and the comparative examples. It was confirmed in the preliminary test that all the batteries manufactured in the examples and the comparative examples did not have any abnormality and then the main test was performed.

In the main test, the static current/static voltage charging operation with a charging current of 15 mA, a charging voltage of 4.2 V, and a charging time of 3 hour was performed and the static current discharging operation was performed with the same current (15 mA) until the battery voltage reaches 3.0 V after a 1 minute pause. The charging and discharging cycle under the same conditions was repeatedly performed five times and the discharging capacity of the fifth cycle was defined as an "initial discharging capacity". In the sixth cycle, the battery was set into a thermostatic chamber of 60° C. in a state in which the charging operation was performed under the same conditions and was left therein for 60 days. Thereafter, the thermostatic chamber was set to 25° C., the battery was left for 5 hours, and then was discharged. Then, the charging and discharging cycle under the same conditions as described above was repeatedly performed five times, and the discharging capacity of the fifth cycle was defined as a "60° C. 60-days discharging capacity".

The ratio (%) of the "60° C. discharging capacity" to the "initial discharging capacity" was calculated as an index indicating the storage characteristics and was defined as a "60° C. capacity retention rate (%)".

Review of Test Result

Table 4 shows the "initial discharging capacity" (mAh), the "60-days discharging capacity" (mAh), and the "60-days capacity retention rate" (%) when a negative electrode evaluating cell and a battery were manufactured using the graphite materials described in the examples and the comparative examples and the battery characteristics were evaluated.

TABLE 4

| | Battery characteristics | | |
|---|---|---|---|
| | Initial discharging capacity (mAh) | 60-days discharging capacity (mAh) | 60-days capacity retention rate (%) |
| Ex. 15 | 18.0 | 16.4 | 91.3 |
| Ex. 16 | 17.6 | 16.1 | 91.4 |
| Ex. 17 | 17.5 | 16.0 | 91.6 |
| Ex. 18 | 17.5 | 16.1 | 92.3 |
| Ex. 19 | 17.4 | 16.0 | 92.2 |
| Ex. 20 | 17.9 | 16.3 | 91.0 |
| Ex. 21 | 17.7 | 16.0 | 90.8 |
| Ex. 22 | 17.8 | 16.1 | 90.5 |
| Ex. 23 | 20.8 | 18.5 | 89.0 |
| Ex. 24 | 18.3 | 16.3 | 89.4 |
| Ex. 25 | 17.1 | 16.0 | 93.3 |
| Ex. 26 | 18.7 | 16.6 | 89.2 |
| Ex. 27 | 18.2 | 16.3 | 90.0 |
| Ex. 28 | 17.9 | 16.1 | 90.3 |
| Ex. 29 | 17.6 | 16.0 | 91.1 |
| Ex. 30 | 17.8 | 16.1 | 90.7 |
| Ex. 31 | 17.6 | 16.0 | 90.8 |
| Com. Ex. 19 | 19.9 | 14.8 | 74.3 |
| Com. Ex. 20 | 19.3 | 14.3 | 74.0 |
| Com. Ex. 21 | 19.6 | 14.6 | 74.5 |
| Com. Ex. 22 | 18.9 | 14.2 | 75.1 |
| Com. Ex. 23 | 18.8 | 14.2 | 75.5 |
| Com. Ex. 24 | 18.0 | 13.6 | 76.0 |

TABLE 4-continued

| | Battery characteristics | | |
|---|---|---|---|
| | Initial discharging capacity (mAh) | 60-days discharging capacity (mAh) | 60-days capacity retention rate (%) |
| Com. Ex. 25 | 18.6 | 14.9 | 80.2 |
| Com. Ex. 26 | 17.6 | 14.2 | 80.8 |
| Com. Ex. 27 | 14.5 | 11.6 | 79.9 |
| Com. Ex. 28 | 17.7 | 14.1 | 79.7 |
| Com. Ex. 29 | 17.1 | 14.0 | 81.9 |
| Com. Ex. 30 | 17.3 | 14.0 | 81.3 |
| Com. Ex. 31 | 17.2 | 13.9 | 80.8 |
| Com. Ex. 32 | 16.5 | 13.1 | 79.7 |
| Com. Ex. 33 | 17.3 | 13.8 | 80.1 |
| Com. Ex. 34 | 14.5 | 11.5 | 79.5 |
| Com. Ex. 35 | 18.2 | 12.4 | 68.5 |
| Com. Ex. 36 | 18.4 | 12.7 | 69.3 |
| Com. Ex. 37 | 17.2 | 12.0 | 70.0 |
| Com. Ex. 38 | 17.0 | 11.4 | 67.1 |
| Com. Ex. 39 | 17.2 | 12.7 | 74.2 |
| Com. Ex. 40 | 18.4 | 12.6 | 68.5 |
| Com. Ex. 41 | 16.1 | 11.7 | 73.0 |
| Com. Ex. 42 | 16.6 | 10.8 | 65.3 |
| Com. Ex. 43 | 17.4 | 12.5 | 72.3 |
| Com. Ex. 44 | 16.1 | 11.4 | 71.2 |
| Com. Ex. 45 | 16.2 | 11.0 | 67.9 |
| Com. Ex. 46 | 16.1 | 10.2 | 63.2 |

The graphite materials in Examples 15 to 31 were obtained by carbonizing and graphitizing the compound complexes, which were obtained by mixing the raw coke compositions (G-3, H-3, K-3, N-3, and O-3) satisfying the H/C range of 0.30 to 0.50 and the microstrength range of 7 wt % to 17 wt % and the calcined coke with an average particle diameter of 0.1 μm to 3.0 μm at a ratio of the calcined coke to the raw coke compositions of 0.5 wt % to 10 wt % and applying the compressive shearing stress thereto. In these graphite materials, the crystallite size Lc(112) thereof satisfied the range of 4 nm to 30 nm (Table 3). The 60-days capacity retention rates of the batteries using the graphite materials obtained by applying the compressive shearing stress to the graphite particles as a negative electrode material were 89% or more (Table 4), and it was thus seen that it was possible to realize a lithium ion secondary battery with very excellent service life characteristics.

The raw coke compositions used in Comparative Examples 19 to 34 are compositions not satisfying one or any of the H/C range of 0.3 to 0.5 and the microstrength range of 7 wt % to 17 wt %. When the graphite materials manufactured using the raw coke compositions were used as a negative electrode material, the 60-days capacity retention rate of the batteries were approximately in the range of 74% to 82% and were much lower than those of Examples 15 to 31 (Table 4).

From these results, the use of the raw coke composition having an atomic ratio H/C of hydrogen atoms H and carbon atoms C in a range of 0.30 to 0.50 and a microstrength of 7 to 17 wt % in the method of manufacturing a graphite material for a negative electrode of a lithium ion secondary battery, including at least: a step of applying a compressive shearing stress to a mixture of a raw coke composition, which is obtained by coking a heavy oil composition through the use of a delayed coking process, and a calcined coke with an average particle diameter of 0.1 μm to 3.0 μm in a range of 0.5 wt % to 10 wt % with respect to the raw coke composition to obtain a compound powder in which the calcined coke is embedded in particle surfaces of the raw coke composition; a step of heating the compound powder to obtain a carbonized composition; and a step of graphitizing the carbonized composition by heating to obtain a graphite material in which a crystallite size Lc(112) of a (112) diffraction line measured through the use of a wide-angle X-ray diffraction method is in a range of 4 nm to 30 nm can be said to be necessary and essential conditions for obtaining a graphite material for a negative electrode of a lithium ion secondary battery achieving high storage characteristics that the 60° C. 60-days capacity retention rate is 89% or more.

In Comparative Examples 35 and 36, the compound powders were obtained by mixing the powder of Raw coke composition K-3 and the calcined coke with an average particle diameter of 2.0 μm at 0.2 wt % (Comparative Example 35) and 0.4 wt % (Comparative Example 36) as a ratio of the calcined coke to the raw coke composition and applying the compressive shearing stress thereto. The Lc(112) of the graphite materials obtained by carbonizing and graphitizing the compound powders was in the range of 4 nm to 30 nm. In the lithium ion secondary batteries using the graphite materials as a negative electrode material, the 60-days capacity retention rate was less than 70% and was much lower than those of Examples 15 to 31 (Table 4).

The reason is that when the amount of the calcined coke mixed into the powder of the raw coke composition is less than 0.5 wt % with respect to the raw coke composition, the areas having a low crystallinity in the obtained graphite material were very small. Accordingly, in the lithium ion secondary batteries using the graphite materials, since the co-intercalation of the electrolyte solution into the graphite layers is not suppressed, the leak current of the negative electrode increases, and the difference from the leak current of the positive electrode increases, it is thought that the operational ranges of capacity of the positive and negative electrodes vary and thus the service life characteristics degrade.

In Comparative Examples 37 and 38, the compound powders were obtained by mixing the powder of Raw coke composition K-3 and the calcined coke with an average particle diameter of 2.0 μm at 11.0 wt % (Comparative Example 37) and 14.0 wt % (Comparative Example 38) as a ratio of the calcined coke to the raw coke composition and applying the compressive shearing stress thereto. The Lc(112) of the graphite materials obtained by carbonizing and graphitizing the compound powders was in the range of 4 nm to 30 nm. In the lithium ion secondary batteries using the graphite materials as a negative electrode material, the capacity retention rate was equal to or less than 70% and was much lower than those of Examples 15 to 31 (Table 4).

The reason is that when the amount of the calcined coke mixed into the powder of the raw coke composition is more than 10 wt % with respect to the raw coke composition, the compound powder obtained by applying the compressive shearing stress thereto was a compound powder with very large unevenness on the surface in which the calcined coke was attached to the particle surface of the raw coke composition and the specific surface area of the graphite material obtained by carbonizing and graphitizing the compound powder was very large. Accordingly, in the lithium ion secondary batteries using the graphite materials, since the decomposition of the electrolyte solution in the negative electrode increases, the leak current of the negative electrode increases, and the difference from the leak current of the positive electrode increases, it is thought that the operational ranges of capacity of the positive and negative electrodes vary and thus the service life characteristics degrade.

In Comparative Examples 39 and 40, the compound powders were obtained by mixing the powder of Raw coke composition K-3 and the calcined coke with an average particle diameter of 0.1 μm at 12.0 wt % (Comparative Example 39) and 0.2 wt % (Comparative Example 40) as a ratio of the calcined coke to the raw coke composition and applying the compressive shearing stress thereto. In the compound powders, the amount of the calcined coked mixed into the powder of the raw coke composition did not satisfy the range of 0.5 wt % to 10 wt % with respect to the raw coke composition. Accordingly, in the lithium ion secondary batteries using the graphite materials, which were obtained by carbonizing and graphitizing the compound powders, as a negative electrode material, the capacity retention rate was much lower than those of Examples 15 to 31 (Table 4).

On the other hand, in the lithium ion secondary batteries using the graphite materials obtained by carbonizing and graphitizing the compound powders, which were obtained by mixing the same powder of Raw coke composition K-3 as in Comparative Examples 39 and 40 and the calcined coke with an average particle diameter of 0.1 μm at 5.0 wt % (Example 19) as a ratio of the calcined coke to the raw coke composition and applying the compressive shearing stress thereto, the capacity retention rate had a high value of 92% or more.

From these results, the carbonization and graphitization of the compound powder obtained by mixing the calcined coke with an average particle diameter of 0.1 μm into the powder of the raw coke composition by 0.5 wt % to 10 wt % and applying the compressive shearing stress thereto in the manufacturing method according to the invention can be said to be necessary and essential conditions for achieving excellent service life characteristics with a capacity retention rate of 89% or more.

In Comparative Examples 41 to 46, the compound powders were obtained by mixing the powder of Raw coke composition K-3 and the calcined coke with an average particle diameter of more than 3.0 μm and applying the compressive shearing stress thereto. The Lc(112) of the graphite materials obtained by carbonizing and graphitizing the compound powders was in the range of 4 nm to 30 nm. In the lithium ion secondary batteries using the graphite materials as a negative electrode material, the 60-days capacity retention rate was much lower than those of Examples 15 to 31 (Table 4).

The reason is thought to be as follows. That is, when the average particle diameter of the calcined coke is more than 3.0 μm, the calcined coke is not embedded in the particle surface of the raw coke composition. Accordingly, the compound powder with very large unevenness on the surface in which the calcined coke was attached to the particle surface of the raw coke composition is obtained and thus the specific surface area of the graphite material obtained by carbonizing and graphitizing the compound powder is very large. Accordingly, in the lithium ion secondary batteries using the graphite materials, since the decomposition of the electrolyte solution in the negative electrode increases, the leak current of the negative electrode increases, and the difference from the leak current of the positive electrode increases, it is thought that the operational ranges of capacity of the positive and negative electrodes vary and thus the service life characteristics degrade.

On the other hand, in the lithium ion secondary batteries using the graphite materials obtained by carbonizing and graphitizing the compound powders, which were obtained by mixing the same powder of Raw coke composition K-3 as in Comparative Examples 41 to 46 and the calcined coke with an average particle diameter of 2.0 μm at 0.5 wt % to 10.0 wt % (Examples 15 to 18) as a ratio of the calcined coke to the raw coke composition and applying the compressive shearing stress thereto, the capacity retention rate had a high value of 91% or more (Table 4).

From these results, the carbonization and graphitization of the compound powder obtained by mixing the calcined coke with an average particle diameter of 0.1 μm to 3.0 μm into the powder of the raw coke composition by 0.5 wt % to 10 wt % as a ratio of the calcined coke to the raw coke composition and applying the compressive shearing stress thereto in the manufacturing method according to the invention can be said to be necessary and essential conditions for achieving excellent service life characteristics with a capacity retention rate of 89% or more.

As described above, the lithium ion secondary batteries using the graphite materials manufactured through the use of the manufacturing method according to the invention as a negative electrode material could achieve excellent storage characteristics.

The eighth embodiment to the ninth embodiment of the invention will be described below in more detail with reference to examples and comparative examples, but the invention is not limited to the examples at all.

1. Raw Coke Composition and Manufacturing Method Thereof (1) Raw Coke Composition A-4

A hydrodesulfurized oil was obtained by hydrodesulfurizing an atmospheric distillation residual oil with a sulfur content of 3.1 wt % in the presence of a catalyst so that the hydrocracking ratio is equal to or less than 25%. The hydrodesulfurizing conditions were set to a total pressure of 180 MPa, a hydrogen partial pressure of 160 MPa, and a temperature of 380° C. A fluid catalytic cracking decant oil was obtained by fluid-catalytically cracking a desulfurized vacuum gas oil (with a sulfur content of 500 wt·ppm and a density of 0.88 g/cm$^3$ at 15° C.). The desulfurized vacuum gas oil was divided into an aromatic content and a saturated content through the use of selective extraction using dimethylformamide and the aromatic content was extracted therefrom. A desulfurized deasphalted oil of 19 wt % (with respect to 100 wt % of the overall mixture including the desulfurized deasphalted oil) was added to a mixture of the extracted aromatic content and the hydrodesulfurized oil at a weight ratio of 8:1, whereby a heavy oil composition of a coke was obtained. This heavy oil composition was input to a delayed coker and was subjected to a coking process at 550° C. in the atmosphere of inert gas, whereby Raw coke composition A-4 was obtained.

(2) Raw Coke Composition B-4

A desulfurized deasphalted oil of 11 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-4, at a weight ratio of 8:1, whereby a heavy oil composition of a coke was obtained. This heavy oil composition was input to a delayed coker and was subjected to a coking process at 550° C. in the atmosphere of inert gas, whereby Raw coke composition B-4 was obtained.

(3) Raw Coke Composition C-4

A desulfurized deasphalted oil of 4 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-4, at a weight ratio of 8:1, whereby a heavy oil composition of a coke was obtained. This heavy oil composition was input to a delayed coker and was subjected to a coking process at 550° C. in the atmosphere of inert gas, whereby Raw coke composition C-4 was obtained.

(4) Raw Coke Composition D-4

A desulfurized deasphalted oil of 17 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-4, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition D-4 was obtained.

(5) Raw Coke Composition E-4

A desulfurized deasphalted oil of 11 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-4, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition E-4 was obtained.

(6) Raw Coke Composition F-4

A desulfurized deasphalted oil of 6 wt % (with respect to 100 wt % of the total mixture including the desulfurized deasphalted oil) was added to the mixture of the extracted aromatic content of the fluid catalytic cracking decant oil and the hydrodesulfurized oil, which were obtained in the same way as manufacturing Raw coke composition A-4, at a weight ratio of 6:1, whereby a heavy oil composition of a coke was obtained. This heavy oil composition was input to a delayed coker and was subjected to a coking process at 550° C. in the atmosphere of inert gas, whereby Raw coke composition F-4 was obtained.

(7) Raw coke composition G-4

A desulfurized deasphalted oil of 15 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:5, whereby a heavy oil composition of a coke was obtained. This heavy oil composition was input to a delayed coker and was subjected to a coking process at 550° C. in the atmosphere of inert gas, whereby Raw coke composition G-4 was obtained.

(8) Raw Coke Composition H-4

A desulfurized deasphalted oil of 7 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:5, whereby a heavy oil composition of a coke was obtained. This heavy oil composition was input to a delayed coker and was subjected to a coking process at 550° C. in the atmosphere of inert gas, whereby Raw coke composition H-4 was obtained.

(9) Raw Coke Composition I-4

A desulfurized deasphalted oil of 19 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition I-4 was obtained.

(10) Raw Coke Composition J-4

A desulfurized deasphalted oil of 16 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition J-4 was obtained.

(11) Raw Coke Composition K-4

A desulfurized deasphalted oil of 11 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition K-4 was obtained.

(12) Raw Coke Composition L-4

A desulfurized deasphalted oil of 5 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition L-4 was obtained.

(13) Raw Coke Composition M-4

A desulfurized deasphalted oil of 3 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:4, whereby a heavy oil composition of a coke was obtained. This heavy oil composition was input to a delayed coker and was subjected to a coking process at 550° C. in the atmosphere of inert gas, whereby Raw coke composition M-4 was obtained.

(14) Raw Coke Composition N-4

A desulfurized deasphalted oil of 14 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:3, whereby a heavy oil composition of a coke was obtained. This heavy oil composition was input to a delayed coker and was subjected to a coking process at 550° C. in the atmosphere of inert gas, whereby Raw coke composition N-4 was obtained.

(15) Raw Coke Composition O-4

A desulfurized deasphalted oil of 7 wt % (with respect to 100 wt % of the total mixture including the desulfurized deasphalted oil) was added to the mixture of the hydrodesulfurized oil and the fluid catalytic cracking decant oil, which were obtained in the same way as manufacturing Raw coke composition A-4, at a weight ratio of 1:3, whereby a heavy oil composition of a coke was obtained. This heavy oil composition was input to a delayed coker and was subjected to a coking process at 550° C. in the atmosphere of inert gas, whereby Raw coke composition O-4 was obtained.

(16) Raw Coke Composition P-4

After adding n-heptane of the same volume to the fluid catalytic cracking decant oil which was obtained in the same as obtaining Raw coke composition A-4 and mixing the resultant, the mixture was divided into an aromatic content and a saturated content through the use of selective extraction using dimethylformamide. A desulfurized deasphalted oil of 16 wt % (with respect to 100 wt % of the total mixture including the desulfurized deasphalted oil) was added to a mixture of the fluid catalytic cracking decant oil and the extracted saturated content at a weight ratio of 1:1, whereby a heavy oil composition of a coke was obtained. This heavy oil composition was input to a delayed coker and was subjected to a coking process at 550° C. in the atmosphere of inert gas, whereby Raw coke composition P-4 was obtained.

(17) Raw Coke Composition Q-4

A desulfurized deasphalted oil of 11 wt % (with respect to 100 wt % of the total mixture including the desulfurized deasphalted oil) was added to the mixture of the fluid catalytic cracking decant oil obtained in the same way as manufacturing Raw coke composition A-4, the fluid catalytic cracking decant oil obtained in the same way as manufacturing Raw coke composition P-4, and the extracted saturated content of n-heptane at a weight ratio of 1:1, whereby a heavy oil composition of a coke was obtained. This heavy oil composition was input to a delayed coker and was subjected to a coking process at 550° C. in the atmosphere of inert gas, whereby Raw coke composition Q-4 was obtained.

(18) Raw Coke Composition R-4

A desulfurized deasphalted oil of 6 wt % (with respect to 100 wt % of the total mixture including the desulfurized deasphalted oil) was added to the mixture of the fluid catalytic cracking decant oil obtained in the same way as manufacturing Raw coke composition A-4, the fluid catalytic cracking decant oil obtained in the same way as manufacturing Raw coke composition P-4, and the extracted saturated content of n-heptane at a weight ratio of 1:1, whereby a heavy oil composition of a coke was obtained. This heavy oil composition was input to a delayed coker and was subjected to a coking process at 550° C. in the atmosphere of inert gas, whereby Raw coke composition R-4 was obtained.

(19) Raw Coke Composition S-4

A desulfurized deasphalted oil of 19 wt % (with respect to 100 wt % of the total mixture including the desulfurized deasphalted oil) was added to the mixture of the fluid catalytic cracking decant oil obtained in the same way as manufacturing Raw coke composition A-4, the fluid catalytic cracking decant oil obtained in the same way as manufacturing Raw coke composition P-4, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition S-4 was obtained.

(20) Raw Coke Composition T-4

A desulfurized deasphalted oil of 10 wt % (with respect to 100 wt % of the total mixture including the desulfurized deasphalted oil) was added to the mixture of the fluid catalytic cracking decant oil obtained in the same way as manufacturing Raw coke composition A-4, the fluid catalytic cracking decant oil obtained in the same way as manufacturing Raw coke composition P-4, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition T-4 was obtained.

(21) Raw Coke Composition U-4

A desulfurized deasphalted oil of 4 wt % (with respect to 100 wt % of the total mixture including the desulfurized deasphalted oil) was added to the mixture of the fluid catalytic cracking decant oil obtained in the same way as manufacturing Raw coke composition A-4, the fluid catalytic cracking decant oil obtained in the same way as manufacturing Raw coke composition P-4, and the extracted saturated content of n-heptane at a weight ratio of 1:2, whereby a heavy oil composition of a coke was obtained. This heavy oil composition was input to a delayed coker and was subjected to a coking process at 550° C. in the atmosphere of inert gas, whereby Raw coke composition U-4 was obtained.

2. Analysis of Raw Coke Composition (1) Method of Measuring Atomic Ratio H/C of Raw Coke Composition The total hydrogen content of the raw coke composition was measured from the moisture content, which was generated from a combustion gas obtained by completely combusting a sample in an oxygen flow at 750° C., using a coulometric titration method (Karl-Fisher method). The sample of the raw coke composition was combusted in an oxygen flow of 1150° C., was converted into carbon dioxide (partially carbon monoxide), and was carried by the surplus oxygen flow, and then the total carbon content was calculated by a $CO_2+CO$ infrared detector. The H/C of the raw coke composition was calculated as a ratio of a value obtained by dividing the total hydrogen content (TH (wt %)) by the atomic weight of hydrogen to a value obtained by dividing the total carbon content (TC (wt %)) by the atomic weight of carbon. The values of H/C of Raw coke compositions A-4 to U-4 are shown in Table 5.

(2) Method of Measuring Microstrength of Raw Coke Composition

A microstrength was calculated as a value representing the weight of the sample on a sieve by percentage after inputting 2 g of the sample of 20 to 30 mesh and 12 steel balls with a diameter of 5/16 inch (7.9 mm) to a steel cylinder (with an inner diameter of 25.4 mm and a length of 304.8 mm), rotating a vertical plane in a direction perpendicular to the tube at 25 rpm by 800 turns (that is, rotating the cylinder in a state in which the rotation axis is set horizontally so as to trade places vertically as if rotating a propeller), and then sieving the resultant with a 48 mesh. The microstrengths of Raw coke compositions A-4 to U-4 are shown in Table 5.

By pulverizing Raw coke compositions A-4 to U-4 by the use of a mechanical pulverizer (for example, a super rotor mill made by Nisshin Engineering Inc.) and classifying the resultant by the use of a precision air classifier (for example, a turbo classifier made by Nisshin Engineering Inc.), a powder of the raw coke composition with an average particle diameter of 15 µm was obtained. Here, the average particle diameter of the powder of the raw coke composition was measured using a laser diffraction/scattering particle size analyzer LA950 made by Horiba Ltd.

3. Method of Manufacturing Graphite Material According to Example 32

The powder of Raw coke composition K-4 and the obtained acetylene black (Denka Black made by Denki Kagaku Kogyo Kabushiki Kaisha) were mixed in advance at a ratio 0.5 wt % of the acetylene black to Raw coke composition K-4. Then, the mixture was input to a "NOBILTA 130" made by Hosokawa Micron Corporation to satisfy a filled volume of 500 cc, and the apparatus was operated under the conditions of the number of rotation of a blade of 3500 rpm, a processing temperature of about 130° C., and a processing time of 60 minutes, whereby a compound powder was obtained by applying the compressive shearing stress thereto.

The compound powder was carbonized in the nitrogen gas flow under the conditions of a highest temperature of 1200° C. and a highest temperature retention time of 5 hours by the use of a roller hearth kiln made by Takasago Industry Co., Ltd. The obtained carbon material was input to a crucible, the crucible was installed in an electric furnace, and the resultant was graphitized in the nitrogen gas flow of 80 L/min at the highest temperature of 2800° C. At this time, the temperature rising rate was set to 200° C./h, the highest temperature retention time was set to 3 hours, the temperature falling rate was set to 100° C./h to 1000° C., and the resultant was cooled to room temperature in a state in which the nitrogen gas flow was maintained, whereby a graphite material was obtained. In the obtained graphite material, the crystallite size Lc(112) of the (112) diffraction line measured through the use of the wide-angle X-ray diffraction method was 7.2 nm.

Method of Manufacturing Graphite Materials According to Examples 33 to 44 and Comparative Examples 47 to 70

In Examples 33 to 44 and Comparative Examples 47 to 70, the powders of Raw coke compositions A-4 to U-4 and the acetylene black (Denka Black made by Denki Kagaku Kogyo Kabushiki Kaisha) were mixed, the compressive shearing stress was applied thereto to obtain compound powders, and the obtained compound powders were carbonized and graphitized under the same conditions as in Example 32, whereby graphite materials were obtained. The amount of the acetylene black and the compressive shearing stress applying conditions were the same as shown in Table 5. Here, as the apparatus applying the compressive shearing stress, the "NOBILTA 130" made by Hosokawa Micron Corporation was used in Examples 33 to 41 and Comparative Examples 47 to 70, the "COMPOSI CP-15" made by Nippon Coke & Engineering Co., Ltd. was used in Examples 42 and 43, and the "Mechano-fusion AMS-Lab" made by Hosokawa Micron Corporation was used in Example 44. In Table 5, the "NOBILTA 130" was abbreviated as "N", the "COMPOSI CP-15" was abbreviated as "C", and the "Mechano-fusion AMS-Lab" was abbreviated as "M". The apparatuses other than the apparatus applying the compressive shearing stress were the same as used in Example 32.

4. Calculation of Crystallite Size Lc(112) of Graphite Powder

A Si standard sample of 10 wt % as an internal standard was mixed into the obtained graphite material, was filled in a glass rotating sample holder (25 mm diameter×0.2 mmt), was subjected to measurement using a wide-angle X-ray diffraction method on the basis of a method (Carbon 2006, No. 221, P52-60) defined Committee 117 of Japan Society for the Promotion of Science, and the crystallite size Lc(112) of the graphite powder was calculated. ULTIMA IV made by Rigaku Corporation was used as an X-ray diffractometer, a CuKα ray (using Kβ filter-Ni) was used as an X-ray source, the application voltage and the application current to an X-ray bulb were set to 40 kV and 40 mA.

The obtained diffraction pattern was analyzed by the use of the method (Carbon 2006, No. 221, P52-60) defined by Committee 117 of Japan Society for the Promotion of Science. Specifically, the measured data was subjected to a smoothing process, a background removing process, an absorption correcting process, a polarization correcting process, and a Lorentz correcting process, the (112) diffraction line of the graphite powder was corrected using the peak position and the value width of a (422) diffraction line of the Si standard sample, and the crystallite size was calculated. The crystallite size was calculated from the half-value width of the corrected peak using the following Scherrer's formula. The measurement and analysis were carried out three times and the average value thereof was set as the Lc(112). The measurement results of Lc(112) of the graphite materials are shown in Table 5.

Numerical Expression 12

$$L = K \times \lambda / (\beta 0 \times \cos \theta B) \qquad \text{Scherrer's formula}$$

Here, L: crystallite size (nm)
K: shape factor constant (=1.0)
λ: wavelength of X-ray (=0.15406 nm)
θB: Bragg angle
β0: half-value width (corrected value)

TABLE 5

| | Raw coke composition | H/C | Microstrength | Amount of acetylene black mixed (wt %) | Conditions for applying compressive shearing stress | | | | Property of graphite material Lc(112) (nm) |
| --- | --- | --- | --- | --- | --- | --- | --- | --- | --- |
| | | | | | Apparatus | Number of turns (rpm) | Peripheral speed (m/s) | Time (min) | |
| Ex. 32 | K-4 | 0.40 | 12 | 0.5 | N | 3500 | — | 60 | 7.2 |
| Ex. 33 | K-4 | 0.40 | 12 | 2.0 | N | 3500 | — | 60 | 7.1 |
| Ex. 34 | K-4 | 0.40 | 12 | 5.0 | N | 3500 | — | 60 | 6.9 |
| Ex. 35 | K-4 | 0.40 | 12 | 10.0 | N | 3500 | — | 60 | 6.8 |
| Ex. 36 | G-4 | 0.32 | 17 | 5.0 | N | 3500 | — | 40 | 30.0 |
| Ex. 37 | H-4 | 0.30 | 7 | 6.0 | N | 3500 | — | 60 | 7.3 |
| Ex. 38 | O-4 | 0.49 | 8 | 8.0 | N | 3500 | — | 120 | 4.0 |
| Ex. 39 | N-4 | 0.50 | 16 | 3.0 | N | 2000 | — | 10 | 9.6 |
| Ex. 40 | K-4 | 0.40 | 12 | 7.0 | N | 3500 | — | 90 | 6.8 |
| Ex. 41 | K-4 | 0.40 | 12 | 0.5 | N | 4000 | — | 60 | 7.1 |
| Ex. 42 | K-4 | 0.40 | 12 | 5.0 | C | — | 76 | 90 | 6.3 |
| Ex. 43 | H-4 | 0.30 | 7 | 6.0 | C | — | 76 | 60 | 6.2 |
| Ex. 44 | K-4 | 0.40 | 12 | 7.0 | M | 2650 | — | 60 | 6.8 |
| Com. Ex. 47 | A-4 | 0.23 | 25 | 5.0 | N | 3500 | — | 60 | 10.9 |
| Com. Ex. 48 | B-4 | 0.18 | 12 | 6.0 | N | 3500 | — | 90 | 11.8 |
| Com. Ex. 49 | C-4 | 0.15 | 4 | 5.0 | N | 3500 | — | 60 | 12.5 |
| Com. Ex. 50 | D-4 | 0.29 | 18 | 8.0 | N | 3500 | — | 60 | 9.3 |
| Com. Ex. 51 | E-4 | 0.27 | 13 | 5.0 | N | 3500 | — | 60 | 9.9 |
| Com. Ex. 52 | F-4 | 0.25 | 6 | 9.0 | N | 3500 | — | 60 | 10 |
| Com. Ex. 53 | I-4 | 0.43 | 23 | 5.0 | N | 3500 | — | 60 | 6.2 |
| Com. Ex. 54 | J-4 | 0.41 | 19 | 5.0 | N | 3500 | — | 60 | 7.1 |

TABLE 5-continued

| | Raw coke composition | H/C | Microstrength | Amount of acetylene black mixed (wt %) | Conditions for applying compressive shearing stress | | | | Property of graphite material Lc(112) (nm) |
| --- | --- | --- | --- | --- | --- | --- | --- | --- | --- |
| | | | | | Apparatus | Number of turns (rpm) | Peripheral speed (m/s) | Time (min) | |
| Com. Ex. 55 | L-4 | 0.39 | 6 | 7.0 | N | 3500 | — | 60 | 6.8 |
| Com. Ex. 56 | M-4 | 0.38 | 3 | 5.0 | N | 3500 | — | 120 | 6.4 |
| Com. Ex. 57 | P-4 | 0.53 | 18 | 5.0 | N | 3500 | — | 60 | 6.0 |
| Com. Ex. 58 | Q-4 | 0.52 | 13 | 6.0 | N | 3500 | — | 90 | 6.2 |
| Com. Ex. 59 | R-4 | 0.51 | 5 | 5.0 | N | 3500 | — | 120 | 6.1 |
| Com. Ex. 60 | S-4 | 0.73 | 21 | 5.0 | N | 3500 | — | 90 | 5.3 |
| Com. Ex. 61 | T-4 | 0.70 | 11 | 5.0 | N | 3500 | — | 90 | 7.0 |
| Com. Ex. 62 | U-4 | 0.66 | 4 | 5.0 | N | 3500 | — | 120 | 4.0 |
| Com. Ex. 63 | K-4 | 0.40 | 12 | 0.2 | N | 3500 | — | 60 | 7.5 |
| Com. Ex. 64 | K-4 | 0.40 | 12 | 0.4 | N | 3500 | — | 60 | 7.3 |
| Com. Ex. 65 | K-4 | 0.40 | 12 | 10.2 | N | 3500 | — | 60 | 6.7 |
| Com. Ex. 66 | K-4 | 0.40 | 12 | 13.0 | N | 3500 | — | 60 | 6.6 |
| Com. Ex. 67 | H-4 | 0.30 | 7 | 0.1 | N | 3500 | — | 60 | 7.6 |
| Com. Ex. 68 | H-4 | 0.30 | 7 | 0.3 | N | 3500 | — | 60 | 7.5 |
| Com. Ex. 69 | H-4 | 0.30 | 7 | 10.5 | N | 3500 | — | 60 | 6.8 |
| Com. Ex. 70 | H-4 | 0.30 | 7 | 20.0 | N | 3500 | — | 60 | 5.9 |

5. Manufacturing of Battery and Evaluation of Characteristics (1) Method of Manufacturing Battery FIG. 1 is a cross-sectional view illustrating a manufactured battery 10. In FIG. 1, a negative electrode 11, a negative electrode collector 12, a positive electrode 13, a positive electrode collector 14, a separator 15, and an aluminum laminate package 16.

A positive electrode 13 is a sheet electrode obtained by mixing lithium nickel oxide ($LiNi_{0.8}CO_{0.15}Al_{0.05}O_2$ made by Toda Kogyo Corp.) with an average particle diameter of 6 μm as a positive electrode material, polyvinylidene fluoride (KF#1320 made by Kureha Corporation) as a binder, and acetylene black (Denka Black made by Denki Kagaku Kogyo Kabushiki Kaisha) at a weight ratio of 89:6:5, adding N-methyl-2-pyrrolidinone thereto, kneading and forming the resultant in a paste shape, applying the paste to one surface of an aluminum foil with a thickness of 30 μm, and performing a drying process and a rolling process thereon, and cutting the resultant so that the size of the applied portion includes a width of 30 mm and a length of 50 mm. At this time, the amount of application per unit area was set to 10 mg/cm² in terms of the weight of lithium nickel oxide.

A positive electrode mixture is removed perpendicularly to the length direction of the sheet from a part of the sheet electrode, the exposed aluminum foil is unified with and connected to the collector 14 (the aluminum foil) of the applied portion and serves as a positive electrode lead plate.

A negative electrode 11 is a sheet electrode obtained by mixing the graphite materials obtained in Examples 32 to 44 and Comparative Examples 47 to 70 as a negative electrode material obtained in the examples and the comparative examples, polyvinylidene fluoride (KF#9310 made by Kureha Corporation) as a binder, and acetylene black (Denka Black made by Denki Kagaku Kogyo Kabushiki Kaisha) at a weight ratio of 91:2:8, adding N-methyl-2-pyrrolidinone thereto, kneading and forming the resultant in a paste shape, applying the paste to one surface of a copper foil with a thickness of 18 μm, and performing a drying process and a rolling process thereon, and cutting the resultant so that the size of the applied portion includes a width of 32 mm and a length of 52 mm. At this time, the amount of application per unit area was set to 6 mg/cm² in terms of the weight of the graphite material.

A negative electrode mixture is removed perpendicularly to the length direction of the sheet from a part of the sheet electrode, the exposed copper foil is unified with and connected to the collector 12 (the copper foil) of the applied portion and serves as a negative electrode lead plate.

A battery 10 is assembled in a state in which the positive electrode 13, the negative electrode 11, the separator 15, and other components are sufficiently dried and are introduced into a glove box filled with argon gas with a dew point of −100° C. The drying conditions of the positive electrode 13 and the negative electrode 11 include a depressurized state, 150° C., and 12 hours or more and the drying conditions of the separator 15 and other components include a depressurized state, 70° C., and 12 hours or more.

The dried positive electrode 13 and the dried negative electrode 11 were stacked and fixed with a polyimide tape in a state in which the applied portion of the positive electrode 13 and the applied portion of the negative electrode 11 face each other with a micro-porous film (#2400 made by Celgard LLC.), which is formed of polypropylene, interposed therebetween. Regarding the laminated positional relationship of the positive electrode 13 and the negative electrode 11, they were made to face each other so that the peripheral edge of the applied portion of the positive electrode projected onto the applied portion of the negative electrode 11 was surrounded with the inside of the peripheral edge of the applied portion of the negative electrode 11. The obtained single-layered electrode member is embedded in an aluminum laminate film, an electrolyte solution is injected thereto, and the laminate film was thermally fused in a state in which the positive and negative electrode lead plates protrude, whereby a closed single-layered laminate battery 10 was manufactured. The used electrolyte solution was obtained by dissolving lithium hexafluorophosphate ($LiPF_6$) in a solvent in which ethylene carbonate and ethylmethyl carbonate were mixed at a volume ratio of 3:7 so as to form a concentration of 1 mol/L.

(2) Method of Evaluating Battery

The obtained battery was set into a thermostatic chamber of 25° C. and the following charging and discharging test was performed.

First, a static current charging operation was performed with a current of 1.5 mA until the battery voltage reaches 4.2 V. After a 10 minute pause, a static current discharging operation was performed with the same current until the battery voltage reached 3.0 V. This charging and discharging cycle was repeatedly performed 10 times. Since this charging and discharging cycle is a preliminary test for checking abnormality of the battery, this charging and discharging cycle was not included in the number of cycles of the charging and discharging test in the examples and the comparative examples. It was confirmed in the preliminary test that all the batteries manufactured in the examples and the comparative examples had not abnormality and then the main test was performed.

In the main test, the battery having been subjected to the preliminary test was installed in the thermostatic chamber of 60° C. and was left for 5 hours, and then the charging and discharging test was started. The charging capacity of the first cycle from the start was defined as the "initial discharging capacity". A charging and discharging cycle in which a static current charging operation was performed with a current of 75 mA until the battery voltage reached 4.2 V and a static current discharging operation was performed with the same current until the battery voltage reaches 3.0 V after a 1-minute pause was set. This cycle was repeated 2000 times. The ratio (%) of the "2000-cycle discharging capacity" to the "initial discharging capacity" was calculated as the capacity retention rate of the charging and discharging cycle and was defined as a "2000-cycle capacity retention rate" (%).

Review of Test Result

Table 6 shows the "initial discharging capacity" (mAh), the "2000-cycle discharging capacity" (mAh), and the "2000-cycle capacity retention rate" (%) when a negative electrode evaluating cell and a battery were manufactured using the graphite materials described in the examples and the comparative examples and the battery characteristics were evaluated.

TABLE 6

| | Battery characteristics | | |
|---|---|---|---|
| | Initial discharging capacity (mAh) | 2000-cycle discharging capacity (mAh) | 2000-cycle capacity retention rate (%) |
| Ex. 32 | 17.6 | 15.9 | 90.1 |
| Ex. 33 | 17.1 | 15.6 | 91.4 |
| Ex. 34 | 17.5 | 15.9 | 91.4 |
| Ex. 35 | 17.4 | 16.0 | 91.9 |
| Ex. 36 | 21.0 | 18.7 | 89.0 |
| Ex. 37 | 17.2 | 15.3 | 89.3 |
| Ex. 38 | 16.3 | 15.0 | 92.3 |
| Ex. 39 | 18.8 | 17.0 | 90.2 |
| Ex. 40 | 17.4 | 15.8 | 90.9 |
| Ex. 41 | 17.6 | 15.6 | 89.0 |
| Ex. 42 | 17.2 | 15.7 | 91.7 |
| Ex. 43 | 16.9 | 15.4 | 91.4 |
| Ex. 44 | 17.4 | 15.6 | 89.5 |
| Com. Ex. 47 | 19.5 | 14.6 | 75.2 |
| Com. Ex. 48 | 19.9 | 14.9 | 75.0 |
| Com. Ex. 49 | 20.3 | 15.4 | 75.9 |
| Com. Ex. 50 | 18.5 | 14.1 | 76.6 |
| Com. Ex. 51 | 19.0 | 14.5 | 76.6 |
| Com. Ex. 52 | 19.0 | 14.7 | 77.3 |
| Com. Ex. 53 | 17.2 | 14.0 | 81.5 |
| Com. Ex. 54 | 17.6 | 14.4 | 81.8 |
| Com. Ex. 55 | 17.4 | 14.2 | 81.5 |
| Com. Ex. 56 | 17.2 | 14.0 | 81.3 |
| Com. Ex. 57 | 17.3 | 14.2 | 82.1 |
| Com. Ex. 58 | 17.8 | 14.1 | 79.2 |
| Com. Ex. 59 | 17.7 | 14.4 | 81.5 |
| Com. Ex. 60 | 18.0 | 14.1 | 78.2 |
| Com. Ex. 61 | 17.3 | 14.2 | 82.2 |
| Com. Ex. 62 | 17.2 | 14.1 | 82.0 |
| Com. Ex. 63 | 17.8 | 12.1 | 68.3 |

TABLE 6-continued

| | Battery characteristics | | |
|---|---|---|---|
| | Initial discharging capacity (mAh) | 2000-cycle discharging capacity (mAh) | 2000-cycle capacity retention rate (%) |
| Com. Ex. 64 | 17.7 | 12.2 | 69.1 |
| Com. Ex. 65 | 17.4 | 12.2 | 70.2 |
| Com. Ex. 66 | 17.1 | 11.5 | 67.1 |
| Com. Ex. 67 | 17.8 | 12.7 | 71.3 |
| Com. Ex. 68 | 17.8 | 13.5 | 76.1 |
| Com. Ex. 69 | 17.4 | 12.2 | 70.2 |
| Com. Ex. 70 | 16.8 | 10.4 | 61.8 |

The graphite materials in Examples 32 to 44 were obtained by carbonizing and graphitizing the compound complexes, which were obtained by mixing the raw coke compositions (G-4, H-4, K-4, N-4, and O-4) satisfying the H/C range of 0.30 to 0.50 and the microstrength range of 7 wt % to 17 wt % and the acetylene black of 0.5 wt % to 10 wt % with respect to the raw coke composition and applying the compressive shearing stress thereto. In these graphite materials, the crystallite size Lc(112) thereof satisfied the range of 4 nm to 30 nm (Table 5). The 2000-cycle capacity retention rates of the batteries using the graphite materials obtained by applying the compressive shearing stress to the graphite particles as a negative electrode material were 89% or more (Table 6), and it was thus seen that it was possible to realize a lithium ion secondary battery with very excellent service life characteristics.

The raw coke compositions used in Comparative Examples 47 to 62 are compositions not satisfying one or any of the H/C range of 0.3 to 0.5 and the microstrength range of 7 wt % to 17 wt %. When the graphite materials manufactured using the raw coke compositions were used as a negative electrode material, the 2000-cycle capacity retention rate of the batteries were approximately in the range of 75% to 82% and were much lower than those of Examples 32 to 44 (Table 6).

From these results, the use of the raw coke composition having an atomic ratio H/C of hydrogen atoms H and carbon atoms C in a range of 0.30 to 0.50 and a microstrength of 7 wt % to 17 wt % in the method of manufacturing a graphite material for a negative electrode of a lithium ion secondary battery, including at least: a step of applying a compressive shearing stress to a mixture of a raw coke composition, which is obtained by coking a heavy oil composition through the use of a delayed coking process, and the acetylene black in a range of 0.5 wt % to 10 wt % with respect to the raw coke composition to obtain a compound powder in which the acetylene black is embedded in particle surfaces of the raw coke composition; a step of heating the compound powder to obtain a carbonized composition; and a step of graphitizing the carbonized composition by heating to obtain a graphite material in which a crystallite size Lc(112) of a (112) diffraction line measured through the use of a wide-angle X-ray diffraction method is in a range of 4 nm to 30 nm can be said to be necessary and essential conditions for obtaining a graphite material for a negative electrode of a lithium ion secondary battery achieving high storage characteristics that the 2000-cycle capacity retention rate is 89% or more.

In Comparative Examples 63 and 64, the compound powders were obtained by mixing the powder of Raw coke composition K and the acetylene black of 0.2 wt % (Comparative Example 63) and 0.4 wt % (Comparative Example 64) with respect to the raw coke composition and applying the compressive shearing stress thereto. The Lc(112) of the graphite materials obtained by carbonizing and graphitizing the compound powders was in the range of 4 nm to 30 nm. In the lithium ion secondary batteries using the graphite materials as a negative electrode material, the 2000-cycle capacity retention rate was less than 70% and was much lower than those of Examples 32 to 44 (Table 6).

The reason is that when the amount of the acetylene black mixed into the powder of the raw coke composition is less than 0.5 wt % with respect to the raw coke composition, the areas having a low crystallinity in the obtained graphite material were very small. Accordingly, in the lithium ion secondary batteries using the graphite materials, since the co-intercalation of the electrolyte solution into the graphite layers is not suppressed, the leak current of the negative electrode increases, and the difference from the leak current of the positive electrode increases, it is thought that the operational ranges of capacity of the positive and negative electrodes vary and thus the service life characteristics degrade.

In Comparative Examples 65 and 66, the compound powders were obtained by mixing the powder of Raw coke composition K and the acetylene black of 10.2 wt % (Comparative Example 65) and 13.0 wt % (Comparative Example 66) with respect to the raw coke composition and applying the compressive shearing stress thereto. The Lc(112) of the graphite materials obtained by carbonizing and graphitizing the compound powders was in the range of 4 nm to 30 nm. In the lithium ion secondary batteries using the graphite materials as a negative electrode material, the 2000-cycle capacity retention rate was 70% more or less and was much lower than those of Examples 32 to 44 (Table 6).

The reason is that when the amount of the acetylene black mixed into the powder of the raw coke composition is more than 10 wt % with respect to the raw coke composition, the compound powder obtained by applying the compressive shearing stress thereto was a compound powder with very large unevenness on the surface in which the acetylene black was attached to the particle surface of the raw coke composition and the specific surface area of the graphite material obtained by carbonizing and graphitizing the compound powder was very large. Accordingly, in the lithium ion secondary batteries using the graphite materials, since the decomposition of the electrolyte solution in the negative electrode increases, the leak current of the negative electrode increases, and the difference from the leak current of the positive electrode increases, it is thought that the operational ranges of capacity of the positive and negative electrodes vary and thus the service life characteristics degrade.

On the other hand, in the lithium ion secondary batteries using the graphite materials obtained by carbonizing and graphitizing the compound powders, which were obtained by mixing the same powder of Raw coke composition K-4 as in Comparative Examples 63 to 66 and the acetylene black of 0.5 wt % to 10 wt % with respect to the raw coke composition (Examples 32 to 35) as a ratio of the calcined coke to the raw coke composition and applying the compressive shearing stress thereto, the 2000-cycle capacity retention rate had a high value of 90% or more which was higher than those of Comparative Examples 63 to 66.

In Comparative Examples 67 to 70, the compound powders were obtained by mixing the powder of Raw coke composition H-4 and the acetylene black of 0.1 wt %, 0.3 wt %, 10.5 wt %, and 20.0 wt % with respect to the raw coke composition and applying the compressive shearing stress thereto. The Lc(112) of the graphite materials obtained by carbonizing and graphitizing the compound powders was in the range of 4 nm to 30 nm. In the lithium ion secondary batteries using the graphite materials as a negative electrode material, the 2000-cycle capacity retention rate became lower.

On the other hand, in the lithium ion secondary batteries using the graphite materials obtained by carbonizing and graphitizing the compound powders, which were obtained by mixing the same powder of Raw coke composition H-4 as in Comparative Examples 67 to 70 and the acetylene black of 6.0 wt % with respect to the raw coke composition (Example 37) as a ratio of the calcined coke to the raw coke composition and applying the compressive shearing stress thereto, the 2000-cycle capacity retention rate had a high value of 89.3% which was higher than those of Comparative Examples 67 to 70.

From these results, the carbonization and graphitization of the compound powder obtained by mixing the powder of the raw coke composition and the acetylene black of 0.5 wt % to 10 wt % with respect to the raw coke composition and applying the compressive shearing stress thereto in the manufacturing method according to the invention can be said to be necessary and essential conditions for achieving excellent service life characteristics with a capacity retention rate of 89% or more.

As described above, the lithium ion secondary batteries using the graphite materials manufactured through the use of the manufacturing method according to the invention as a negative electrode material could achieve excellent storage characteristics.

INDUSTRIAL APPLICABILITY

A lithium ion secondary battery using the graphite material manufactured using the manufacturing method according to the invention can guarantee high storage characteristics in comparison with lithium ion secondary batteries using the graphite materials according to the related art. Accordingly, the lithium ion secondary battery according to the invention can be used for vehicles such as hybrid cars, plug-in hybrid cars, and electric cars, and industries for power storage in a system infrastructure.

DESCRIPTION OF REFERENCE NUMERALS

10: battery
11: positive electrode
12: positive electrode collector
13: negative electrode
14: negative electrode collector
15: separator
16: aluminum-laminated package
17: package
30: apparatus
31: blade
32: housing
33: gap
R1: rotation direction
R2: rotation direction
P: powder

The invention claimed is:
1. A method of manufacturing a graphite material for a negative electrode of a lithium ion secondary battery, comprising at least:
   a step of pulverizing and classifying a raw coke composition obtained by coking a heavy oil composition through a delayed coking process;
   a step of applying a compressive stress and a shearing stress to the pulverized and classified raw coke composition to obtain a graphite precursor; and a step of graphitizing the graphite precursor by heating to obtain a graphite material in which a crystallite size Lc(112) of a (112) diffraction line measured through the use of a wide-angle X-ray diffraction method is 4 nm or more, wherein the raw coke composition before being pulverized and classified has an atomic ratio H/C of hydrogen atoms H and carbon atoms C in a range of 0.30 to 0.50 and has a microstrength of 7 wt % to 17 wt %.

2. A method of manufacturing a graphite material for a negative electrode of a lithium ion secondary battery, comprising at least:

a step of pulverizing and classifying a raw coke composition obtained by coking a heavy oil composition through a delayed coking process to obtain a powder of the raw coke composition;

a step of heating the pulverized and classified powder of the raw coke composition to obtain a carbonized composition;

a step of graphitizing the carbonized composition by heating to obtain graphite particles in which a crystallite size Lc(112) of a (112) diffraction line measured through the use of a wide-angle X-ray diffraction method is 4 nm or more; and a step of applying a compressive shearing stress to the graphite particles to obtain a graphite material, wherein the raw coke composition before being pulverized and classified has an atomic ratio H/C of hydrogen atoms H and carbon atoms C in a range of 0.30 to 0.50 and has a microstrength of 7 wt % to 17 wt %.

3. A method of manufacturing a graphite material for a negative electrode of a lithium ion secondary battery, comprising at least:

a step of pulverizing and classifying a raw coke composition obtained by coking a heavy oil composition through a delayed coking process to obtain a powder of the raw coke composition;

a step of heating the pulverized and classified powder of the raw coke composition to obtain a carbonized composition;

a step of graphitizing the carbonized composition by heating to obtain graphite particles in which a crystallite size Lc(112) of a (112) diffraction line measured through the use of a wide-angle X-ray diffraction method is 4 nm or more;

a step of applying a compressive shearing stress to the graphite particles to obtain a graphite material; and a step of performing a heating process on the graphite material, wherein the raw coke composition before being pulverized and classified has an atomic ratio 14/C of hydrogen atoms 14 and carbon atoms C in a range of 0.30 to 0.50 and has a microstrength of 7 wt % to 17 wt %.

4. A method of manufacturing a graphite material for a negative electrode of a lithium ion secondary battery, comprising at least:

a step of applying a compressive shearing stress to a mixture of a raw coke composition, which is obtained by coking a heavy oil composition through a delayed coking process and has an atomic ratio H/C of hydrogen atoms H and carbon atoms C in a range of 0.30 to 0.50 and a microstrength of 7 to 17 wt %, and a calcined coke with an average particle diameter of 0.1 μm to 3.0 μm and in a range of 0.5 wt % to 10 wt % with respect to the raw coke composition to obtain a compound powder in which the calcined coke is embedded in particle surfaces of the raw coke composition;

a step of heating the compound powder to obtain a carbonized composition; and a step of graphitizing the carbonized composition by heating to obtain a graphite material in which a crystallite size Lc(112) of a (112) diffraction line measured through the use of a wide-angle X-ray diffraction method is in a range of 4 nm to 30 nm.

5. A method of manufacturing a graphite material for a negative electrode of a lithium ion secondary battery, comprising at least:

a step of applying a compressive shearing stress to a mixture of a raw coke composition, which is obtained by coking a heavy oil composition through a delayed coking process and has an atomic ratio H/C of hydrogen atoms H and carbon atoms C in a range of 0.30 to 0.50 and a microstrength of 7 to 17 wt %, and an acetylene black of 0.5 wt % to 10 wt % with respect to the raw coke composition to obtain a compound powder in which the acetylene black is embedded in particle surfaces of the raw coke composition;

a step of heating the compound powder to obtain a carbonized composition; and a step of graphitizing the carbonized composition by heating to obtain a graphite material in which a crystallite size Lc(112) of a (112) diffraction line measured through the use of a wide-angle X-ray diffraction method is in a range of 4 nm to 30 nm.

6. The method of manufacturing a graphite material for a negative electrode of a lithium ion secondary battery according to any one of claims 1 to 5, wherein the heavy oil composition includes two or more types selected from a group consisting of a hydrodesulfurized oil, a fluid catalytic cracking decant oil, and a desulfurized deasphalted oil.

7. A lithium ion secondary battery comprising the graphite material manufactured by the method according to any one of claims 1 to 5 as a material of a negative electrode.

8. A graphite material for a negative electrode of a lithium ion secondary battery, which is obtained by graphitizing a graphite precursor in which a compressive stress and a shearing stress are applied to a pulverized and classified raw coke composition and in which a crystallite size Lc(112) of a (112) diffraction line measured through the use of a wide-angle X-ray diffraction method is 4 nm or more, wherein the raw coke composition before being pulverized and classified is obtained by coking a heavy oil composition through a delayed coking process, has an atomic ratio H/C of hydrogen atoms H and carbon atoms C in a range of 0.30 to 0.50 and has a microstrength of 7 wt % to 17 wt %.

\* \* \* \* \*